United States Patent [19]
Ogata

[11] Patent Number: 5,877,850
[45] Date of Patent: Mar. 2, 1999

[54] DISTANCE MEASURING APPARATUS

[75] Inventor: Yasuji Ogata, Akiruno, Japan

[73] Assignee: Olympus Optical Company, Ltd, Tokyo, Japan

[21] Appl. No.: 859,780

[22] Filed: May 19, 1997

[30] Foreign Application Priority Data

May 20, 1996 [JP] Japan ................................. 8-124656
Jun. 5, 1996 [JP] Japan ................................. 8-143029
Jul. 23, 1996 [JP] Japan ................................. 8-193206

[51] Int. Cl.$^6$ ................................................. G01C 03/08
[52] U.S. Cl. ............................................. 356/3.04; 396/113
[58] Field of Search ................................. 356/3.04, 3.01, 356/4.01; 396/113

[56] References Cited

U.S. PATENT DOCUMENTS

| | | | |
|---|---|---|---|
| 5,239,335 | 8/1993 | Kato ........................................ | 354/403 |
| 5,313,262 | 5/1994 | Leonard .................................... | 356/5 |
| 5,589,930 | 12/1996 | Kurahashi et al. .................... | 356/5.01 |
| 5,737,070 | 4/1998 | Kato ........................................ | 356/28.5 |

FOREIGN PATENT DOCUMENTS 7-63982   3/1995   Japan .

OTHER PUBLICATIONS

Applied Optics/vol.28, No. 18/15 Sep. 1989 Design Of A Wide Field Diffractive Landscape Lens, Dale A. Buralli et al, pp. 3950–3959.

Applied Optics/ vol. 27, No. 14/15 Jul. 1988 Hybrid Diffractive–Refractive Lenses And Achromats, Thomas Sone et al, pp.,2960 –2971.

*Primary Examiner*—Mark Hellner
*Attorney, Agent, or Firm*—Pillsbury Madison & Sutro LLP

[57] ABSTRACT

The overall length of a lens, particularly the thickness thereof, is reduced to thereby reduce the volumetric capacity occupied by a lens system for distance measurement. A distance measuring apparatus has a light-emitting device; a light-projecting lens system for projecting light emitted from the light-emitting device onto a subject; a light-receiving lens system for receiving and converging reflected light from the subject; and a detector for detecting the light. The light-projecting lens system or the light-receiving lens system includes a diffractive optical element having plane surfaces $r_1$ and $r_4$ on both sides thereof, at least one of which is formed from a diffraction surface. A similar diffractive optical element is provided in a similar lens system adapted to change a projected light angle by adding a converter lens to a master lens, and also provided in a similar lens system adapted to change a projected light angle by changing the spacing between a plurality of lens units.

41 Claims, 35 Drawing Sheets

FIG. 3(a)  FIG. 3(b)
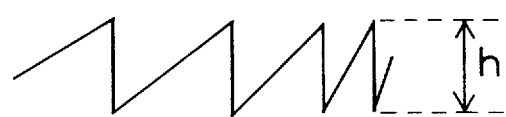
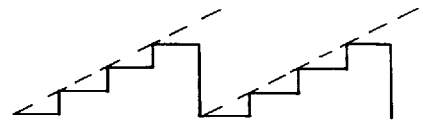
FIG. 4(a)
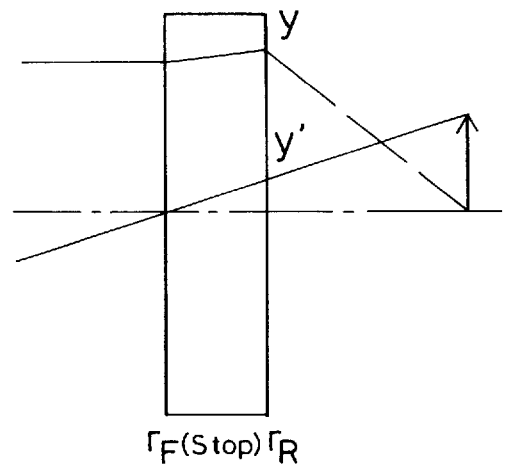
FIG. 4(b)
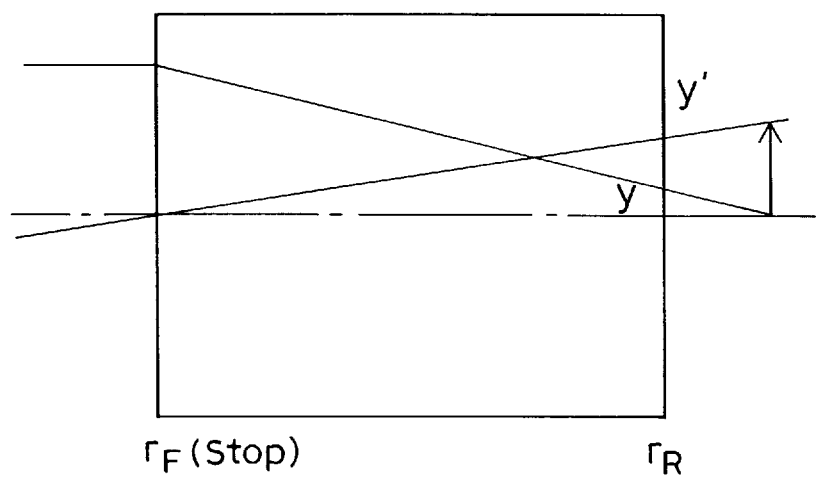

FIG. 30(a)  FIG. 30(b)  FIG. 30(c)

FNO 0.6    ω 6.2°    ω 6.2°

FNO 0.6    ω 3.1°    ω 3.1°

M (Meridional)
S (Sagittal)

-0.05   0.05  -0.05   0.05  -4.00   4.00

SA    AS    DS (%)

SA

AS

DS (%)

SA

AS

DS (%)

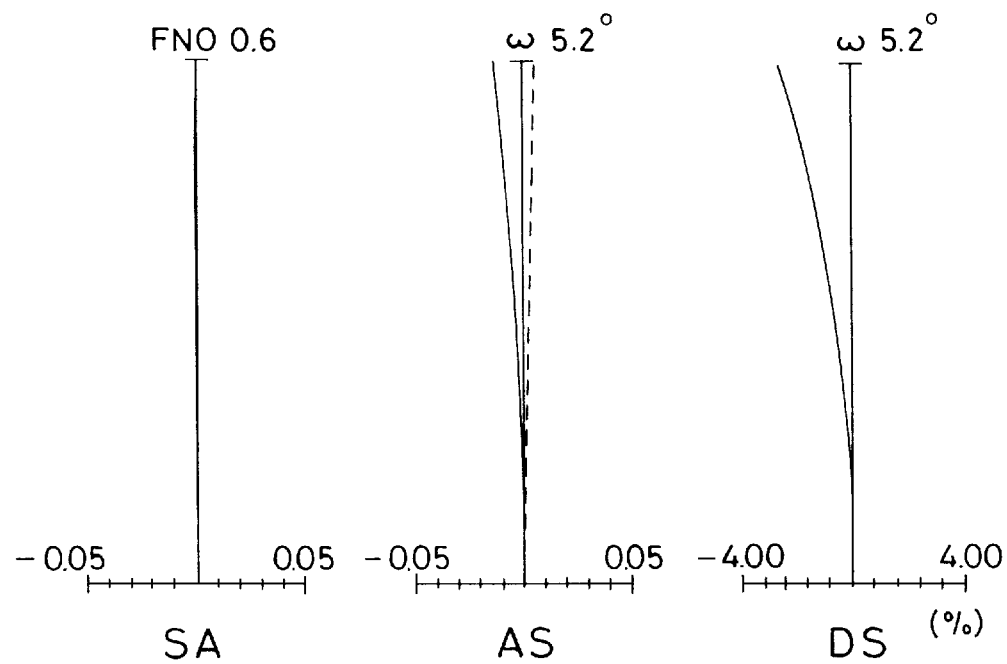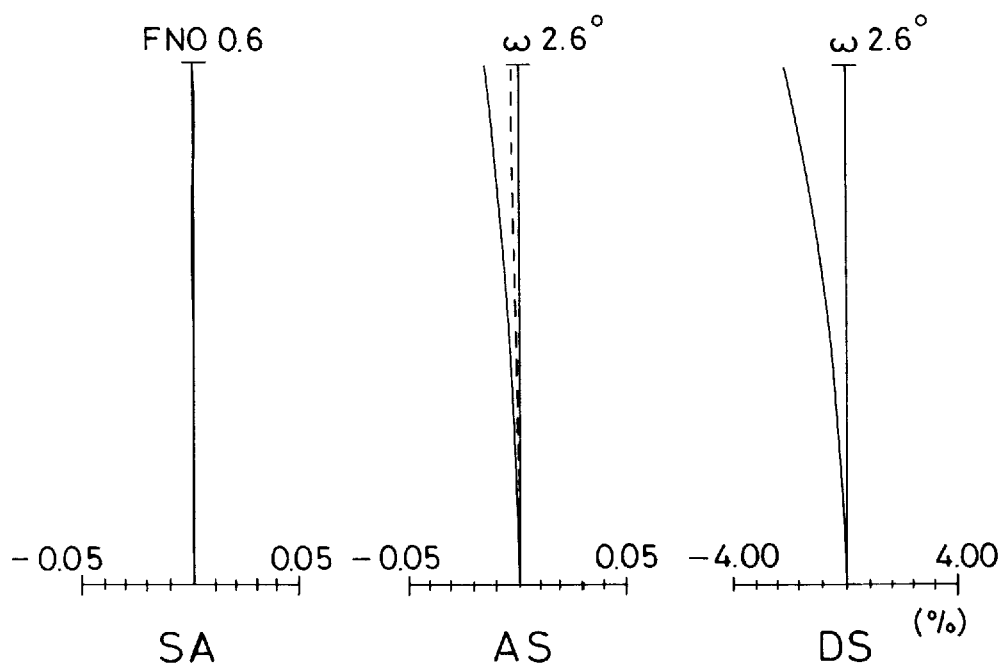

21 Transparent portion

22 Opaque portion

24 Low refractive index portion

23 High refractive index portion (Wide-angle end)

(Telephoto end)

(Wide-angle end)

(Telephoto end)

(Wide-angle end)

(Telephoto end)

(Wide-angle end)

(Telephoto end)

(Wide-angle end)

(Telephoto end)

(Wide-angle end)

(Telephoto end)

(Wide-angle end)

(Telephoto end)

(Wide-angle end)

(Telephoto end)

(Wide-angle end)

(Telephoto end)

(Wide-angle end)

(Telephoto end)

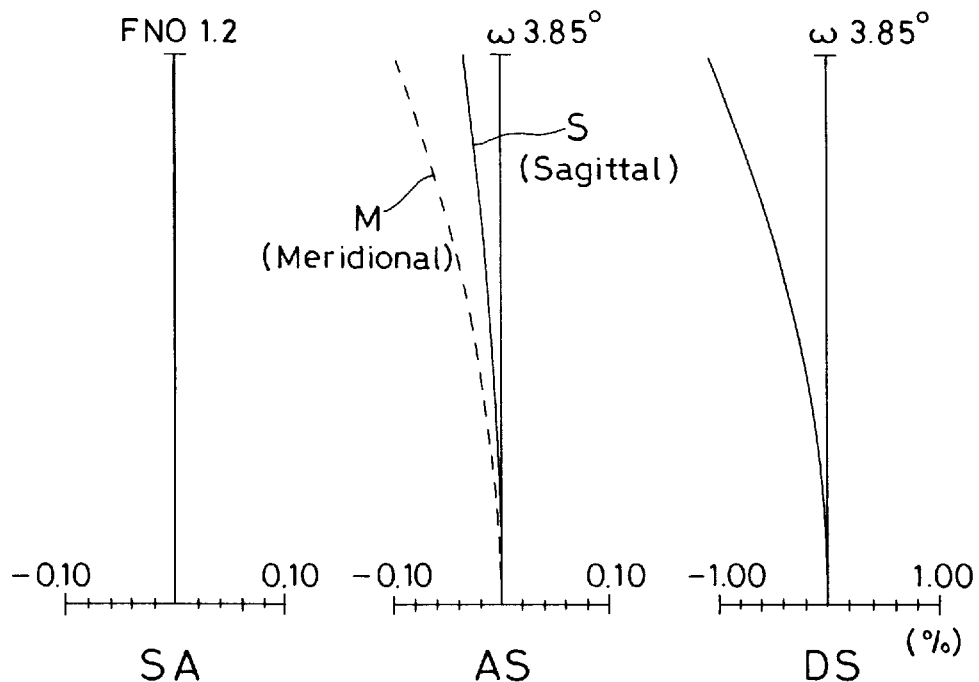

SA

AS

DS (%)

SA

AS

DS (%)

SA

AS

DS (%)

SA

AS

DS (%)

DISTANCE MEASURING APPARATUS

BACKGROUND OF THE INVENTION

The present invention relates to a distance measuring apparatus using a diffractive optical element (hereinafter abbreviated to "DOE") with a diffraction surface having a lens action based on a diffraction phenomenon. More particularly, the present invention relates to an optical system used in an active distance measuring apparatus that measures the distance to a subject by projecting infrared light onto the subject and receiving reflected light therefrom.

An active distance measuring apparatus that measures the distance to a subject by projecting infrared light onto the subject and detecting reflected light therefrom has heretofore been well known and already applied to various products. In this type of distance measuring apparatus, infrared light is projected onto a subject through a light-projecting lens system, and reflected light from the subject is received by a detector through a light-receiving lens system provided apart from the light-projecting lens system by a predetermined distance, that is, baselength. Then, the distance to the subject is calculated from position information on the detector.

The active distance measuring apparatus will be described below more specifically with reference to FIG. 1. FIG. 1 is a block diagram showing an essential part of an active distance measuring apparatus. An infrared-emitting diode (hereinafter referred to as "IRED") 11 is controlled by a control unit 11a. A light-projecting lens system 12 projects light emitted from the IRED 11 onto a subject 13. Reflected light from the subject 13 is received and converged through a light-receiving lens system 14. A position sensing device (hereinafter referred to as "PSD") 15 detects the position of the converged light. Reference numeral 16 denotes a distance calculating device. Reference numeral 17 denotes a controller that performs a position calculation for a focusing lens. Reference numeral 18 denotes a driver, and reference numeral 19 denotes a driving motor. Examples of the IRED 11 include an IRED in which a light-emitting portion is covered with a resin package having a curvature as shown in the figure, and an IRED in which a light-emitting portion is covered with a resin package having a plane surface. The controller 17 incorporates a CPU. The output of the CPU drives the motor 19 as a power source for the lens focusing motion produced by the driver 18.

In the distance measuring apparatus having the arrangement as shown in FIG. 1, assuming that the subject distance is d, the distance between the light-projecting lens system 12 and the light-receiving lens system 14, that is, baselength, W, the focal length of the light-receiving lens system 14 is f, and the position of light converged on the PSD 15 is x, the following relationship is obtained:

$$d = W \cdot f / x \tag{a}$$

Assuming that photoelectric currents outputted from both sides of the PSD 15 are $I_1$ and $I_2$, the ratio $I_1/I_2$ is not dependent on the intensity of incident light but determined by only the incident light position x. Assuming that the entire length of the PSD 15 is t, the following relationship is obtained:

$$I_1/I_2 = \{(t/2)+x\}/\{(t/2)-x\} \tag{b}$$

From the above Eqs.(a) and (b), the following relationship is obtained:

$$I_1/I_2 = \{t+(2 \cdot W \cdot f/d)\}/\{t-(2 \cdot W \cdot f/d)\} \tag{c}$$

Accordingly, if the photoelectric current ratio $I_1/I_2$ of the PSD 15 is obtained, the subject distance d is uniquely determined.

The distance measuring apparatus of the type described above is based on the trigonometrical measurement. In a case where the apparatus has a distance measurement range only in the center of the image field, if the principal subject is not in the center of the image field, the distance measuring apparatus is undesirably focused on another subject or a background (i.e. a distant object in many cases). Consequently, a focusing error occurs, resulting in a picture in which the principal subject is out of focus. To overcome such a disadvantage, a technique known as multipoint distance measurement has been proposed in which a plurality of light beams are projected to enable distance measurement to be performed in a plurality of ranges in the image field. See Japanese Patent Application Unexamined Publication Number [hereinafter referred to as "JP(A)"] 4-248509 as an example of a light-projecting lens system. As specific examples of this technique, the following methods are known: A method in which a plurality of light-emitting units are prepared, and a plurality of light beams are projected through a single lens; and a method in which a plurality of light beams are obtained from a single light-emitting unit through a lens divided into a plurality of surfaces having different curvatures. In the case of a fixed (single) focal length lens, the phenomenon in which the principal subject that is not in the center of the image field undesirably becomes defocused can be satisfactorily prevented by such a conventional method. However, in the case of a camera that effects zooming or a magnification change such as switching between a telephoto position and a wide-angle position, the field angle changes. Therefore, it is necessary to change the angle of projected light (i.e. the angle formed between the central beam of the projected light and the peripheral beam of the projected light) in accordance with the change of the field angle. To meet such a demand, a method in which a large number (5 or 7) of light beams are prepared and selectively projected has also bee proposed.

Meanwhile, JP(A) 63-292118 is known as an example in which the light-projecting lens system also effects a magnification change in accordance with a magnification change of the taking lens. However, this prior art is not adapted for the multipoint distance measurement but schemed to change the size of the spot of projected light in accordance with the magnification change of the taking lens so that the range of a frame for distance measurement displayed in the viewfinder is always coincident with the range of the actual spot. More specifically, a zoom lens system consisting essentially of two, negative and positive, lens units is used as a device for changing the size of the spot of projected light, and the focal length is changed by changing the spacing between the two lens units. In JP(A) 6-94976, spots of projected light for multipoint distance measurement line up in the diagonal direction of the film format, and when panoramic photography is performed, the angle of projected light is reduced so that the projected light beams will not be blocked by the panoramic mask. As a device for changing the projected light angle, a cylindrical lens is inserted after the light-projecting lens. With this method, however, the projected light angle can be changed only in a predetermined direction.

Thus, there is no prior art relating to a scheme of adapting the light-projecting lens system or the light-receiving lens to achieve a magnification change, and the subject matter of the related art is not satisfactory. However, there has recently been a growing tendency for cameras to have a zooming function. Therefore, there is an increasing need for a distance measuring apparatus capable of varying the projected light angle.

Next, diffractive optical elements (DOEs) will be described. Regarding the application of DOEs, "Hybrid diffractive-refractive lenses and achromats" Appl. Opt. 27,2960–2971, "International Lens Design Conference (1990)" SPIE, 1354, etc. are known.

Conventional lenses are based on the refracting action at the interface of a medium, whereas DOEs are based on the diffracting action of light. In general, when light enters a diffraction grating as shown in FIG. 2, diffracted light emanating from the diffraction grating satisfies the following relationship:

$$\sin\theta - \sin\theta' = m\lambda/d \quad (d)$$

where $\theta$ is the incident angle; $\theta'$ is the exit angle; $\lambda$ is the wavelength of light; d is the pitch of the diffraction grating; m is the order of diffraction.

Accordingly, if the pitch of the ring-shaped diffraction grating is appropriately set according to Eq.(d), the incident light can be converged on a point. That is, a lens action can be given to the diffraction grating. Assuming that the radius of the j-th grating ring is $r_j$ and the focal length of the diffraction surface is f, the following condition is satisfied in the domain of linear approximation:

$$r_j^2 = 2j\lambda f \quad (e)$$

Examples of diffraction grating configurations hitherto proposed include an amplitude modulation type in which a diffraction grating is formed from bright and dark rings, and a phase modulation type in which the refractive index or the optical path length is varied. In the amplitude modulation type DOE, a plurality of orders of diffracted light are generated; therefore, the ratio of the amount of first-order diffracted light to the amount of incident light (hereinafter referred to as "diffraction efficiency"), for example, is about 6% at the most. Even if the amplitude modulation type DOE is improved by bleaching, the diffraction efficiency is about 34% at the most. In the phase modulation type DOE, the diffraction efficiency can be increased up to 100% if it is formed with a sawtooth sectional configuration such as that shown in FIG. 3(a). Such a DOE is known as "kinoform". In this case, the height of the crests of the sawtooth sectional configuration is given by $$h = m\lambda/(n-1) \quad (f)$$

where h is the height of the crests, and n is the refractive index of the base material.

As will be predicted from Eq.(f), the diffraction efficiency 100% can be attained for only one wavelength. An optical element formed by stepwise approximation of the kinoform configuration as shown in FIG. 3(b) is also known as "binary optical element", which can be produced relatively easily by a lithographic technique. In the case of binary optical elements, it is known that a diffraction efficiency of 81% is obtained by 4-step approximation; 95% by 8-step approximation; and 99% by 16-step approximation.

Some DOE designing methods are known. In the present invention, the ultra-high index method is used. This method is described, for example, in "Mathematical equivalence between a holographic optical element and ultra-high index lens" J. Opt. Sos. Am. 69,486–487, and "Using a conventional optical design program to design holographic optical elements" Opt. Eng. 19,649–653. In other words, it is known that a DOE is equivalent to a refracting surface having a thickness of zero and an exceedingly large refractive index.

As an example in which such a DOE is applied to an active distance measuring apparatus, JP(A) 7-63982, filed by the present applicant, is known. In this publication, a converter lens is inserted on the IRED side of a master lens to effect a magnification change. In this case, the principal point position of the converter lens is appropriately set to enable a magnification change to be effected with the master lens remaining fixed. This cannot be done by only a conventional refracting lens system from the viewpoint of aberration correction. Regarding the lenses in this publication, the master lens is a convex-plano lens, and the converter lens is a concave-plano lens. The plane surface of each lens is formed from a diffraction surface.

In JP(A) 7-63982, however, each lens is unfavorably thick because it is formed by adding a diffraction surface to a lens with a surface having a large curvature. Therefore, it is impossible to achieve a reduction in the size. The intensity of light weakens in inverse proportion to the square of the distance. In the case of the active type, the subject is illuminated by a certain light beam, and reflected light from the subject is detected. Therefore, as the distance to the subject increases, the intensity of reflected light rapidly weakens. However, under the necessity of performing distance measurement in the light during the day, infrared light is employed in order to use a signal light for distance measurement at a low noise level. Accordingly, a sufficiently high brightness is demanded of light for distance measurement. Consequently, the light-projecting and -receiving lenses are demanded to have a light-passing ability of about 1 in terms of F-number. To meet such a demand, the lenses inevitably become thick. However, there is a recent tendency for cameras to become compact. Therefore, the lens systems for distance measurement are demanded to reduce in size.

SUMMARY OF THE INVENTION

In view of the above-described problems associated with the prior art, an object of the present invention is to reduce the overall length of a lens, particularly the thickness thereof, thereby reducing the volumetric capacity occupied by a lens system for distance measurement. It is another object of the present invention to find a method for satisfactorily correcting aberrations occurring as a result of the reduction in the thickness of the lens.

Another object of the present invention is to provide a distance measuring apparatus capable of varying the projected light angle in view of the tendency for cameras to have a zooming function and to become compact and, more particularly, to obtain a lens system having a lens with a reduced thickness and therefore capable of minimizing the volumetric capacity occupied by a lens system for distance measurement in a distance measuring apparatus capable of switching between a wide-angle position and a telephoto position, or in a distance measuring apparatus capable of changing the projected light angle either continuously or discontinuously. It is another object of the present invention to obtain a lens system which enables simplification of a mechanism for changing the projected light angle.

To attain the above-described objects, the present invention provides a first distance measuring apparatus having a light-emitting device; a light-projecting lens system for projecting light emitted from the light-emitting device onto a subject; a light-receiving lens system for receiving and converging reflected light from the subject; and a detector for detecting the light. The light-projecting lens system or the light-receiving lens system includes a diffractive optical element having plane surfaces on both sides thereof, at least one of which is formed from a diffraction surface.

In addition, the present invention provides a second distance measuring apparatus having a light-emitting device; a light-projecting lens system for projecting light emitted from the light-emitting device onto a subject; a light-receiving lens system for receiving and converging reflected light from the subject; and a detector for detecting the light. The light-projecting lens system or the light-receiving lens system is adapted to change a focal length by adding a converter lens to a master lens. The master lens or the converter lens includes a diffractive optical element having plane surfaces on both sides thereof, at least one of which is formed from a diffraction surface.

In addition, the present invention provides a third distance measuring apparatus having a light-emitting device; a light-projecting lens system for projecting light emitted from the light-emitting device onto a subject; a light-receiving lens system for receiving and converging reflected light from the subject; and a detector for detecting the light. The light-projecting lens system or the light-receiving lens system is adapted to change a focal length by changing a plurality of master lenses from one to another. Each master lens includes a diffractive optical element having plane surfaces on both sides thereof, at least one of which is formed from a diffraction surface.

In addition, the present invention provides a fourth distance measuring apparatus having a light-emitting device; a light-projecting lens system for projecting light emitted from the light-emitting device onto a subject; a light-receiving lens system for receiving and converging reflected light from the subject; and a detector for detecting the light. The light-projecting lens system or the light-receiving lens system has at least two lens units to change a focal length by changing the spacing between the lens units, and includes a diffractive optical element having plane surfaces on both sides thereof, at least one of which is formed from a diffraction surface. In this case, each lens unit may consist essentially of a single diffractive optical element. The light-projecting lens system or the light-receiving lens system may consist essentially of two lens units.

As stated above, the use of a diffraction surface enables a strong power to be given to a plane surface. If a strong power is given to a surface in a conventional refracting lens system, the surface given the strong power has a large curvature, and the sag quantity (i.e. the amount of change from the vertex of the lens surface) of the refracting surface is exceedingly large, particularly in the case of a lens system for distance measurement because the F-number thereof is small. Even if it is intended to disperse the required power to both surfaces of the refracting lens system, the power is concentrated on the subject-side surface of the lens system from the viewpoint of aberration correction. Therefore, the refracting lens system cannot be improved in this regard. Consequently, the thickness of the lens becomes extremely large. In contrast, a diffraction surface is very useful to achieve a thickness reduction because the sag quantity can be reduced to zero. Supposing the kinoform configuration, an actual diffraction surface can be regarded as substantially a plane surface from Eq.(f) although it has irregularities on the level of from several wavelengths to several tens of wavelengths. The thickness of the lens can be reduced to a quantity that is determined by constraints on processing or machining and those on assembly. Such a thickness reduction cannot be achieved by a refracting lens system. In general, DOEs have the disadvantage that chromatic dispersion is large. This, however, gives rise to no problem in a lens system for distance measurement because the wavelength width of infrared light is narrow. Accordingly, the application of a DOE to a lens system for distance measurement is extremely effective.

The above discussion is not necessarily limited to a planar lens (hereinafter referred to as "plate lens"). In the case of a lens in which the entrance surface or exit surface of a prism has a curvature (hereinafter referred to as "prism lens"), it is also possible to achieve a reduction in the size of the lens system by forming a desired surface from a diffraction surface. The thickness reducing effect is particularly remarkable in a lens system having a large number of lens elements as in a variable-magnification lens system.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 3(a) and 3(b) show sectional configurations of phase modulation type diffractive optical elements.

FIGS. 4(a) and 4(b) are diagrams for examining aberration correction by diffractive optical elements in first and second distance measuring apparatuses according to the present invention.

FIGS. 30(*a*) and 30(*b*) graphically show aberrations in Example 14.

FIGS. 32(*a*) and 32(*b*) graphically show aberrations in Example 21.

FIGS. 44(*a*) and 44(*b*) graphically show aberrations in Example 24.

DESCRIPTION OF THE PREFERRED EMBODIMENTS

Figure 1:
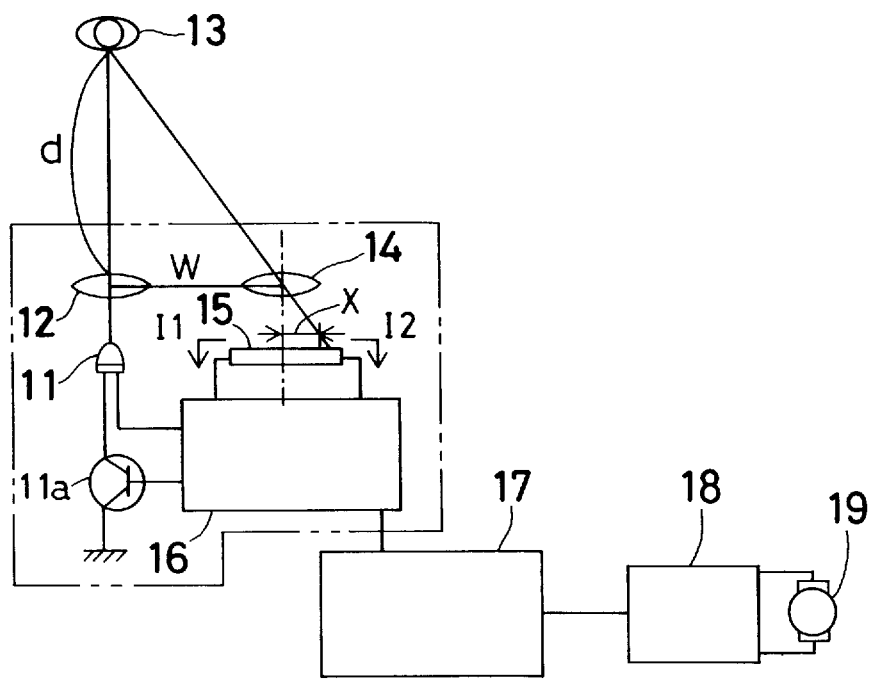
FIG. 1 is a block diagram showing an essential part of an active distance measuring apparatus to which the present invention is applicable.
Figure 2:
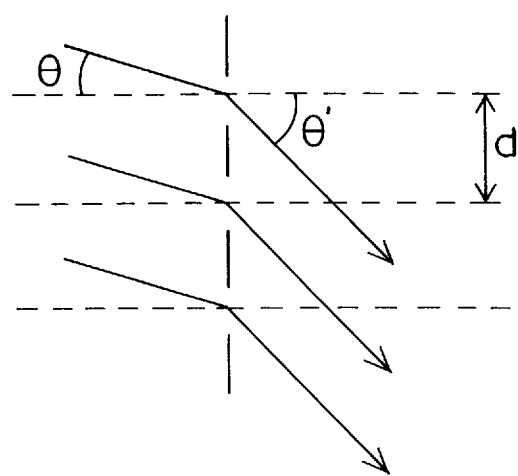
FIG. 2 is a diagram for describing the diffracting action of a diffraction grating.

First of all, aberration correction in the case of a DOE will be described. The fact that a DOE can converge incident light on a point if the ring grating pitch is appropriately set means that the DOE exhibits an action similar to the correction of spherical aberration by an aspherical surface. In other words, it is known that DOEs have an aspherical surface action. Accordingly, in a case where a distance measuring apparatus corresponds to only the center of the image field, it is only necessary to correct spherical aberration, and therefore, it is possible to employ not only a plate lens or a prism lens but also a DOE having a diffraction surface on only one side thereof.

In the case of multipoint distance measurement, because distance measurement ranges are present in the center and periphery of the image field, it is important for a lens system for distance measurement to correct not only spherical aberration but also comatic aberration. Let us consider arrangements as shown in FIGS. 4(*a*) and 4(*b*). It is assumed that the subject-side surface of a plate lens is a surface $r_F$, and the surface on the opposite side of the plate lens is a surface $r_R$, and that each surface is formed from a diffraction surface. It is also assumed that parallel rays of light from an infinitely distant position enter the plate lens, and that the marginal ray height at each surface is y, and the principal ray height at each surface is y'. Further, the stop is assumed to be coincident with the surface $r_F$. According to the ultra-high index method, the refractive index of a diffraction surface is extremely large, whereas the curvature thereof is extremely small. Therefore, spherical and comatic aberrations produced by the surface $r_F$ are approximately zero. At the surface $r_R$, a negative spherical aberration and a positive comatic aberration are produced because a convergent bundle of rays passes through the surface $r_R$, causing the performance to be degraded. Let us consider the relationship between the stop position and the aberration coefficient. In the case of a DOE, the following relationships are obtained from "Design of a wide field diffractive landscape lens" Appl. Opt. 28,3950–3959:

$$SI^* = SI \tag{g}$$

$$SII^* = SII + (y'/y)SI \tag{h}$$

where SI and SII are third-order spherical aberration and comatic aberration coefficients, respectively, when the stop is in close contact with the surface $r_F$, and SI* and SII* are third-order spherical aberration and comatic aberration coefficients, respectively, when the stop is not coincident with the surface $r_F$. In the case of FIG. 4(*a*), comatic aberration produced by the surface $r_R$ cannot be canceled by the surface $r_F$. Therefore, it is necessary to cancel SII by SI according to Eq.(h). However, because y' is small, SI undesirably becomes a negative large value. To correct a negative spherical aberration occurring at the surface $r_R$ by the aspherical surface action of the surface $r_F$, a large positive spherical aberration is produced by the surface $r_F$. In a case where the stop is in close contact with the surface $r_R$ also, a positive spherical aberration is produced by the surface $r_F$ to correct a negative spherical aberration produced by the surface $r_R$ in the same way as the above.

As described above, it is important in order to effect satisfactory aberration correction in multipoint distance measurement to produce an amount of spherical aberration adequate to cancel comatic aberration at the surface on the side remote from the subject. Therefore, it is desirable for this surface to be a diffraction surface. If this surface is a conventional refracting surface, aberration correction cannot be made so effectively as in the case of a diffraction surface, and the projected light angle or received light angle usable for a lens system for distance measurement is limited considerably. It should be noted that the term "projected light angle" means the angle at which light can be projected onto a subject with respect to the optical axis, and the term "received light angle" means the angle at which reflected light from the subject can be received with respect to the optical axis. To correct spherical aberration, it is desirable that the subject-side surface should be a diverging action surface to produce a positive spherical aberration, and the surface on the opposite side should be a converging action surface to produce a negative spherical aberration.

To produce a positive spherical aberration from the subject-side surface, it is possible to use not only a diffraction surface but also a planar aspherical surface or the like. In this case, the aspherical surface configuration has a concave surface directed toward the subject. To correct aberrations satisfactorily, it is desirable to satisfy the following condition:

$$0.15 < d/D < 0.30 \qquad (1)$$

where d is the center thickness of the diffractive optical element, and D is the diameter of the diffractive optical element.

If the diffractive optical element is excessively thin, that is, if d/D is not larger than the lower limit of the condition (1), i.e. 0.15, the correction of spherical aberration and the correction of comatic aberration are not consistent with each other. If the diffractive optical element is excessively thick, that is, if d/D is not smaller than the upper limit of the condition (1), i.e. 0.30, the size of the diffractive optical element becomes unfavorably large. It should be noted that a prism lens is not restricted by the upper limit of the condition (1).

Next, aberration correction in the case of a prism lens will be considered. Referring to FIG. 4(b), y' is larger than y at the surface $r_R$. This is advantageous to the correction of comatic aberration. Comatic aberration produced by the surface $r_R$ can be canceled by a relatively small amount of spherical aberration. Therefore, it is possible to minimize the amount of spherical aberration produced by the surface $r_F$. Consequently, in the case of a prism lens, it is desirable for both surfaces thereof to have a converging action.

In the foregoing, aberration correction in the case of a plate lens and a prism lens has been described. In the case of a plate lens in particular, it has been stated that the subject-side surface is a diverging action surface, and the surface on the opposite side is a converging action surface. However, to shorten the overall length of the lens, it is desired to place the back principal point as close to the subject side as possible. Therefore, it is desired to concentrate the positive power on the subject-side surface. By doing so, however, the lens has such a structure that the central portion of the lens has a converging action, but the peripheral portion of the lens has a diverging action. Accordingly, the orientation of the sawteeth of the kinoform changes at the intermediate portion of the lens. This makes it difficult to process or machine the lens. In this regard, it is more advantageous to form the diffractive optical element as a prism lens, as described later. However, if the processing or machining accuracy permits, a diffraction surface having mixed diverging and converging actions can be used without any problem.

In the case of a prism lens, if the surface of the prism lens on the side remote from the subject is formed as a diffraction surface and all the power is concentrated on this surface, the overall length of the lens system increases to a considerable extent because the distance from the surface to the IRED or the PSD is equivalent to the focal length of the prism lens. Accordingly, it is desirable that the back principal point of the prism lens should be placed as close to the subject side as possible. To realize this, it is preferable that both surfaces of the prism lens should be diffraction surfaces, and that a positive power should be given to the subject-side surface, and a negative power is given to the surface on the side remote from the subject. That is, it is preferable to construct a telephoto type lens system. In this case, it is desirable to satisfy the following condition:

$$0.8 < \varnothing_F/\varnothing < 1.6 \qquad (2)$$

where ⌀F is the power of the subject-side surface, and ⌀ is the power of the entire system, exclusive of the light-emitting device or the detecting device.

When $\varnothing_F/\varnothing = 1$, it is possible to shorten the overall length by about ⅓ of the sag quantity as required for a refracting surface. If $\varnothing_F/\varnothing$ is not larger than the lower limit of the condition (2), i.e. 0.8, the lens length shortening effect becomes weak. If $\varnothing_F/\varnothing$ is not smaller than the upper limit of the condition (2), i.e. 1.6, it becomes impossible to ensure the required distance from the final surface to the IRED or the PSD, that is, back focus.

If the positive power is concentrated on the surface on the side remote from the subject, the back focus becomes equivalent to the focal length, and the overall length becomes extremely long. This is advantageous when another member, e.g. a reflecting surface, is disposed in the space between the final surface and the IRED or the PSD. However, if such an arrangement is adopted, the aberration correcting action becomes similar to that in the case of a plate lens. In particular, the subject-side surface becomes a surface having mixed diverging and converging actions. Therefore, care should be taken.

In Examples (described later), the light-projecting lens system or the light-receiving lens system is formed from a fixed focal length lens or a plurality of lens elements. In the case of a fixed focal length lens, a telephoto type master lens, or a zoom lens, if a lens having a large axial ray height is formed from a plate lens, spherical aberrations produced at both surfaces become extremely large. Consequently, if the two surfaces are decentered with respect to each other, the spherical aberrations are severely aggravated. Therefore, great attention should be given to decentration in the production of a plate lens.

To avoid the effect of decentration, an optical system may be formed from a lens having a refracting action. The use of a refracting lens is effective because the occurrence of comatic aberration can be suppressed by the curvature of the surface and, at the same time, the spherical aberration produced by the lens is favorably small.

Alternatively, a diffraction surface may be formed on a refracting surface having a curvature. By doing so, the decentration accuracy can be eased, and the production is facilitated.

In a case where the light-projecting lens system or the light-receiving lens system is formed from a combination of a master lens and a converter lens, it is desirable to form both the master and converter lenses from DOEs for space saving purposes because a wide-angle master lens or a telephoto converter lens does not produce a very large spherical aberration.

It is also possible to adopt an arrangement in which the light-projecting lens system or the light-receiving lens system is adapted to change a focal length by adding a converter lens to a master lens, and the master lens remains fixed during the change of a focal length. In this case, the converter lens should be a diffractive optical element in which both surfaces are plane surfaces, and at least one of them has a diffraction surface.

Figure 19A:
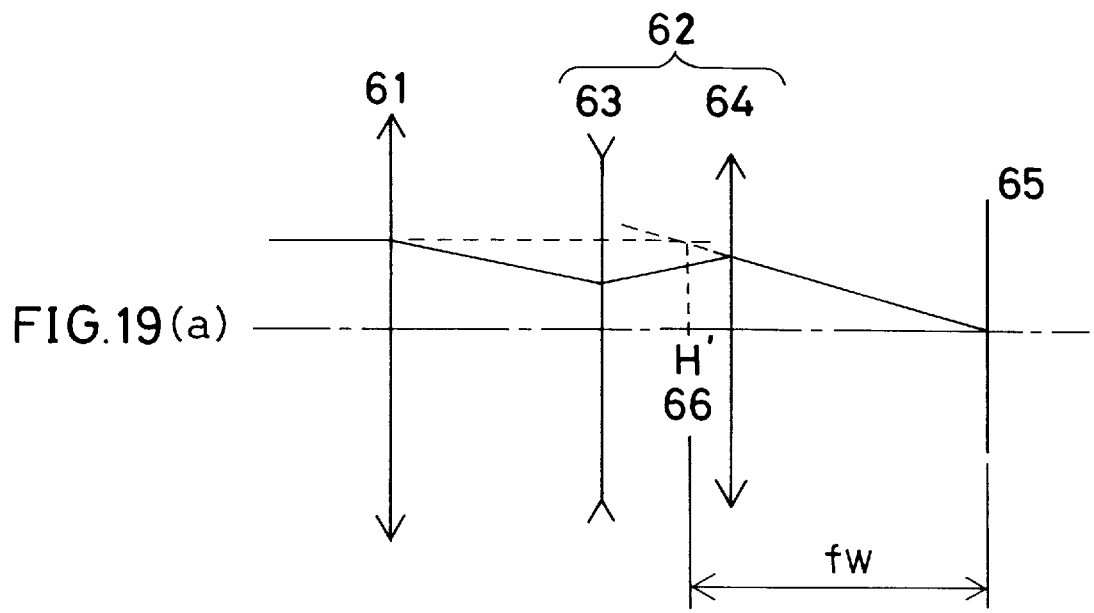
FIGS. 19(*a*) and 19(*b*) are diagrams for describing an arrangement in which a magnification change is effected with a master lens remaining fixed.
Figure 19B:
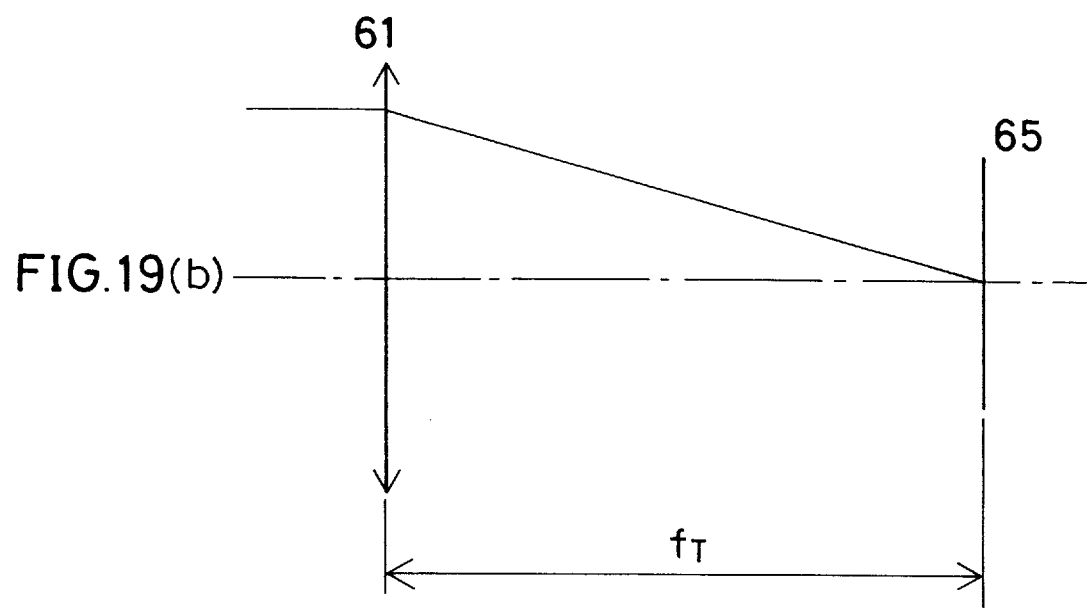

In general, in a case where the focal length is changed by a combination of a master lens and a converter lens, the master lens must be moved in order to maintain the image-formation relationship. Accordingly, it is necessary to provide in the camera a mechanism for loading and unloading the converter lens and a space therefor and also a mechanism for moving the master lens and a space therefor, and this causes an increase in the number of components and also leads to an increase in the size of the camera. However, in a case where a converter lens of positive power is inserted on the side of the master lens which is remote from the subject, it is possible to realize a wide-angle position and to maintain the image-formation relationship while keeping the master lens fixed by arranging the converter lens to have, in order from the subject side, a negative power and a positive power. The principle will be described below with reference to FIGS. 19(*a*) and 19(*b*). FIG. 19(*a*) shows a lens system in a wide-angle position, and FIG. 19(*b*) shows the lens system in a telephoto position. Reference numeral 61 denotes a telephoto master lens, and reference numeral 62 denotes a converter lens having a surface 63 on a subject side thereof and a surface 64 on the opposite side. Reference numeral 65 denotes a light-emitting surface of a light-receiving surface. If a strong negative power is given to the surface 63 and a strong positive power is given to the surface 64, as will be clear from the figure, a bundle of light rays converged through the master lens 61 is once diverged through the surface 63 and then converged through the surface 64. Accordingly, when the lens system is in the wide-angle position, the back principal point H' of the entire system is placed at a position 66 as illustrated in the figure. Therefore, if the powers of the two surfaces 63 and 64 of the converter lens 62 are appropriately set, a magnification change can be effected with the master lens 61 remaining fixed. It should, however, be noted that, as will be understood from FIG. 19(*a*), such a magnification change can be effected only when a wide-angle position is realized by a rear converter. Consequently, the lens system needs neither a master lens moving mechanism nor an extra space therefor; this is extremely effective for achievement of compact cameras.

To realize the above-described arrangement by using a conventional refracting lens, the refracting surface is demanded to have an extremely strong power. Therefore, it is impossible to make aberration correction satisfactorily, and it is difficult to achieve a large aperture or a large magnification change (high zoom ratio). Moreover, an increase in the thickness of the lens makes it difficult to achieve a reduction in the size.

The arrangement according to the present invention may be said to be an application in which the advantages of DOEs are used to the full.

In the arrangement of another of the above-described lens systems for distance measurement, it is desirable to satisfy the following condition:

$$0.2 < d/f_W < 1 \qquad (3)$$

where d is the center thickness of the converter lens, and $f_W$ is the focal length of the entire system in the wide-angle position.

If the converter lens is excessively thin, that is, if $d/f_W$ is not larger than the lower limit of the condition (3), i.e. 0.2, the negative and positive powers of the surfaces of the converter lens become excessively strong, making it impossible to make aberration correction satisfactorily. If the converter lens is excessively thick, that is, if $d/f_W$ is not smaller than the upper limit of the condition (3), i.e. 1, it becomes impossible to place the converter lens in the space between the master lens and the IRED. Accordingly, the required back focus cannot be ensured.

In particular, when each lens unit is formed from a single plate lens as in Examples (described later), the thickness reducing effect can be exhibited to the full. In this case, the size of the zoom lens system is approximately determined by the air spacing and the thickness required for the plate lens. Therefore, the thickness of the zoom lens system can be reduced to a considerable extent.

With a view to making good use of the merit of achieving a thickness reduction and simplifying the moving mechanism for zooming, it is desirable that the zoom lens system according to the present invention should be formed from two lens units.

Specific arrangements of the zoom lens system according to the present invention will be described.

Figure 34A:
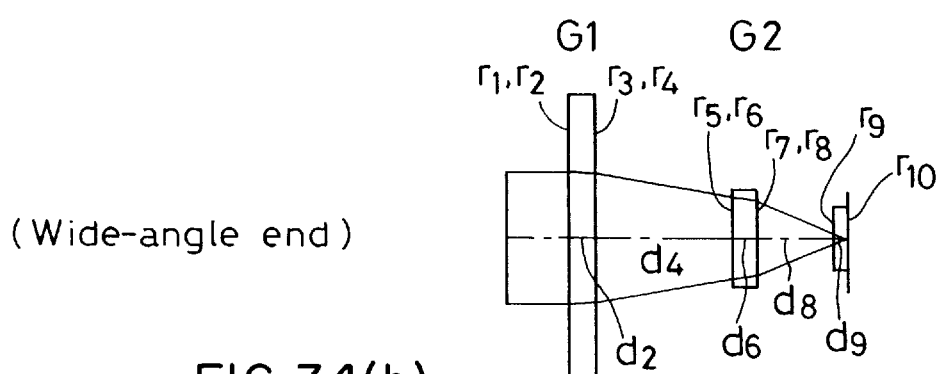
FIG. 34 is a sectional view of a zoom lens system according to Example 24 of the present invention.
Figure 34B:
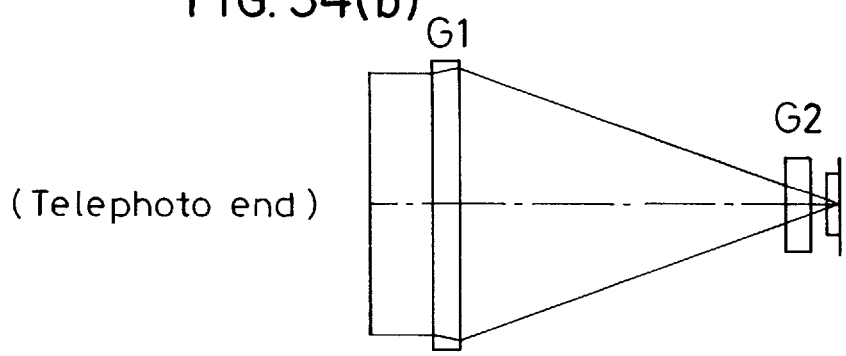

A first arrangement according to the present invention is applied to a case where a zoom lens system has, in order from the subject side, a positive lens unit and another positive lens unit. As shown in FIG. 34, which is a sectional view of Example 24 (described later), when zooming from a wide-angle end to a telephoto end is performed, a first lens unit G1 monotonously moves toward the subject side, whereas a second lens unit G2 monotonously moves away from the subject. Accordingly, it is necessary to prevent interference between the lens units at the wide-angle end and to ensure the required back focus at the telephoto end. Therefore, it is desirable for the zoom lens system having the first arrangement to satisfy the following condition:

$$0.2 < \alpha < 0.8 \qquad (4)$$

where $\alpha = \phi_1/\phi_2$, and $\phi_1$ and $\phi_2$ are the powers of the first and second lens units, respectively. If $\alpha$ is not smaller than the upper limit of the condition (4), i.e. 0.8, the back focus becomes excessively short at the telephoto end. Consequently, it becomes impossible to place an IRED. Moreover, the spacing between the lens units becomes excessively short at the wide-angle end. If $\alpha$ is not larger than the lower limit of the condition (4), i.e. 0.2, the power of the first lens unit undesirably weakens, and the amount of lens movement during zooming increases. This is unfavorable from the viewpoint of achieving a reduction in the size of the zoom lens system.

Figure 47A:
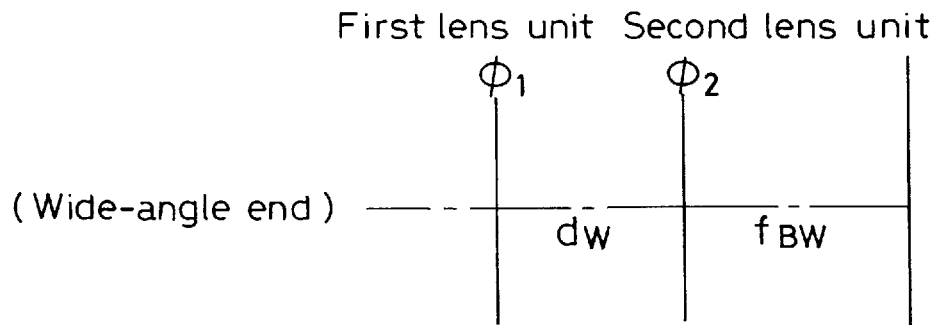
FIG. 47 is a diagram for describing the arrangement and operation of a two-unit zoom lens system.
Figure 47B:
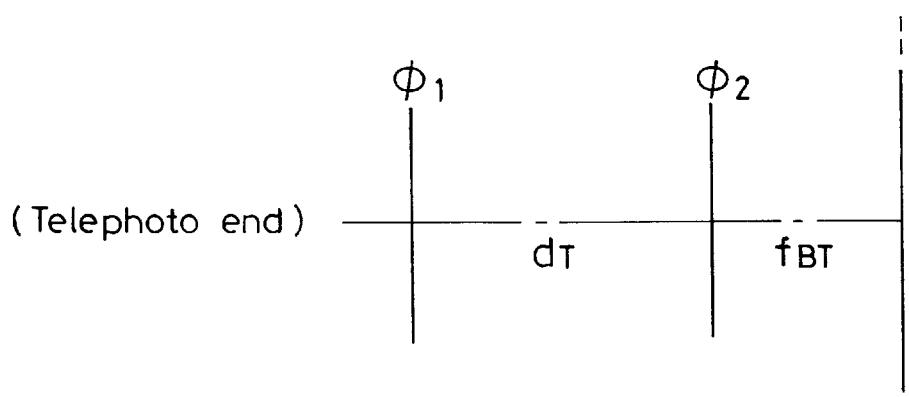

Let us assume that in a two-unit zoom lens system as shown in FIG. 47, the power of the first lens unit is $\phi_1$; the power of the second lens unit is $\phi_2$; the power of the entire system at the wide-angle end is $\phi_W$; the power of the entire system at the telephoto end is $\phi_T$; the spacing between the two lens units at the wide-angle end is $d_W$; and the spacing between the two lens units at the telephoto end is $d_T$. On this assumption, the following relationships hold:

$$\phi_W = \phi_1 + \phi_2 - d_W \cdot \phi_1 \cdot \phi_2 \qquad (i)$$

$$\phi_T = \phi_1 + \phi_2 31 \ d_T \cdot \phi_1 \cdot \phi_2 \qquad (j)$$

If $M=(\phi_W-\phi_T)/(d_W-d_T)$ and $\alpha=\phi_1/\phi_2$ are set and $f_{BW}$ and $f_{BT}$ denote the back focuses at the wide-angle and telephoto ends, respectively, the following equations are obtained from Eqs.(i) and (j):

$$d_W=-[-\phi_W\pm(1+\alpha)\cdot\{(-M)/\alpha\}^{1/2}]/M \qquad (k)$$

$$d_T=-[-\phi_T\pm(1+\alpha)\cdot\{(-M)/\alpha\}^{1/2}]/M \qquad (l)$$

$$f_{BW}=-[-\phi_W\pm\alpha\{(-M)/\alpha\}^{1/2}]\div[\pm\phi_W\{(-M)/\alpha\}^{1/2}] \qquad (m)$$

$$f_{BT}=-[-\phi_T\pm\alpha\{(-M)/\alpha\}^{1/2}]\div[\pm\phi_T\{(-M)/\alpha\}^{1/2}] \qquad (n)$$

The above Eqs.(k) to (n) determine ranges in which a zoom lens system can be actually constructed. In the case of the first arrangement, Eq.(k) determines a range in which the spacing between the two lens units at the wide-angle end can be ensured, and Eq.(n) determines a range in which the required back focus at the telephoto end can be ensured. In addition, it is desirable to satisfy the condition ④.

In the sectional view of FIG. 34, axial rays are depicted. As will be understood from the figure, the first lens unit G1 has an extremely large diameter for a bundle of rays at the telephoto end. In this case, it is desirable that both surfaces of the first lens unit G1 should be formed from diffraction surfaces, and that the subject-side surface should have a diverging action at the lens peripheral portion, and the surface on the side remote from the subject should have a converging action at the lens peripheral portion.

Figure 37A:
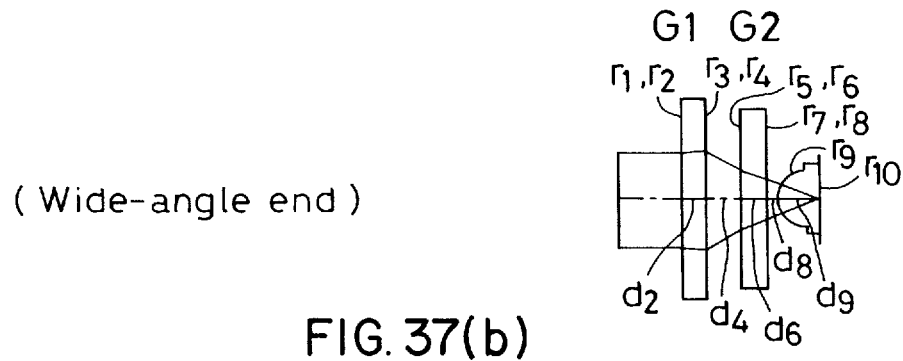
FIG. 37 is a sectional view of a zoom lens system according to Example 27 of the present invention.
Figure 37B:
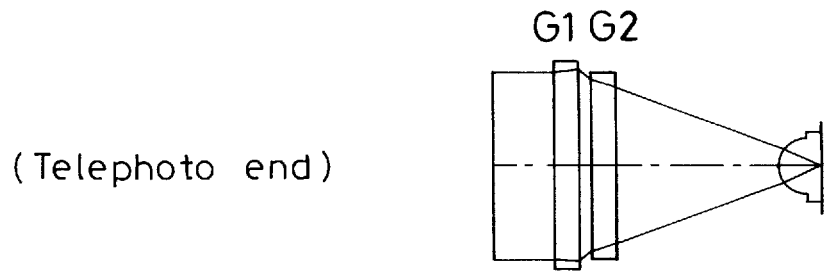

A second arrangement according to the present invention is applied to a case where a zoom lens system has, in order from the subject side, a positive lens unit and a negative lens unit. As shown in FIG. 37, which is the sectional view of Example 27 (described later), when zooming from the wide-angle end to the telephoto end is performed, both the first lens unit G1 and the second lens unit G2 monotonously move toward the subject side. The amount of movement of the second lens unit G2 is larger than that of the first lens unit G1. Accordingly, it is necessary to prevent interference between the two lens units at the telephoto end and to ensure the required back focus at the wide-angle end. Therefore, it is desirable for the zoom lens system having the second arrangement to satisfy the following condition:

$$-1.6<\alpha<-0.8 \qquad ⑤$$

If $\alpha$ is not smaller than the upper limit of the condition ⑤, i.e. −0.8, or not larger than the lower limit, i.e. −0.6, it is possible to ensure the required back focus at the wide-angle end, and it becomes difficult to ensure the required spacing between the two lens units at the telephoto end.

In this case also, it is desirable that both surfaces of the first lens unit G1 should be formed from diffraction surfaces, and that the subject-side surface should have a diverging action at the lens peripheral portion and the surface on the side remote from the subject should have a converging action at the lens peripheral portion. With this arrangement, a large projected light angle can be realized.

A third arrangement according to the present invention is applied to a case where a zoom lens system has, in order from the subject side, a negative lens unit and a positive lens unit. In this case, as shown in FIGS. 40 to 43 [i.e. the sectional views of Examples 30 to 33 (described later)], the movement of the first lens unit G1 differs according to the magnification of the second lens unit G2. When zooming from the wide-angle end to the telephoto end is performed, the second lens unit G2 monotonously moves toward the subject side. The third arrangement is characterized in that the back focus is extremely long over the entire zooming range. At the telephoto end, the first lens unit G1 and the second lens unit G2 are closest to each other. Accordingly, it is necessary to prevent interference between the two lens units at the telephoto end. Therefore, it is desirable for the zoom lens system having the third arrangement to satisfy the following condition:

$$-1.0<\alpha<-0.4 \qquad ⑥$$

If $\alpha$ is not smaller than the upper limit of the condition ⑥, i.e. −0.4, the spacing between the two lens units at the telephoto end becomes undesirably small. If $\alpha$ is not larger than the lower limit of the condition ⑥, i.e. −1.0, the spacing between the two lens units becomes excessively large. This is unfavorable from the viewpoint of achieving a reduction in the size.

Because of the long back focus, the third arrangement enables a mirror or the like to be provided between the second lens unit G2 and an IRED or a light-receiving element to bend the optical path.

Figure 48:
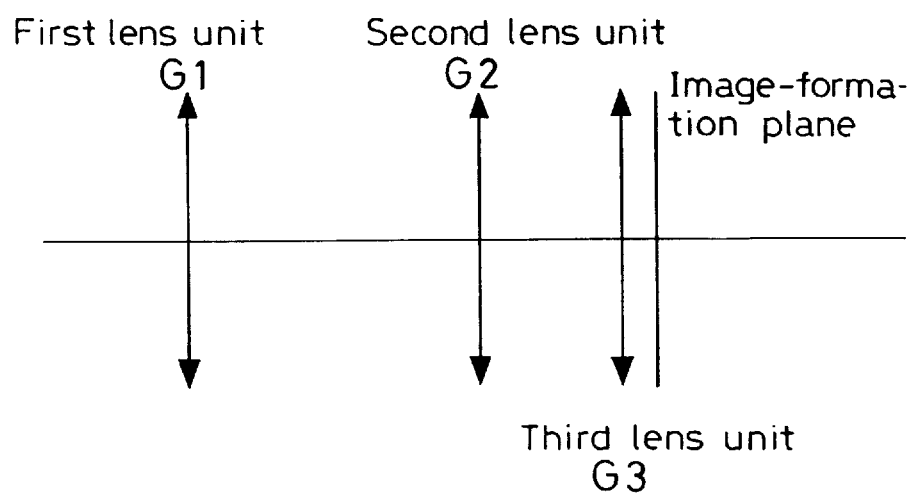
FIG. 48 is a diagram showing a lens unit configuration in a case where a zoom lens system according to the present invention is constructed as a three-unit zoom lens system.

Although the foregoing arrangements are two-unit zoom lens systems (respectively having, in order from the subject side, a positive lens unit and another positive lens unit; a positive lens unit and a negative lens unit; and a negative lens unit and a positive lens unit), the present invention is not necessarily limited thereto. For example, as shown in FIG. 48, a third lens unit G3 may be disposed between the second lens unit C2 and the image-formation plane. As the number of constituent lens units increases, the degree of freedom of power distribution to each lens unit increases. Therefore, even if a refracting lens is used as the third lens unit G3, the power of the lens can be weakened to minimize the thickness thereof. Thus, it is possible to use both a diffractive optical element and a refracting lens without obstructing the achievement of a compact distance measuring apparatus.

A photoetching method, an ultraprecision turning method, etc. are known as methods for producing lens systems for distance measurement designed according to the foregoing subject matter. In any of the production methods, the minimum grating pitch is important in processing or machining. In some Examples (described later), the minimum pitch is several micrometers or less. Therefore, difficulties in processing or machining are expected. To solve such a problem, it is desirable to use a higher order of diffracted light. As will be understood from Eq.(d), the angle $\theta'$ of diffracted light is determined by the order of diffraction and the pitch d. Accordingly, as the order of diffraction increases, the pitch d also increases. Therefore, in the case of the present invention, it is desirable that the diffractive optical element should have an area that satisfies the following condition:

$$2\leq|m|\leq30 \qquad ⑦$$

where m is the order of diffraction, which is positive in the case of a converging action.

The upper limit of the condition ⑦ is determined by constraints on the diffraction efficiency. In general, a diffraction efficiency of about 100% can be obtained for a design wavelength. However, the diffraction efficiency reduces when a working wavelength differs from the design wavelength. Therefore, the actually usable wavelength width with respect to the design wavelength is limited. As the order of diffraction increases, this tendency becomes more remarkable, and the usable wavelength width becomes narrower. In the case of IREDs generally used at present, the wavelength width is about ±20 nanometers, and with respect to the upper limit of the condition ⑦, the diffraction efficiency is approximately zero at both extremities of the wavelength width. Accordingly, if |m| exceeds the upper limit of the condition (7), i.e. 30, it becomes impossible to effectively use all the energy from the IRED. If |m| is smaller than the lower limit of the condition (7), i.e. 2, the order of diffraction is the fundamental order. Consequently, the minimum pitch becomes excessively small, and it becomes difficult to effect processing or machining.

There are some different types of IRED, and the emission wavelength differs for each type of IRED. To enable these different types of IRED to be used in common by the same DOE lens, the wavelength width needs to correspond to about ±40 nanometers. Under these circumstances, it is desirable to satisfy the following condition:

$$2 \leq |m| \leq 15 \quad (8)$$

With respect to the upper limit of the condition (8), i.e. 15, the diffraction efficiency becomes approximately zero at both extremities of the wavelength width.

It is also possible to form a DOE such that the whole DOE surface uses higher-order diffracted light so as to satisfy the condition (7). Alternatively, the arrangement may be such that the DOE surface is divided into a plurality of regions, and the working order of diffraction is varied for each region. As will be understood from Eq.(e), it is generally useful to use higher-order diffracted light at the peripheral portion of the DOE, where the pitch is relatively small.

Regarding the diffraction efficiency, as the working wavelength deviates from the design wavelength, unwanted orders of light other than the design order of diffracted light intensify. The focal length for each order of light is determined by the ratio of the design order and the unwanted order. Therefore, as the order of diffracted light used becomes higher, it becomes difficult to separate the design-order light and unwanted-order light, and the noise in the signal increases. In this regard also, it is preferable to satisfy the condition (8).

When there is a change in the wavelength characteristic of a light-emitting member, which is represented by an IRED, the condition (7) or (8) should be modified by applying the above-described concept.

Examples 1 to 33 of a lens system for distance measurement used in the distance measuring apparatus according to the present invention will be described below.

A diffraction surface of a lens system for distance measurement according to the present invention is designed by employing the ultra-high index method. More specifically, the diffraction surface is expressed as a diffractive lens having a thickness of zero and a refractive index of 1533 for a design wavelength of 900 nanometers. Accordingly, in numerical data (shown later) also, the diffraction surface is described as an ordinary aspherical surface as shown below. That is, assuming that the direction of an optical axis is a Z-axis and a direction perpendicular to the optical axis is a Y-axis, an aspherical surface is expressed by $$Z=CY^2/\{1+\sqrt{(1-C^2Y^2)}\}+A_4Y^4+A_6Y^6+A_8Y^8+A_{10}Y^{10} \quad (o)$$

where C is the curvature (=1/r; r is the radius of curvature) at the vertex of the surface, and $A_4$, $A_6$, $A_8$ and $A_{10}$ are 4th-, 6th-, 8th- and 10th-order aspherical coefficients, respectively.

A surface of thickness zero which is in contact with the diffraction surface is the surface of the base material constituting a DOE. In the actual production, a phase change is obtained from the difference between the aspherical configuration of the diffraction surface and the configuration of the base material surface and the refractive index, and the phase change is converted into a diffraction grating pitch. Then, a diffraction grating is formed on the base material surface on the basis of the diffraction grating pitch.

Figure 33A:
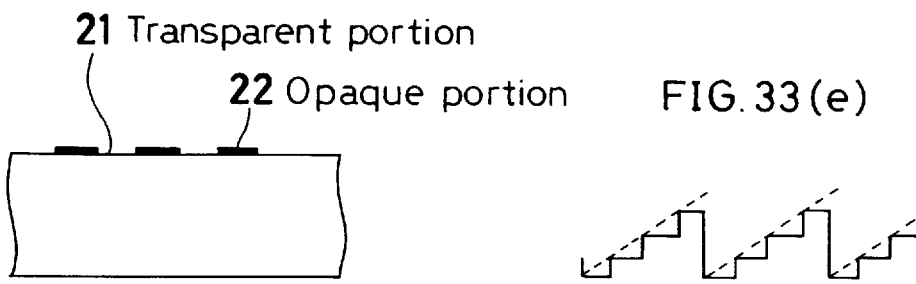
FIGS. 33(*a*), 33(*b*), 33(*c*), 33(*d*), 33(*e*) and 33(*f*) are sectional views illustrating specific configurations of diffraction surfaces used in the present invention.
Figure 33E:
Figure 33B:
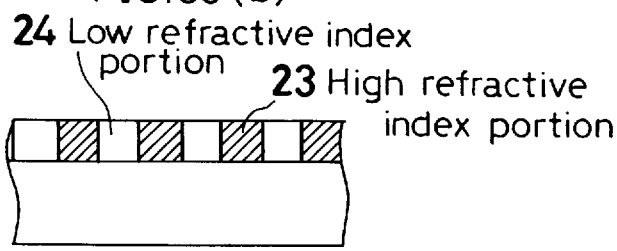
Figure 33F:
Figure 33C:
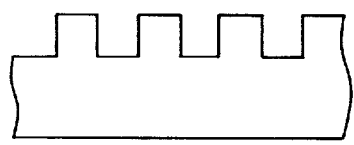
Figure 33D:

Specific examples of the diffraction surface configuration are shown in the sectional views of FIGS. 33(a) to 33(f). FIG. 33(a) shows a diffraction surface, known as "amplitude modulation type", in which transparent and opaque portions 21 and 22 are alternately arranged, and the thickness of the opaque portions 22 is approximately zero. In FIG. 33(b), portions of different refractive indices, i.e. high and low refractive index portions 23 and 24, are alternately arranged to provide a diffracting action by a phase difference produced by a difference in refractive index. In FIG. 33(c), rectangular recesses and projections are alternately arranged to provide a diffracting action by a phase difference produced by a difference in thickness. The DOE shown in FIG. 33(c) is also a binary optical element with 2 levels. FIG. 33(d) shows a DOE having a sawtooth surface, known as "kinoform", in which a diffracting action is provided by a phase difference produced by a continuous difference in thickness [see FIG. 3(a)]. FIGS. 33(e) and 33(f) show binary optical elements obtained by approximating a kinoform with 4 levels and 8 levels, respectively [see FIG. 3(b)]. Thus, there are some forms of diffraction surface configuration. In the present invention, however, it is desirable to use a kinoform as shown in FIG. 33(d) and binary optical elements with 4 or more levels as shown in FIG. 33(e) and 19(f) from the viewpoint of increasing the diffraction efficiency and effectively utilizing the light energy.

It should be noted that all Examples 1 to 13 are designed as a light-projecting lens system. The base material is an acrylic material, and the distance to the subject is set at 5 meters. Examples 14 to 23 are all designed as a light-projecting lens system. The base material is an acrylic material, and the IRED has a light-emitting portion covered with a resin package having a curvature.

Each of Examples will be described below. Numerical data will be shown later.

[EXAMPLE 1]

Figure 5:
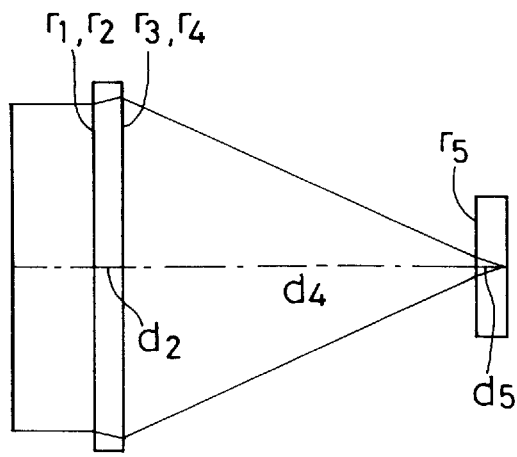
FIG. 5 is a sectional view of a lens system for distance measurement according to Example 1 of the present invention.

A sectional view of a lens system for distance measurement according to this example is shown in FIG. 5. This example is a plate lens having a thickness of 1 millimeter, in which all the power is concentrated on the surface $r_1$. The IRED has a light-emitting portion covered with a resin package having a plane surface. FIG. 5 shows rays at a projected light angle 0° in Example 1. It will be understood that the surface $r_1$ has all the positive power paraxially, but it has a strong diverging action at a peripheral portion thereof. It will be understood that the surface $r_4$ is paraxially powerless, but it has a strong converging action at a peripheral portion thereof. Accordingly, the surface $r_1$ has a configuration in which a negative power gradually becomes stronger as the distance from the center of the surface $r_1$ increases toward the periphery thereof. The surface $r_4$ has a configuration in which a positive power gradually becomes stronger as the distance from the center of the surface $r_4$ increases toward the periphery thereof.

[EXAMPLE 2]

A sectional view of a lens system for distance measurement according to this example is similar to FIG. 5. This example is also a plate lens having a thickness of 1 millimeter. All the power is concentrated on the surface $r_4$. The IRED is the same as that in Example 1. The surface $r_1$ is paraxially powerless, but it has a strong diverging action at a peripheral portion thereof. The surface $r_4$ has a strong positive power throughout its lens surface.

[EXAMPLE 3]

Figure 6:
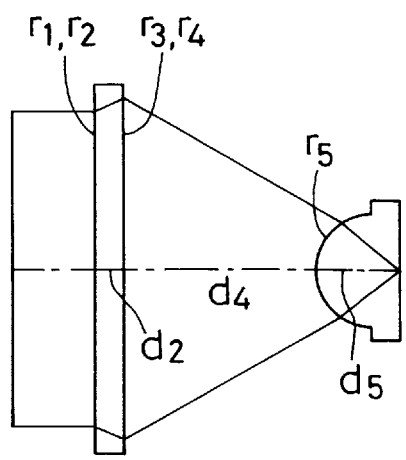
FIG. 6 is a sectional view of a lens system for distance measurement according to Example 3 of the present invention.

A sectional view of a lens system for distance measurement according to this example is shown in FIG. 6. This example is also a plate lens having a thickness of 1 millimeter. An IRED has a light-emitting portion covered with a resin package having a curvature. FIG. 6 shows rays at a projected light angle 0° in Example 3. Assuming that the overall power of the surfaces $r_1$ to $r_4$ is ø, the surface $r_1$ has a positive power of 1.5ø, and the surface $r_4$ has a negative power of −0.5ø. However, as will be understood from FIG. 6, the surface $r_1$ has a strong diverging action at a peripheral portion thereof although it has paraxially a positive power, and the surface $r_4$ has a strong converging action at a peripheral portion thereof although it has paraxially a negative power.

[EXAMPLE 4]

A sectional view of a lens system for distance measurement according to this example is similar to FIG. 6. This example is a plate lens having a thickness of 3 millimeters. It is intended to relieve distortion and deformation occurring during production by increasing the thickness of the plate lens. The IRED is the same as that in Example 3. With respect to the overall power ø of the surfaces $r_1$ to $r_4$, a power of about 0.5ø is equally distributed to each of the surfaces $r_1$ and $r_4$. Both the surfaces have paraxially a positive power, but the surface $r_1$ has a strong diverging action at a peripheral portion thereof, and the surface $r_4$ has a strong converging action at a peripheral portion thereof.

[EXAMPLE 5]

A sectional view of a lens system for distance measurement according to this example is similar to FIG. 6. This example is also a plate lens having a thickness of 1 millimeter. The IRED is the same as that in Example 3. With respect to the overall power ø of the surfaces $r_1$ to $r_4$, the surface $r_1$ has a power of about −0.5ø, and the surface $r_4$ has a power of 1.5ø. The surface $r_1$ has a strong diverging action throughout its lens surface. The surface $r_4$ has a strong converging action throughout its lens surface.

[EXAMPLE 6]

Figure 7:
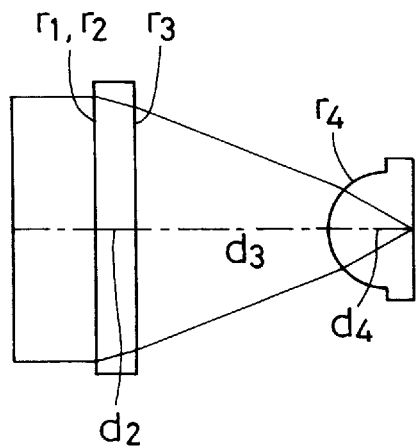
FIG. 7 is a sectional view of a lens system for distance measurement according to Example 6 of the present invention.

A sectional view of a lens system for distance measurement according to this example is shown in FIG. 7. This example is a plate lens having a thickness of 1.5 millimeters. The IRED is the same as that in Example 3. In this example, the surface $r_1$ is a diffraction surface, and the surface $r_3$ is a refracting surface formed from an aspherical surface. FIG. 7 shows rays at a projected light angle 0° in Example 6. In this example, all the power is concentrated on the surface $r_1$. Therefore, comatic aberration produced by the surface $r_3$ cannot be corrected, and hence the usable projected light angle is small. However, because the correction of spherical aberration is easy, the surface $r_1$ has a converging action throughout its lens surface.

[EXAMPLE 7]

Figure 8:
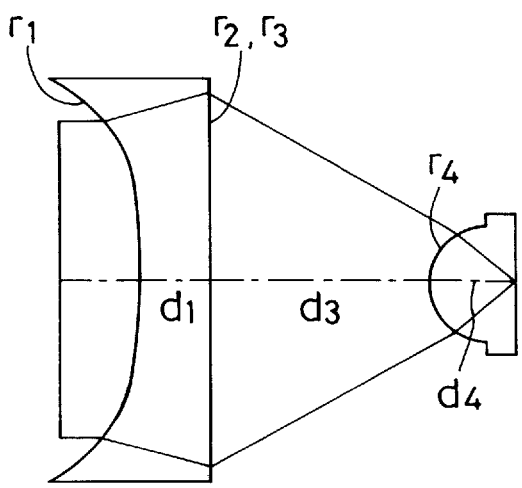
FIG. 8 is a sectional view of a lens system for distance measurement according to Example 7 of the present invention.

A sectional view of a lens system for distance measurement according to this example is shown in FIG. 8. This example is a plate lens having a thickness of 2.5 millimeters. The IRED is the same as that in Example 3. In this example, the surface $r_1$ is a refracting surface formed from an aspherical surface, and the surface $r_3$ is a diffraction surface. FIG. 8 shows rays at a projected light angle 0°. In this example, all the power is concentrated on the surface $r_3$. The surface $r_3$ has a converging action even at a peripheral portion thereof. The surface $r_1$ has an aspherical surface configuration that has a concave surface directed toward the subject side so that it has a diverging action at a peripheral portion thereof to correct spherical aberration.

[EXAMPLE 8]

Figure 9:
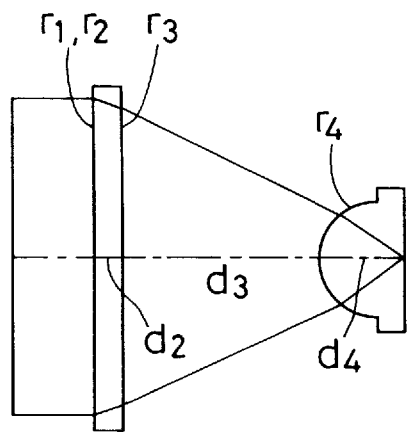
FIG. 9 is a sectional view of a lens system for distance measurement according to Example 8 of the present invention.

A sectional view of a lens system for distance measurement according to this example is shown in FIG. 9. This example is a plate lens having a thickness of 1 millimeter. The IRED is the same as that in Example 3. In this example, the surface $r_1$ is a diffraction surface, on which all the power is concentrated. The surface $r_3$ is merely a plane surface. FIG. 9 shows rays at a projected light angle 0° in Example 8. In this example, the usable projected light angle is small because comatic aberration produced by the surface $r_3$ cannot be corrected. However, the surface $r_1$ has a converging action throughout its lens surface.

[EXAMPLE 9]

Figure 10:
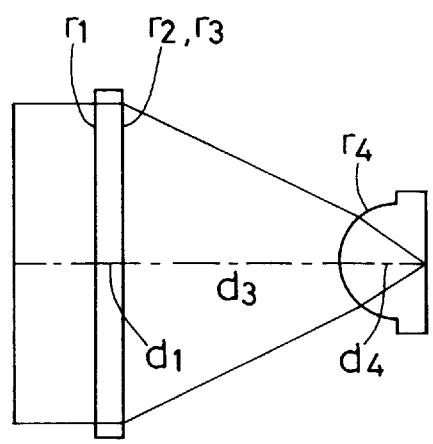
FIG. 10 is a sectional view of a lens system for distance measurement according to Example 9 of the present invention.

A sectional view of a lens system for distance measurement according to this example is shown in FIG. 10. This example is also a plate lens having a thickness of 1 millimeter. The IRED is the same as that in Example 3. In this example, the surface $r_3$ is a diffraction surface, on which all the power is concentrated. The surface $r_1$ is merely a plane surface. FIG. 10 shows rays at a projected light angle 0° in Example 9. In this example, spherical aberration, which undesirably increases when comatic aberration produced by the surface $r_3$ is corrected, cannot be corrected by the surface $r_1$. Therefore, the usable projected light angle is particularly small. However, the surface $r_3$ has a converging action throughout its lens surface.

[EXAMPLE 10]

Figure 11:
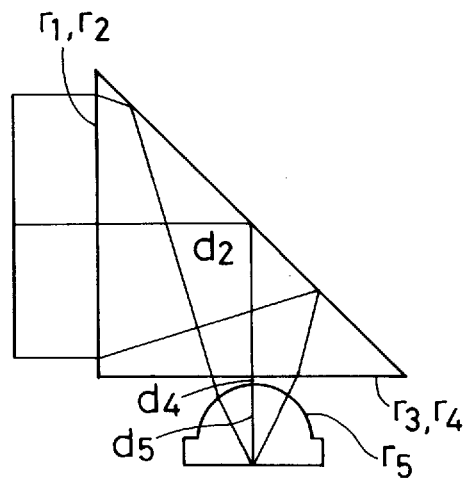
FIG. 11 is a sectional view of a lens system for distance measurement according to Example 10 of the present invention.

A sectional view of a lens system for distance measurement according to this example is shown in FIG. 11. This example is a prism lens having a thickness of 11 millimeters. Both the entrance and exit surfaces of the prism are formed from diffraction surfaces. The IRED is the same as that in Example 3. With respect to the overall power ø of the surfaces $r_1$ to $r_4$, the surface $r_1$ has a positive power of 1.3ø, and the surface $r_4$ has a negative power of −0.96ø. FIG. 11 shows rays at a projected light angle 0° in Example 10. The surface $r_1$ has a converging action throughout its lens surface. The surface $r_4$ has paraxially a negative power, but it has a converging action at a peripheral portion thereof.

[EXAMPLE 11]

Figure 12:
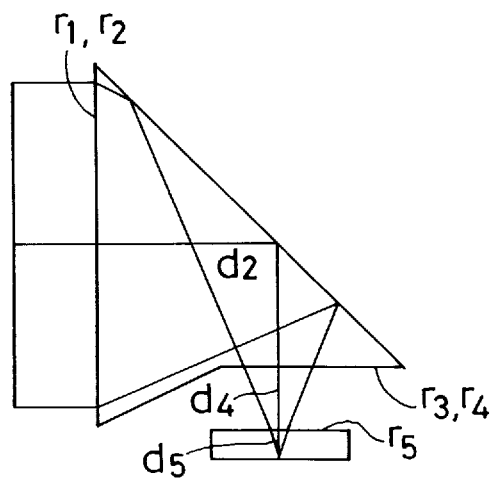
FIG. 12 is a sectional view of a lens system for distance measurement according to Example 11 of the present invention.

A sectional view of a lens system for distance measurement according to this example is shown in FIG. 12. This example is also a prism lens having a thickness of 11 millimeters. The IRED is the same as that in Example 1. With respect to the overall power ø of the surfaces $r_1$ to $r_4$, the surface $r_1$ has a positive power of 1.5ø, and the surface $r_4$ has a negative power of −2.4ø. FIG. 12 shows rays at a projected light angle 0° in Example 11. The surface $r_1$ has a converging action throughout its lens surface. The surface $r_4$ has paraxially a negative power, but it has a converging action at a peripheral portion thereof.

[EXAMPLE 12]

A sectional view of a lens system for distance measurement according to this example is similar to FIG. 11. This example is a prism lens having a thickness of 11 millimeters. The IRED is the same as that in Example 16. All the power is concentrated on the surface $r_1$. Accordingly, the surface $r_1$ has a converging action throughout its lens surface. The surface $r_4$ is paraxially powerless, but it has a converging action at a peripheral portion thereof.

[EXAMPLE 13]

Figure 13:
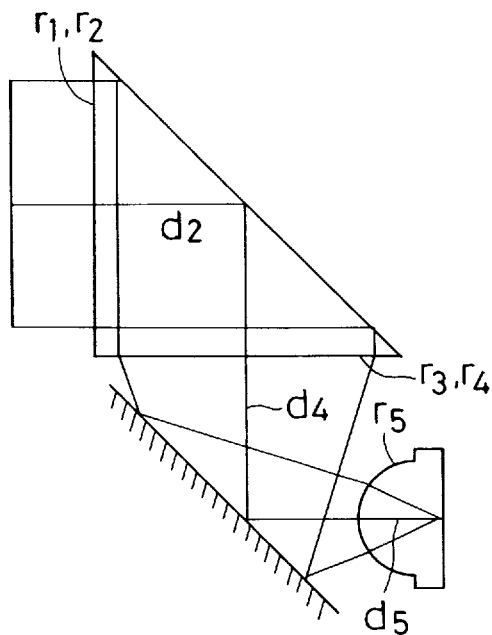
FIG. 13 is a sectional view of a lens system for distance measurement according to Example 13 of the present invention.
Figures 14A, 14B, 14C:
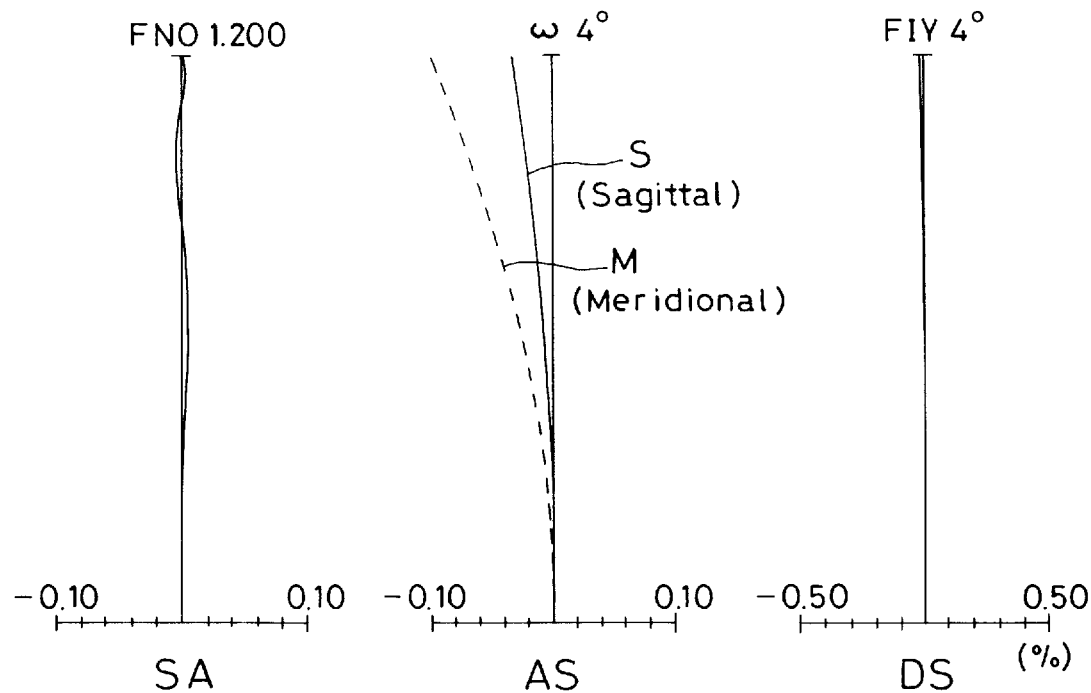
FIG. 14 graphically shows aberrations in Example 1.
Figure 15A:
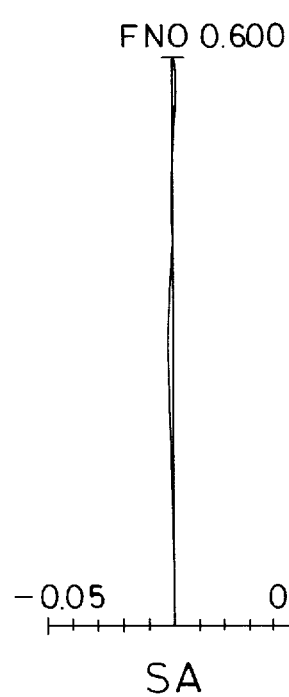
FIG. 15 graphically shows aberrations in Example 6.
Figure 15B:
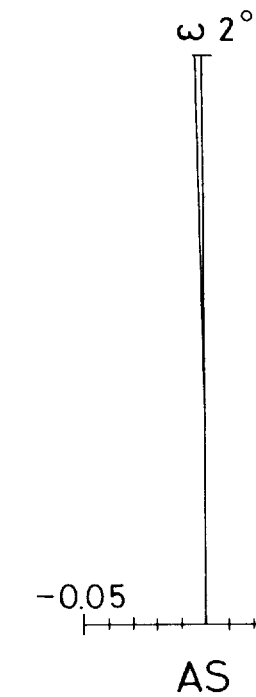
Figure 15C:
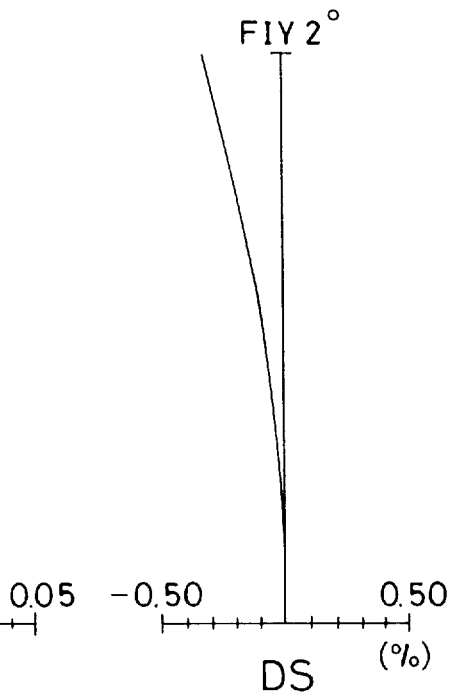
Figure 16A:
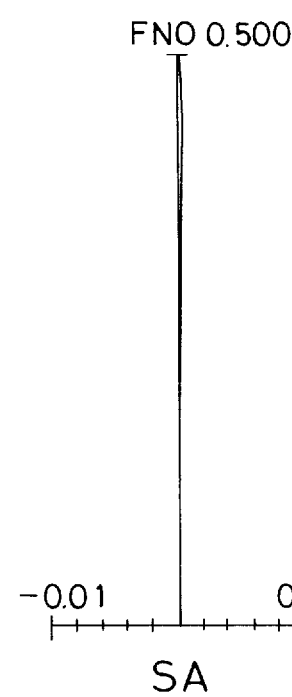
FIG. 16 graphically shows aberrations in Example 8.
Figure 16B:
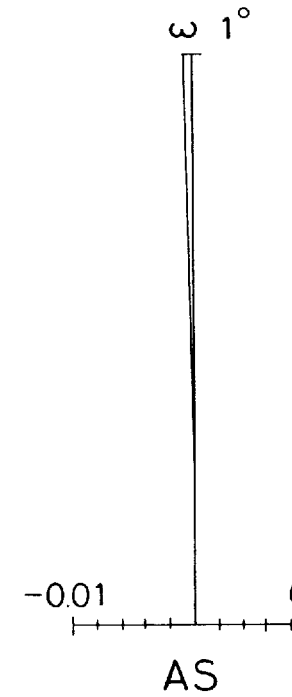
Figure 16C:
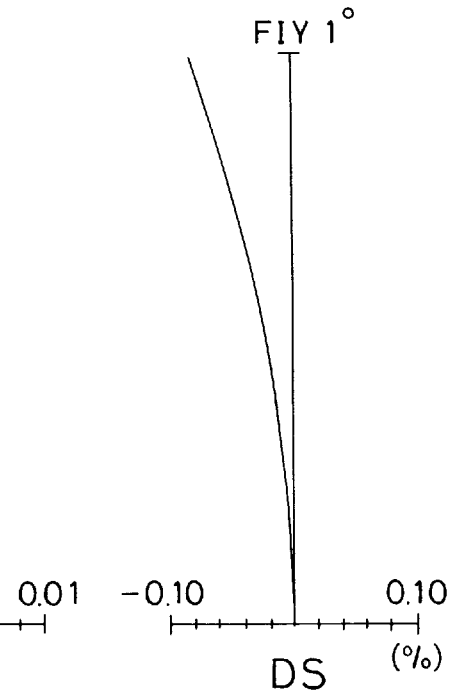
Figure 17A:
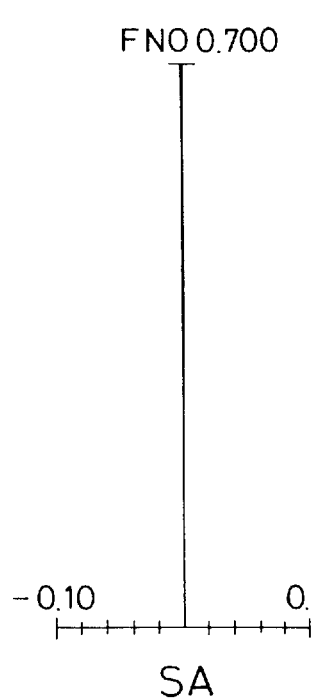
FIG. 17 graphically shows aberrations in Example 10.
Figure 17B:
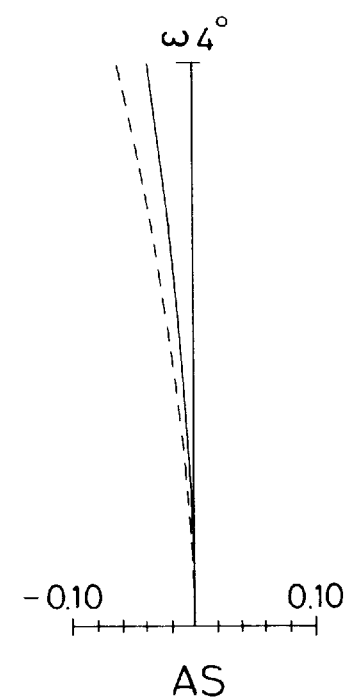
Figure 17C:
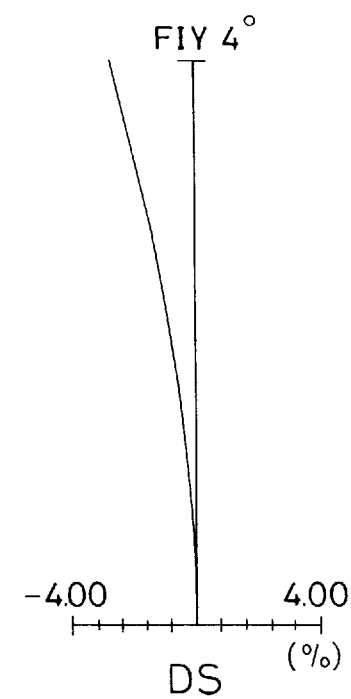
Figure 18:
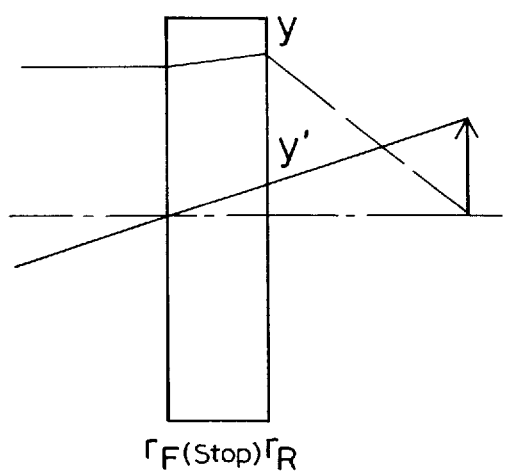
FIG. 18 is a diagram for describing aberration correction by a diffractive optical element in a fifth distance measuring apparatus according to the present invention.

A sectional view of a lens system for distance measurement according to this example is shown in FIG. 13. This example is a prism lens having a thickness of 11 millimeters. The IRED is the same as that in Example 16. All the power is concentrated on the surface $r_4$. FIG. 13 shows rays at a projected light angle 0° in Example 13. In this example, a long back focus can be obtained. Therefore, it is possible to dispose a reflecting member or the like between the surfaces $r_4$ and $r_5$. The surface $r_1$ is paraxially powerless, but it has a diverging action at a peripheral portion thereof. The surface $r_4$ has a converging action throughout its lens surface.

[EXAMPLE 14]

Figure 20A:
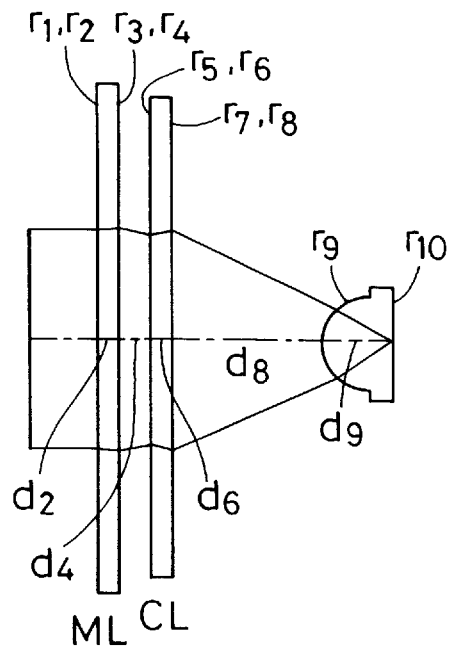
FIGS. 20(*a*) and 20(*b*) are sectional views of a lens system for distance measurement according to Example 14 of the present invention.
Figure 20B:
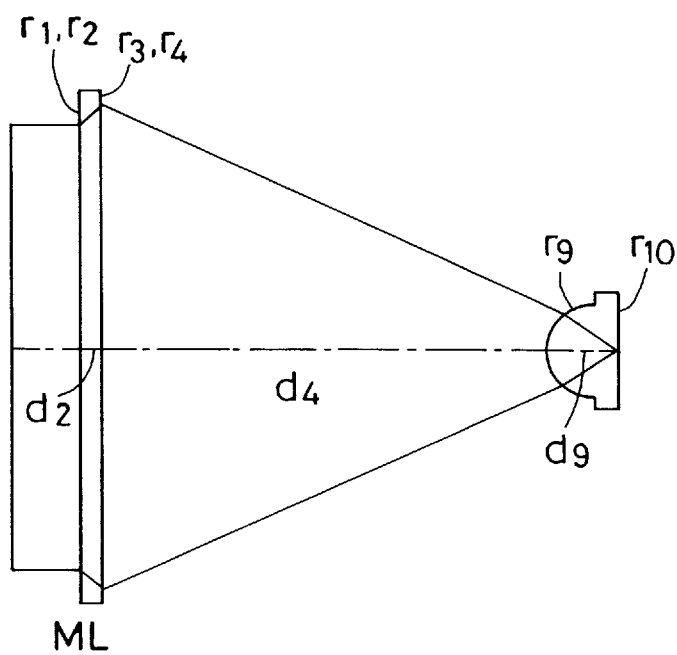

FIGS. 20(a) and 20(b) are sectional views of Example 14, showing rays at a projected light angle 0°. FIG. 20(a) shows Example 14 in a wide-angle position, and FIG. 20(b) shows Example 14 in a telephoto position (the same shall apply hereinafter). In this example, a converter lens CL of positive power is added to the IRED side of a master lens ML (telephoto lens) to realize a wide-angle position.

In this example, the master lens ML and the converter lens CL are each formed from a single plate lens. Each DOE has diffraction surfaces on both sides thereof, and the overall power is equally distributed to the two surfaces. However, the power distribution is not necessarily limited to that in this example. The overall power may be concentrated on one surface. Alternatively, a positive power and a negative power may be combined appropriately. This example enables the power distribution to be changed without considerably changing the aberration correcting action and effect.

As a result, a variable-magnification lens for such an active-type distance measuring lens that the projected light angle exceeds 6° can be realized by two plate lenses. As will be understood from the ray diagram, the subject-side surface has a strong diverging action at a lens peripheral portion thereof, and the IRED-side surface has a strong converging action at a lens peripheral portion thereof. In other words, large spherical aberrations of different signs occur at both surfaces of the master lens ML, and these spherical aberrations cancel each other. For this reason, an extremely rigorous accuracy is required for the relative decentration of the two surfaces.

[EXAMPLE 15]

Figure 21A:
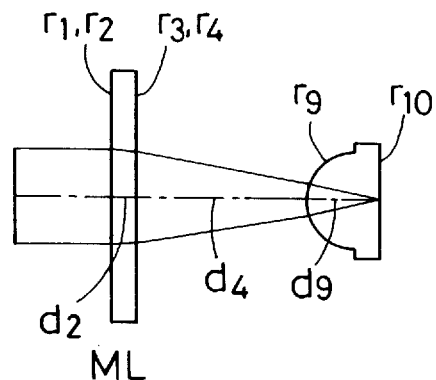
FIGS. 21(*a*) and 21(*b*) are sectional views of a lens system for distance measurement according to Example 15 of the present invention.
Figure 21B:
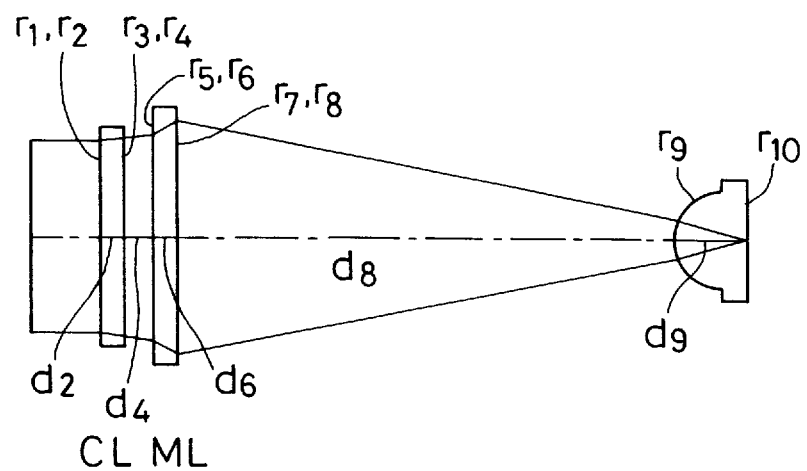

FIGS. 21(a) and 21(b) are sectional views of Example 15, showing rays at a projected light angle 0°. In this example, a converter lens CL of negative power is added to the subject side of a master lens ML (wide-angle lens) to realize a telephoto position. In this example also, the master lens ML and the converter lens CL are each formed from a single plate lens. Each DOE has diffraction surfaces on both sides thereof, and the overall power is equally distributed to the two surfaces. However, the power distribution may be changed as desired as in the case of Example 14.

As a result, a variable-magnification lens for an active-type distance measuring lens having a projected light angle of about 30 is realized by two plate lenses.

[EXAMPLE 16]

Figure 22A:
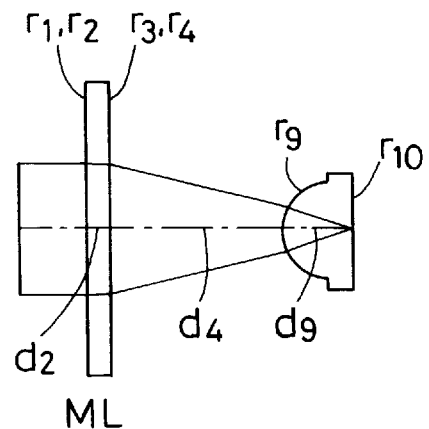
FIGS. 22(*a*) and 22(*b*) are sectional views of a lens system for distance measurement according to Example 16 of the present invention.
Figure 22B:
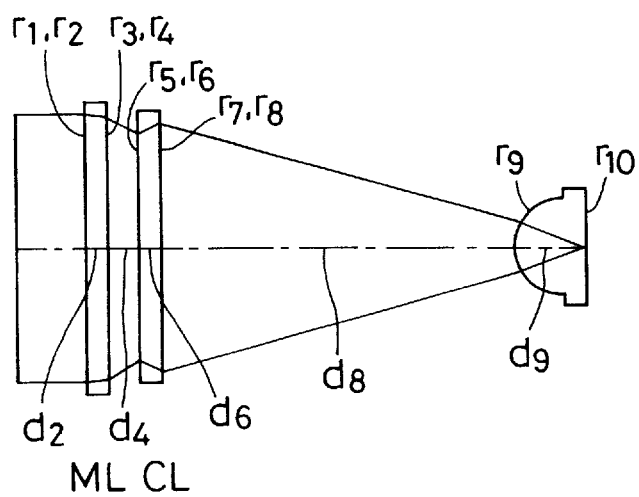

FIGS. 22(a) and 22(b) are sectional views of Example 16, showing rays at a projected light angle 0°. In this example, a converter lens CL of negative power is added to the IRED side of a master lens ML (wide-angle lens) to realize a telephoto position. In this example also, the master lens ML and the converter lens CL are each formed from a single plate lens. Each DOE has diffraction surfaces on both sides thereof, and the overall power is equally distributed to the two surfaces. However, the power distribution may be changed as desired as in the case of Example 14.

As a result, a variable-magnification lens for an active-type distance measuring lens having a projected light angle of about 3° is realized by two plate lenses. As will be understood from the ray diagram, in this example a peripheral portion of the converter lens CL is arranged to have a combination of a strong diverging action and a strong converging action. Consequently, a somewhat rigorous accuracy is required for the relative decentration of the two surfaces, although it is not so rigorous as in Example 14.

[EXAMPLE 17]

Figure 23A:
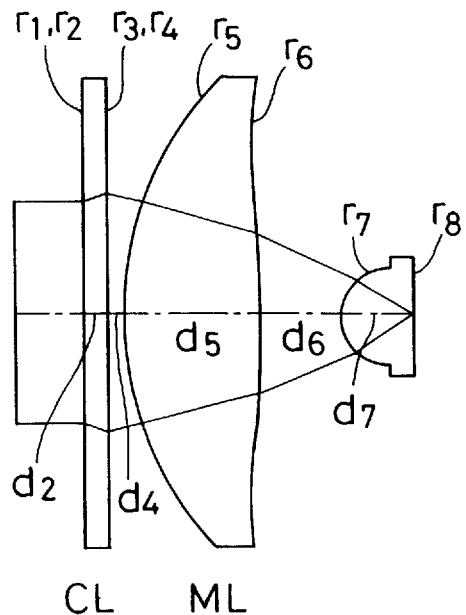
FIGS. 23(*a*) and 23(*b*) are sectional views of a lens system for distance measurement according to Example 17 of the present invention.
Figure 23B:
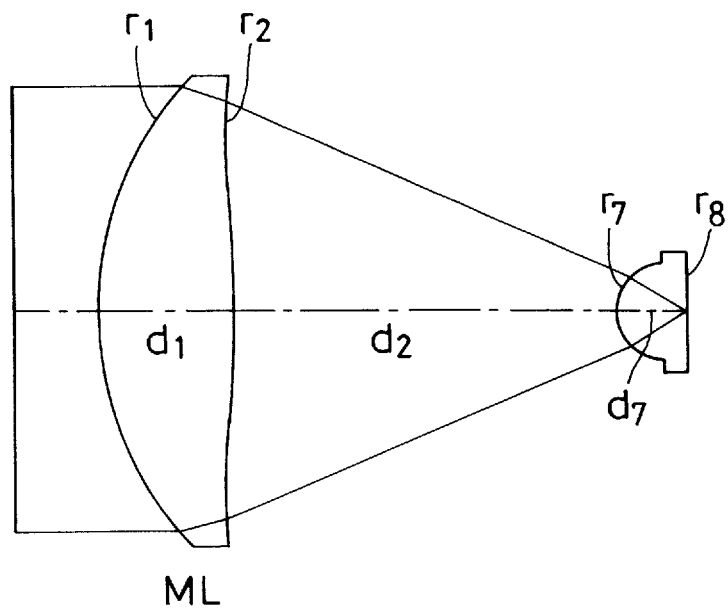

FIGS. 23(a) and 23(b) are sectional views of Example 17, showing rays at a projected light angle 0°. In this example, a converter lens CL of positive power is added to the subject side of a master lens ML (telephoto lens) to realize a wide-angle position. In this example, the master lens ML is a conventional aspherical lens using a refracting action, and the converter lens CL is formed by using a single plate lens. The DOE has diffraction surfaces on both sides thereof, and the overall power is equally distributed to the two surfaces. However, the power distribution may be changed as desired as in the case of Example 14. By forming the master lens ML from a lens having a refracting action. it is possible to correct comatic aberration by appropriately setting the curvature of each surface. Accordingly, it becomes unnecessary to particularly increase the spherical aberration, and the decentration accuracy required for the master lens ML can be eased. However, this arrangement is disadvantageous to achievement of space savings. Therefore, it is desirable to form the converter lens CL from a DOE to thereby achieve space savings. It should be noted that the decentration accuracy required for the two surfaces of the converter lens CL may be on the normal level because the converter lens CL does not produce a large spherical aberration.

As a result, it is possible to realize a variable-magnification lens for an active-type distance measuring lens having a projected light angle of about 5°.

[EXAMPLE 18]

Figure 24A:
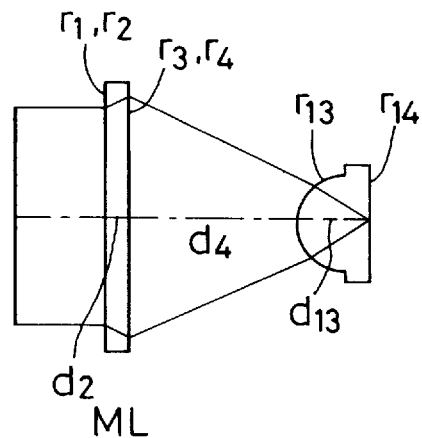
FIGS. 24(*a*) and 24(*b*) are sectional views of a lens system for distance measurement according to Example 18 of the present invention.
Figure 24B:
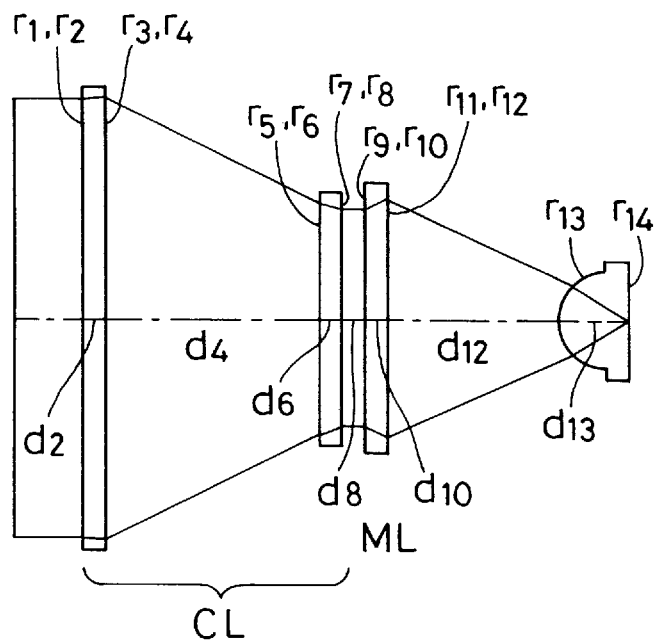

FIGS. 24(a) and 24(b) are sectional views of Example 18, showing rays at a projected light angle 0°. In this example, an afocal converter lens CL consisting essentially of a positive lens and a negative lens is added to the subject side of a master lens ML (wide-angle lens) to realize a telephoto position. In this example, the master lens ML is formed from a single plate lens, and the converter lens CL is formed from two plate lenses. All the DOEs have diffraction surfaces on both sides thereof. Each DOE is arranged such that the overall power is equally distributed to the two surfaces. However, the power distribution may be changed as desired as in the case of Example 14. In this example, because the afocal converter lens CL is used, the master lens ML need not be moved when a magnification change is made. Therefore, it is possible to simplify the mechanism for effecting a magnification change. This is effective in not only saving the space occupied by the lens but also reducing the number of mechanical components and thus achieving space savings. Although the lens system according to this example is designed for an infinite object point, the arrangement can be readily changed for any finite object point. Even if the converter lens CL slightly deviates from the afocal system configuration, it is essentially included in this example, as a matter of course.

As a result, a variable-magnification lens for an active-type distance measuring lens having a projected light angle of about 4° is realized by three plate lenses. When a magnification change is made, the master lens ML remains fixed.

[EXAMPLE 19]

Figure 25A:
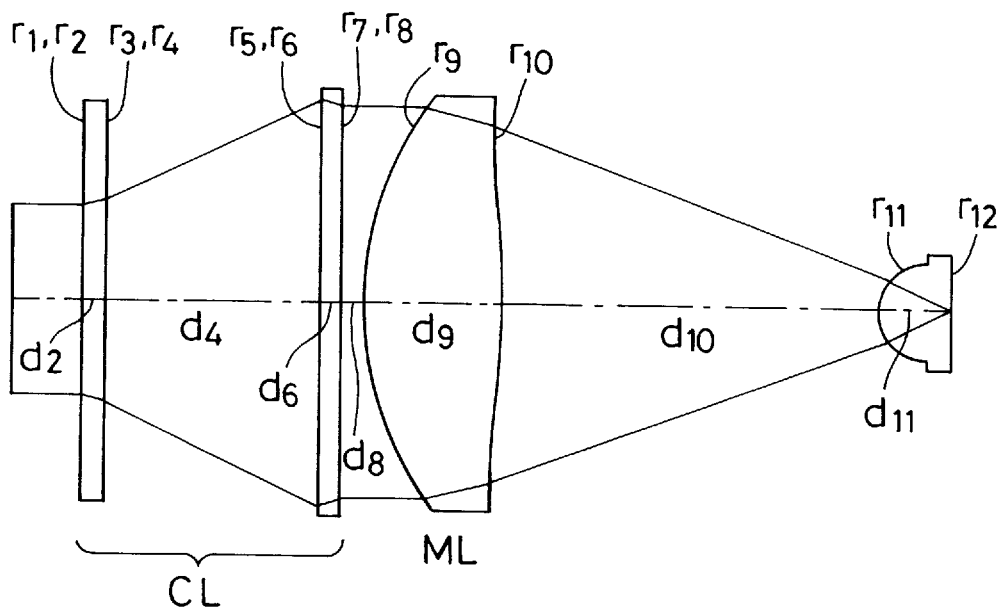
FIGS. 25(*a*) and 25(*b*) are sectional views of a lens system for distance measurement according to Example 19 of the present invention.
Figure 25B:
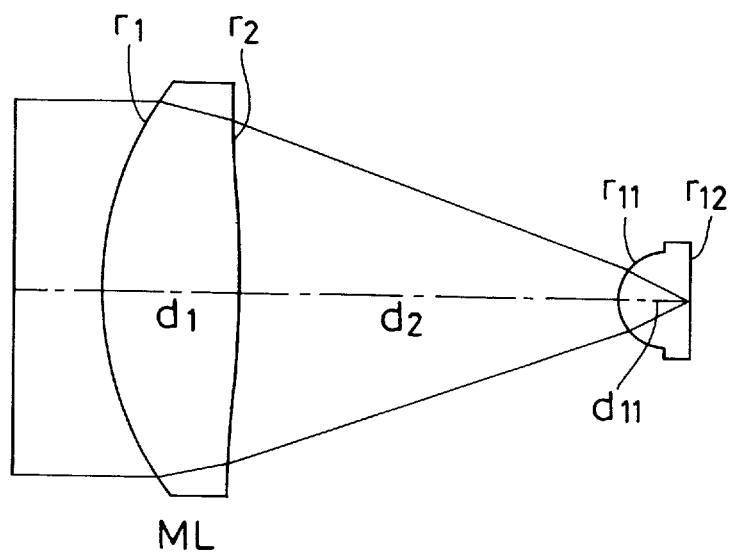

FIGS. 25(a) and 25(b) are sectional views of Example 19, showing rays at a projected light angle 0°. In this example, an afocal converter lens CL consisting essentially of a negative lens and a positive lens is added to the subject side of a master lens ML (telephoto lens) to realize a wide-angle position. In this example, the master lens ML is formed from a single aspherical lens using a refracting action, and the converter lens CL is formed from two plate lenses. All the DOEs have diffraction surfaces on both sides thereof. Each DOE is arranged such that the overall power is equally distributed to the two surfaces. However, the power distribution may be changed as desired as in the case of Example 14. In this example, the master lens ML may be kept fixed when a magnification change is made as in the case of Example 18.

As has been stated with respect to Example 14, when a telephoto master lens is formed from a DOE, the decentration accuracy of the two surfaces becomes rigorous from the viewpoint of aberration correction. If the master lens ML alone is formed by using a conventional refracting lens as in the present invention, the decentration accuracy can be eased. This is advantageous in production of the lens system. However, it is desirable from the viewpoint of saving the space occupied by the lens system to use a DOE to constitute the converter lens CL, which requires a less rigorous decentration accuracy.

As a result, a variable-magnification lens for an active-type distance measuring lens having a projected light angle of about 4° is realized by a combination of a single refracting lens and two plate lenses. The master lens ML need not be moved when a magnification change is made.

[EXAMPLE 20]

Figure 26A:
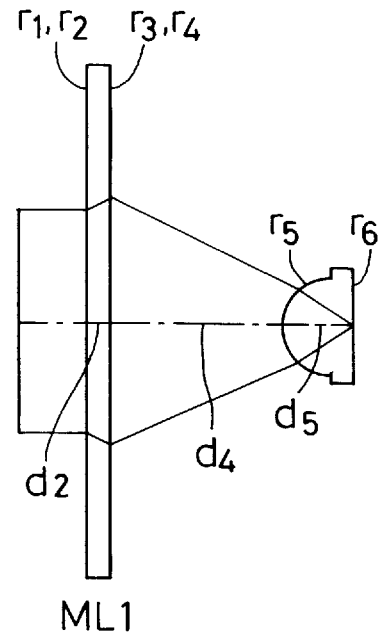
FIGS. 26(*a*) and 26(*b*) are sectional views of a lens system for distance measurement according to Example 20 of the present invention.
Figure 26B:
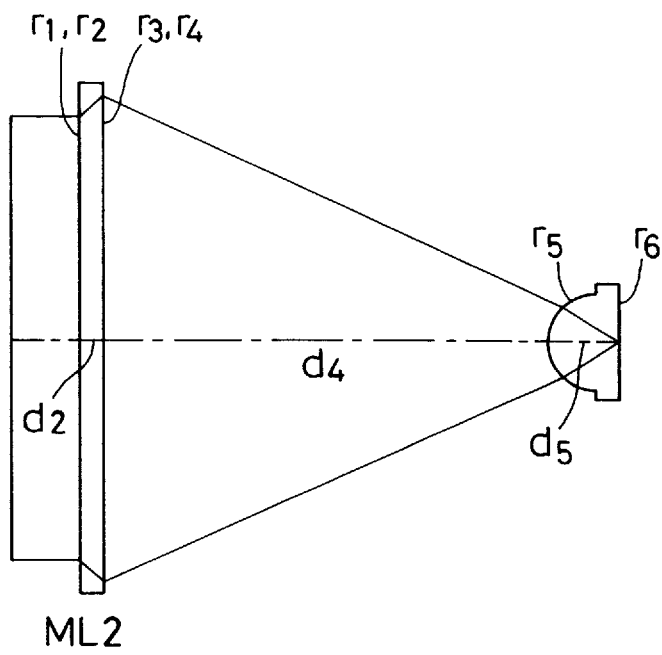

FIGS. 26(a) and 26(b) are sectional views of Example 20, showing rays at a projected light angle 0°. In this example, two master lenses ML1 and ML2 (wide-angle lens and telephoto lens) are changed from one to another to realize a magnification change. In this example, the master lenses ML1 and ML2 are each formed from a single plate lens. All the DOEs have diffraction surfaces on both sides thereof. Each DOE is arranged such that the overall power is equally distributed to the two surfaces. However, the power distribution may be changed as desired as in the case of Example 14. In comparison to a converter system such as that in Example 14, there is no need of lens movement in the optical axis direction, and the two plate lenses ML1 and ML2 are simply changed from one to another. Therefore, the mechanism can be simplified.

As a result, a variable-magnification lens for an active-type distance measuring lens having a projected light angle of about 4° is realized by two plate lenses, and the lens moving mechanism can be simplified. However, regarding the telephoto master lens ML2, an extremely rigorous accuracy is required for the relative decentration of the two surfaces from the viewpoint of aberration correction.

[EXAMPLE 21]

Figure 27A:
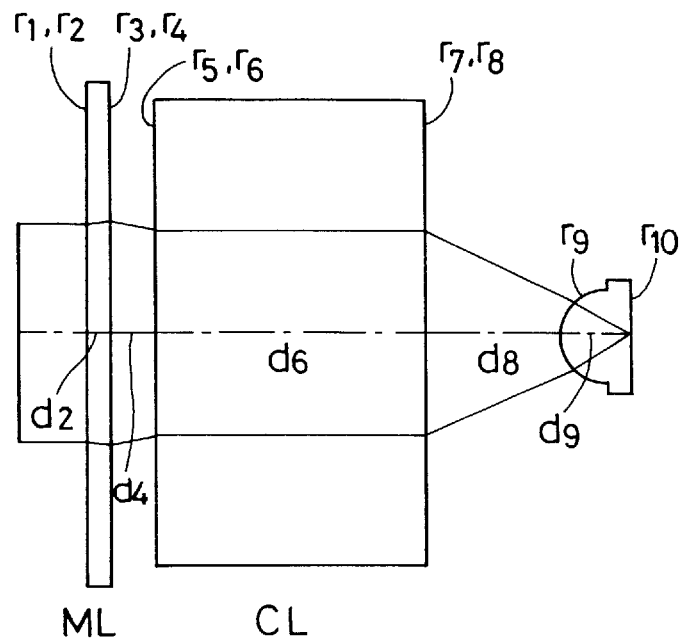
FIGS. 27(*a*) and 27(*b*) are sectional views of a lens system for distance measurement according to Example 21 of the present invention.
Figure 27B:
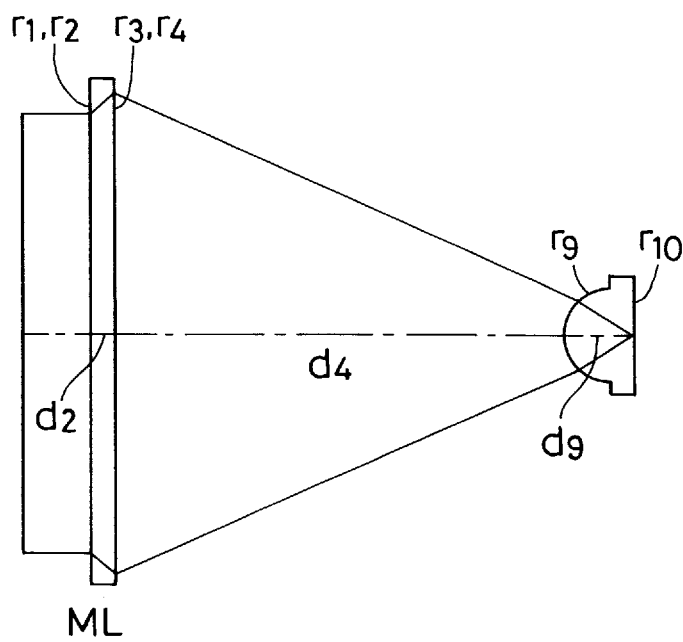

FIGS. 27(a) and 27(b) are sectional views of Example 21, showing rays at a projected light angle 0°. In this example, a converter lens CL of positive power is added to the IRED side of a master lens ML (telephoto lens) to realize a wide-angle position as in the case of Example 14. In this example, the master lens ML and the converter lens CL are each formed from a single plate lens. All the DOEs have diffraction surfaces on both sides thereof. In the master lens ML, the IRED-side surface has all the power, and the subject-side surface is paraxially powerless. In the converter lens CL, the subject-side surface has a negative power, and the IRED-side surface has a positive power. The distribution of these powers can be changed as desired.

An important feature of this example resides in that the master lens ML need not be moved when a magnification change is made despite a wide-angle rear converter. The lens system according to this example is based on the principle as has been stated with reference to FIGS. 19(a) and 19(b). This example is favorable from the viewpoint of simplifying the mechanism and achieving space savings because a magnification change can be made simply by loading or unloading the converter lens CL without a need of movement in the optical axis direction.

As a result, a variable-magnification lens for an active-type distance measuring lens having a projected light angle of about 5° is realized by two plate lenses. Moreover, the master lens ML need not be moved when a magnification change is made. As will be understood from the ray diagram, in this example the master lens ML has a combination of a strong diverging action and a strong converging action from the viewpoint of aberration correction. Therefore, a rigorous accuracy is required for the relative decentration of the two surfaces of the master lens ML.

[EXAMPLE 22]

Figure 28A:
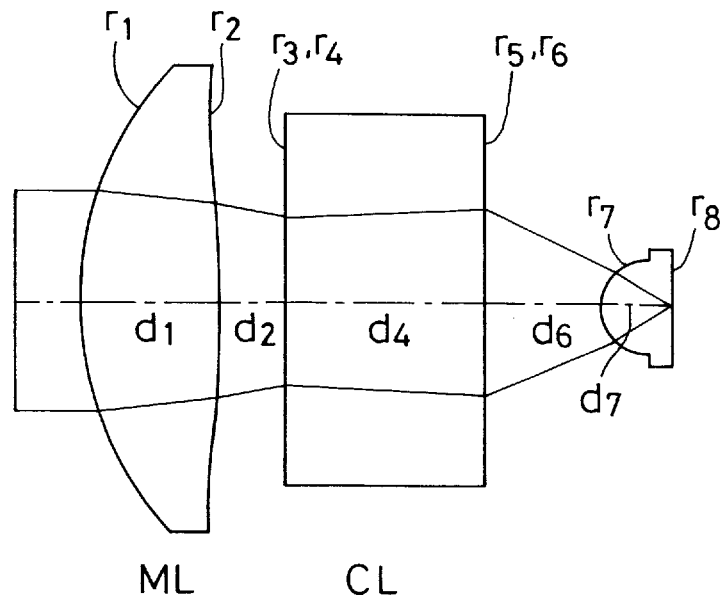
FIGS. 28(*a*) and 28(*b*) are sectional views of a lens system for distance measurement according to Example 22 of the present invention.
Figure 28B:
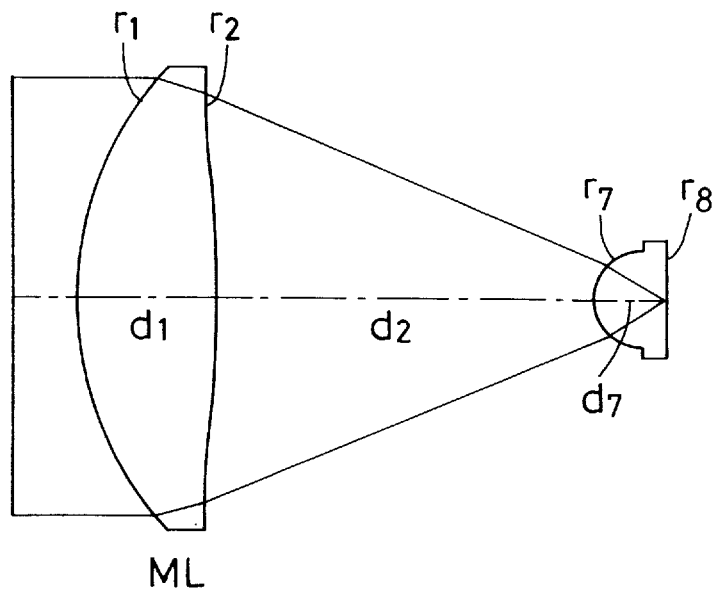

FIGS. 28(a) and 28(b) are sectional views of Example 22, showing rays at a projected light angle 0°. The arrangement of this example is similar to that of Example 21. In this example, a master lens ML is formed from an aspherical lens having a refracting action, and a converter lens CL is formed from a single plate lens. The use of a lens having a refracting action eases the decentration accuracy required for the master lens ML. However, it is desirable to form the converter lens CL from a DOE from the viewpoint of achieving space savings.

As a result, a variable-magnification lens for an active-type distance measuring lens having a projected light angle of about 4° is realized by a combination of a single refracting lens and a single plate lens. Moreover, the master lens ML need not be moved when a magnification change is made.

[EXAMPLE 23]

Figure 29A:
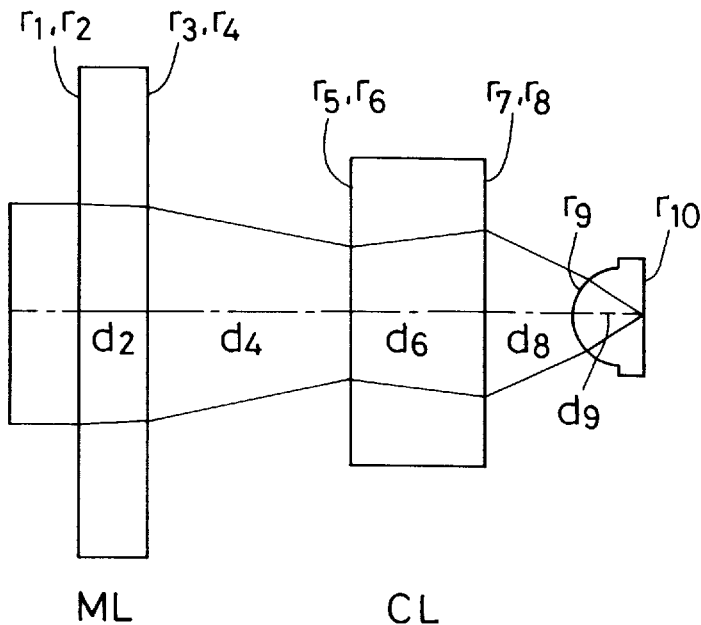
FIGS. 29(*a*) and 29(*b*) are sectional views of a lens system for distance measurement according to Example 23 of the present invention.
Figure 29B:
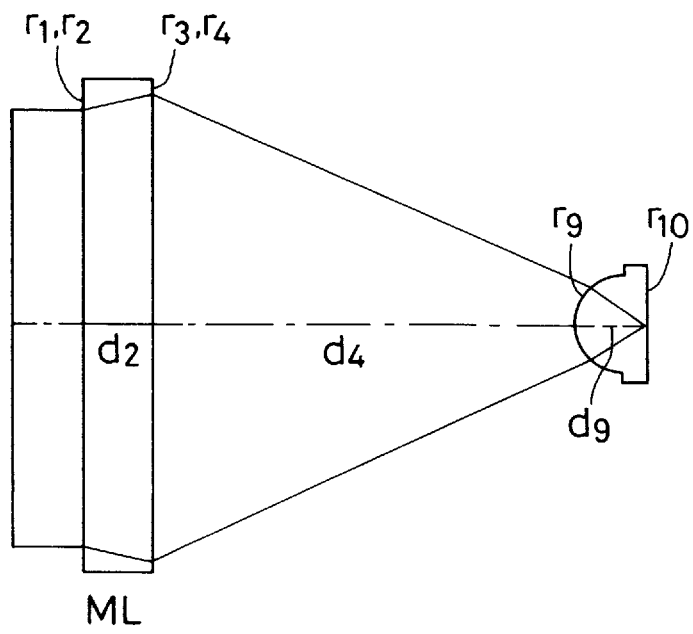
Figure 31A:
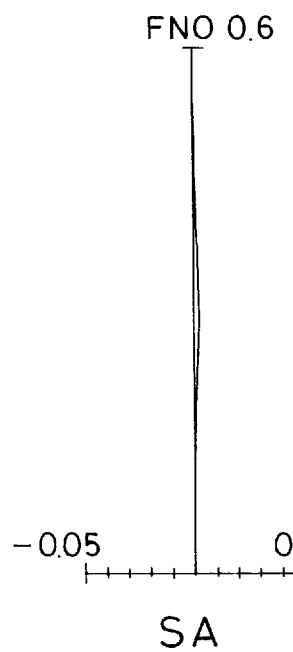
FIGS. 31(*a*) and 31(*b*) graphically show aberrations in Example 20.
Figure 31B:
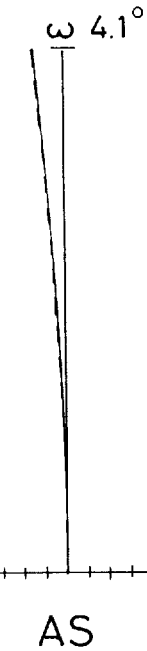
Figure 31C:
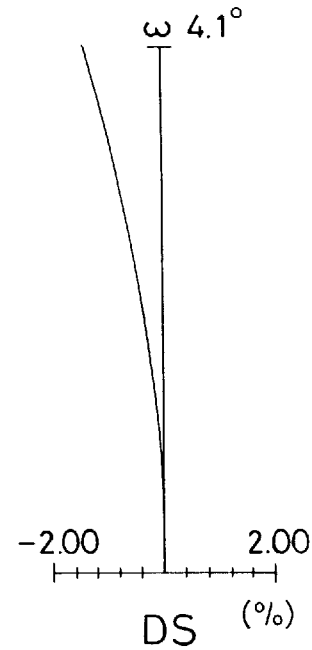
Figure 31D:
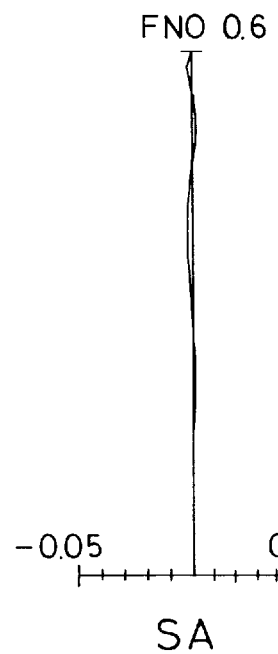
Figure 31E:
Figure 31F:
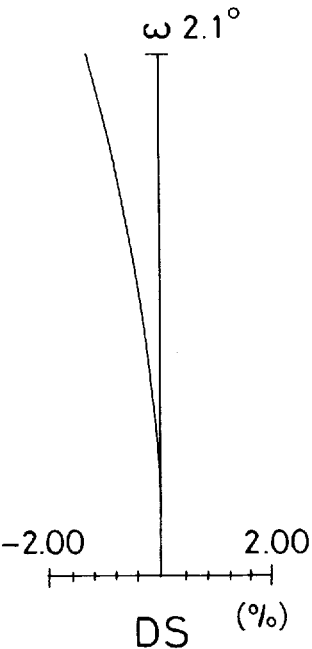

FIGS. 29(a) and 29(b) are sectional views of Example 23, showing rays at a projected light angle 0°. The arrangement of this example is also similar to that of Example 21.

As a result, a variable-magnification lens of an active-type distance measuring lens having a projected light angle of about 5° is realized by two plate lenses. Moreover, the master lens ML need not be moved when a magnification change is made. In comparison to Example 21 and other similar examples, the master lens ML has an increased thickness. Therefore, it is possible to ease the decentration accuracy required for the two surfaces of the DOE.

Sectional views of Examples 24 to 33 at wide-angle and telephoto ends are shown in FIGS. 34 to 43. Among these examples, Examples 24 to 26 are two-unit zoom lens systems each consisting essentially of a positive lens unit and another positive lens unit. When zooming is performed from the wide-angle end to the telephoto end, the first lens unit G1 monotonously moves toward the subject side, and the second lens unit G2 monotonously moves away from the subject. In any of these examples, each lens unit is formed from a single plate lens, thereby achieving a reduction in the thickness. The subject distance is set to 3 meters at the wide-angle end and 5 meters at the telephoto end.

[EXAMPLE 24]

FIG. 34 shows sectional views of Example 24 at the wide-angle and telephoto ends. In this example, both the plate lenses have diffraction surfaces on both sides thereof, and each plate lens is arranged such that the power is equally distributed to the two surfaces. The IRED has a light-emitting portion covered with a resin package having a plane surface.

[EXAMPLE 25]

Figure 35A:
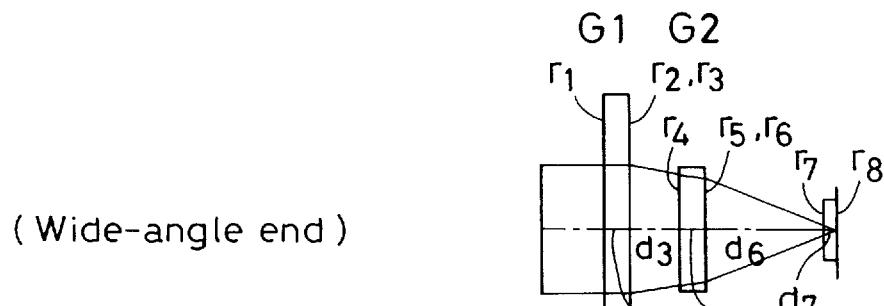
FIG. 35 is a sectional view of a zoom lens system according to Example 25 of the present invention.
Figure 35B:
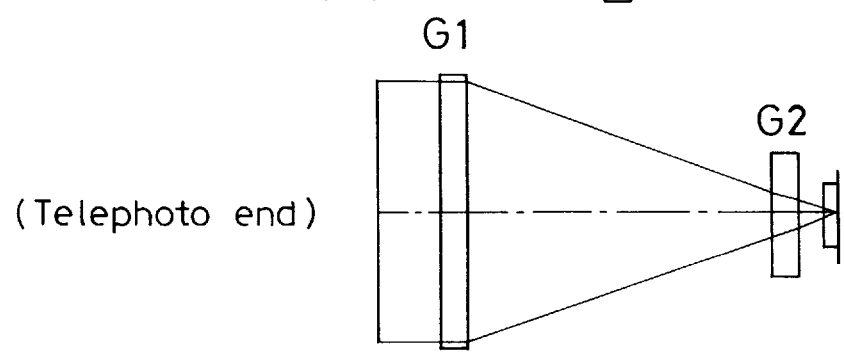

FIG. 35 shows sectional views of Example 25 at the wide-angle and telephoto ends. In this example, each of the two plate lenses has a diffraction surface only on the side remote from the subject. Each IRED has a light-emitting portion covered with a resin package having a plane surface. In this example, because both the DOEs have a diffraction surface only on one side thereof, comatic aberration cannot be corrected, and the projected light angle is unfavorably small.

[EXAMPLE 26]

Figure 36A:
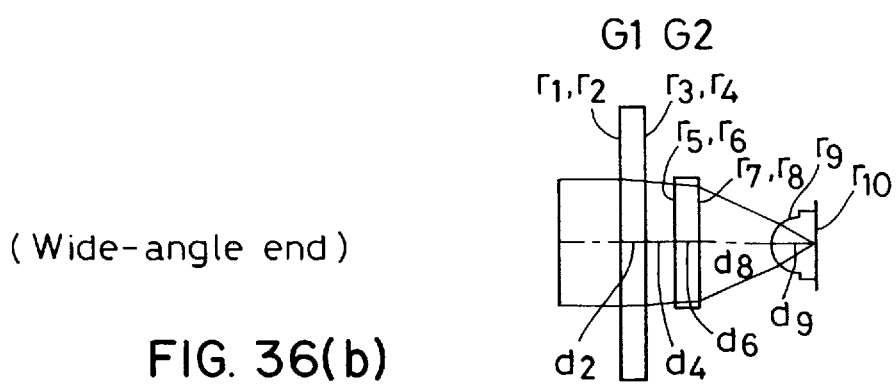
FIG. 36 is a sectional view of a zoom lens system according to Example 26 of the present invention.
Figure 36B:
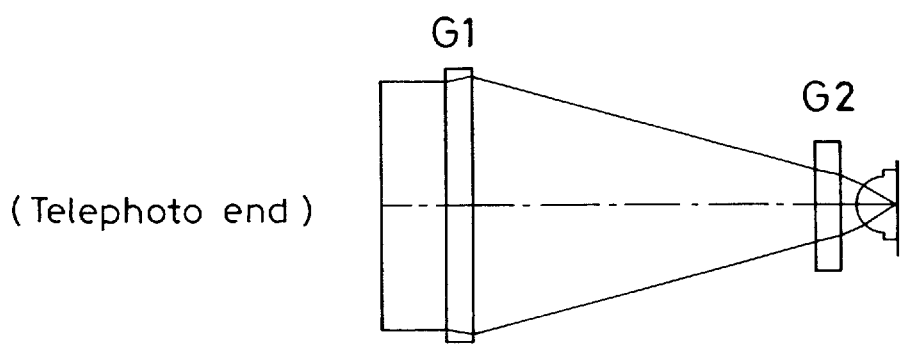

FIG. 36 shows sectional views of Example 26 at the wide-angle and telephoto ends. In this example, both the plate lenses have diffraction surfaces on both sides. In the DOE constituting the first lens unit G1, the power is concentrated on the surface $r_1$. However, in the DOE constituting the second lens unit G2, the power is equally distributed to the two surfaces. The IRED has a light-emitting portion covered with a resin package having a curvature. The DOEs each having diffraction surfaces on both sides thereof enable a large projected light angle to be ensured in cooperation with the fact that the package for the IRED has a curvature.

Examples 27 to 29 are two-unit zoom lens systems each consisting essentially of a positive lens unit and a negative lens unit. When zooming is performed from the wide-angle end to the telephoto end, both the first and second lens units G1 and G2 monotonously move toward the subject side. The amount of movement of the second lens unit G2 is larger than that of the first lens unit G1. In any of these examples, each lens unit is formed from a single plate lens, thereby achieving a reduction in the thickness. The subject distance is set to 3 meters at the wide-angle end and 5 meters at the telephoto end.

[EXAMPLE 27]

FIG. 37 shows sectional views of Example 27 at the wide-angle and telephoto ends. In this example, both the plate lenses have diffraction surfaces on both sides thereof. In the DOE constituting the first lens unit G1, the power is concentrated on the surface $r_4$. In the DOE constituting the second lens unit G2, the power is concentrated on the surface $r_8$. The IRED has a light-emitting portion covered with a resin package having a curvature.

[EXAMPLE 28]

Figure 38A:
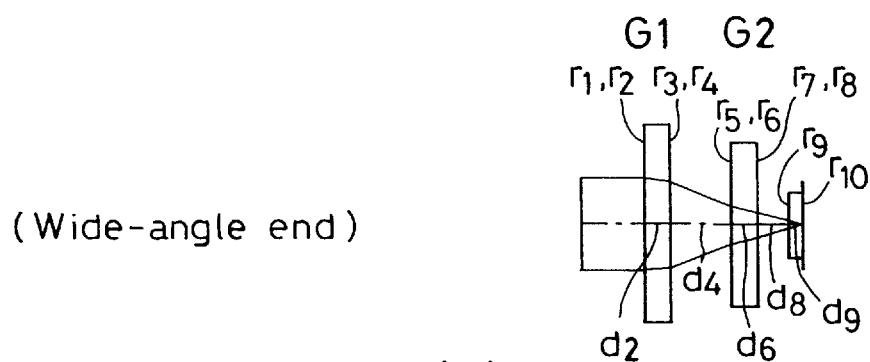
FIG. 38 is a sectional view of a zoom lens system according to Example 28 of the present invention.
Figure 38B:
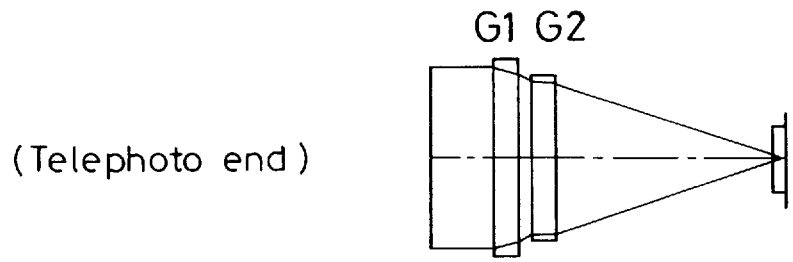

FIG. 38 shows sectional views of Example 28 at the wide-angle and telephoto ends. In this example, both the plate lenses have diffraction surfaces on both sides thereof. In each DOE, the power is equally distributed to the two surfaces. The IRED has a light-emitting portion covered with a resin package having a planar surface.

[EXAMPLE 29]

Figure 39A:
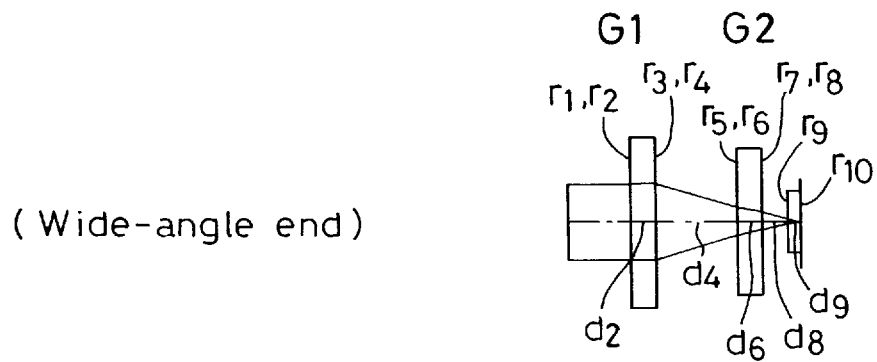
FIG. 39 is a sectional view of a zoom lens system according to Example 29 of the present invention.
Figure 39B:
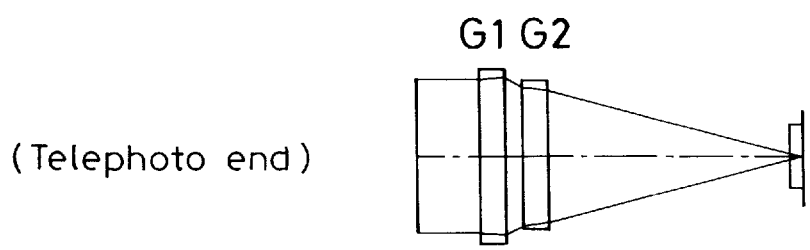

FIG. 39 shows sectional views of Example 29 at the wide-angle and telephoto ends. In this example, both the plate lenses have diffraction surfaces on both sides thereof. In the DOE constituting the first lens unit G1, the power is concentrated on the surface $r_4$. In the DOE constituting the second lens unit G2, the power is concentrated on the surface $r_5$. The IRED has a light-emitting portion covered with a resin package having a planar surface.

Examples 30 to 33 are two-unit zoom lens systems each consisting essentially of a negative lens unit and a positive lens unit. In any of these examples, each lens unit is formed from a single plate lens, thereby achieving a reduction in the thickness. In all these examples, the IRED has a light-emitting portion covered with a resin package having a curvature. In all these examples, the subject distance is set to infinity at both the wide-angle and telephoto ends.

[EXAMPLE 30]

Figure 40A:
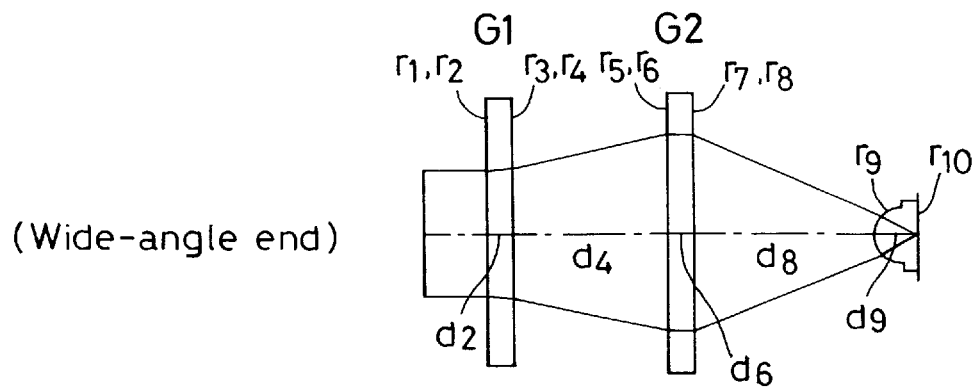
FIG. 40 is a sectional view of a zoom lens system according to Example 30 of the present invention.
Figure 40B:
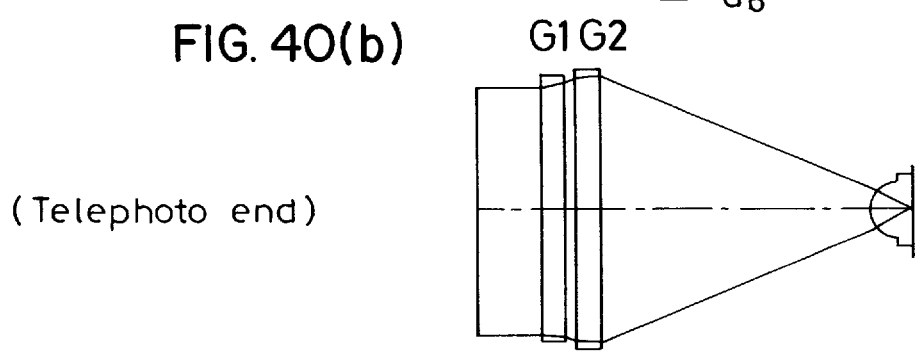

FIG. 40 shows sectional views of Example 30 at the wide-angle and telephoto ends. In this example, both the plate lenses have diffraction surfaces on both sides thereof. In each plate lens, the power is equally distributed to the two surfaces. In this example, the image-formation magnification of the second lens unit G2 is −1× at a position slightly closer to the wide-angle end than the telephoto end. Accordingly, during zooming from the wide-angle end to the telephoto end, the first lens unit G1 first moves away from the subject and then reverses to reach the telephoto end.

[EXAMPLE 31]

Figure 41A:
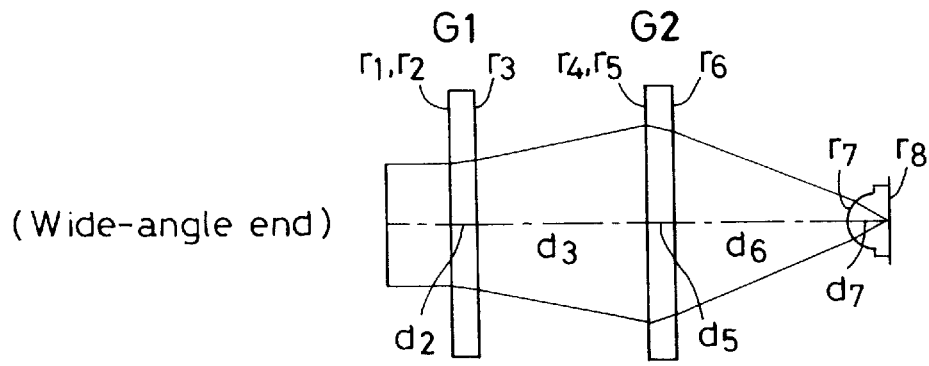
FIG. 41 is a sectional view of a zoom lens system according to Example 31 of the present invention.
Figure 41B:
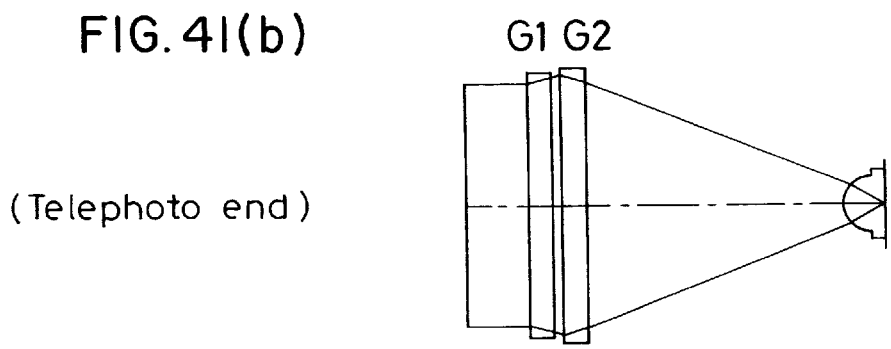

FIG. 41 shows sectional views of Example 31 at the wide-angle and telephoto ends. In this example, each of the two plate lenses has a diffraction surface only on the subject side. In this example, the image-formation magnification of the second lens unit G2 is −1× at the telephoto end. Accordingly, during zooming from the wide-angle end to the telephoto end, the first lens unit G1 moves away from the subject to reach the telephoto end, at which the movement of the first lens unit G1 reverses.

[EXAMPLE 32]

Figure 42A:
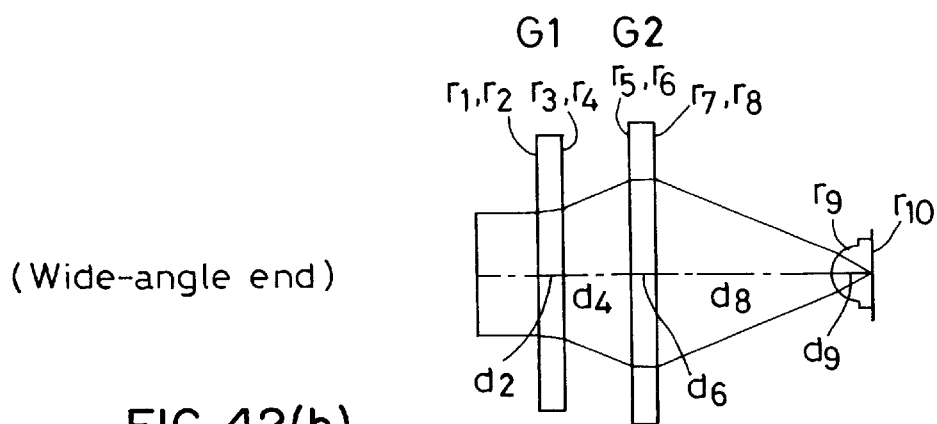
FIG. 42 is a sectional view of a zoom lens system according to Example 32 of the present invention.
Figure 42B:
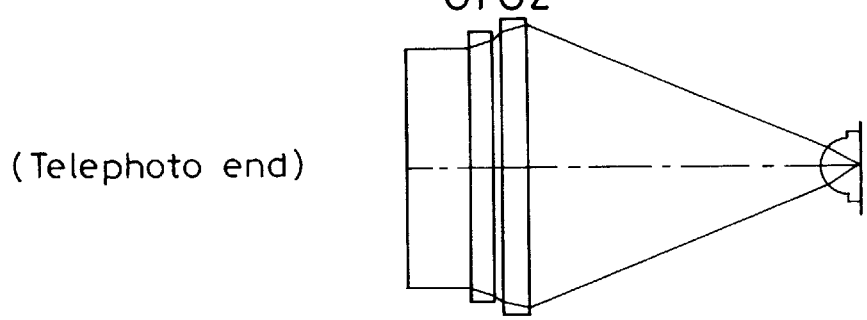

FIG. 42 shows sectional views of Example 32 at the wide-angle and telephoto ends. In this example, both the plate lenses have diffraction surfaces on both sides thereof. In each plate lens, the power is equally distributed to the two surfaces. In this example, the image-formation magnification of the second lens unit G2 is −1× at the wide-angle end. Accordingly, during zooming from the wide-angle end to the telephoto end, the first lens unit G1 monotonously moves toward the subject side.

[EXAMPLE 33]

Figure 43A:
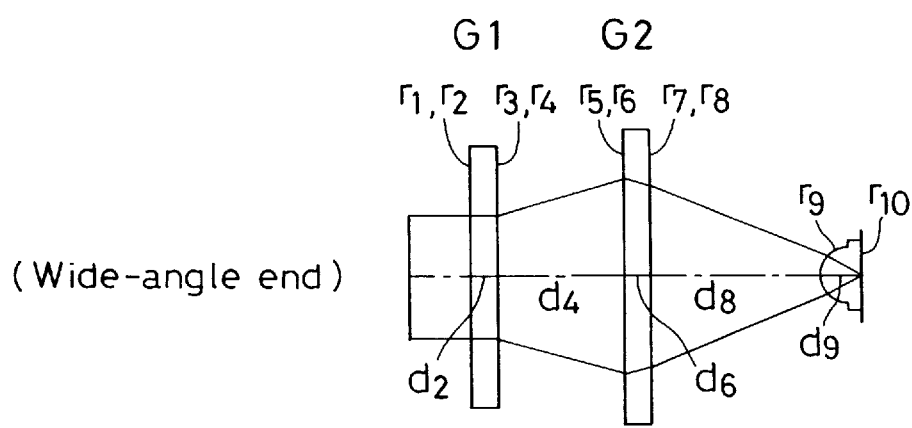
FIG. 43 is a sectional view of a zoom lens system according to Example 33 of the present invention.
Figure 43B:
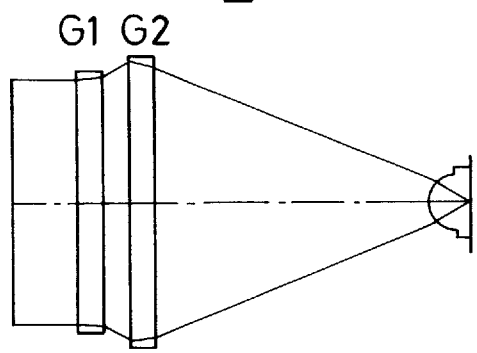
Figure 45A:
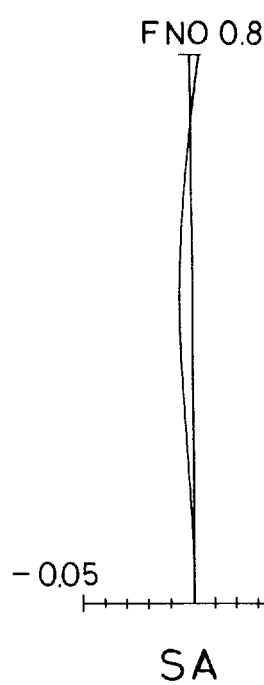
FIGS. 45(*a*) and 45(*b*) graphically show aberrations in Example 27.
Figure 45B:
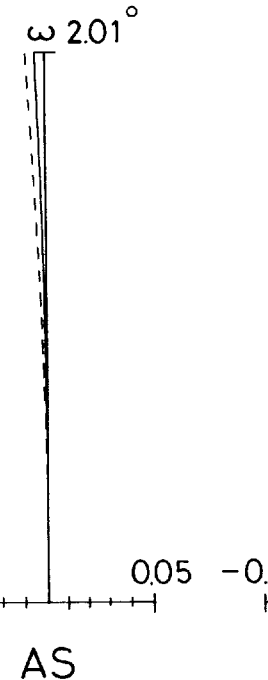
Figure 45C:
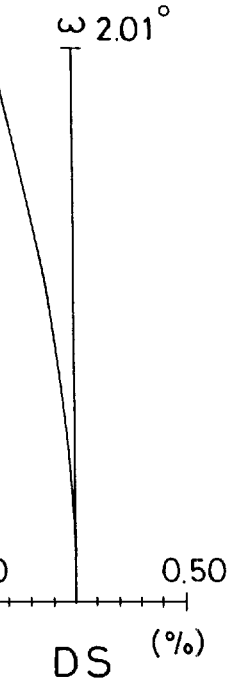
Figure 45D:
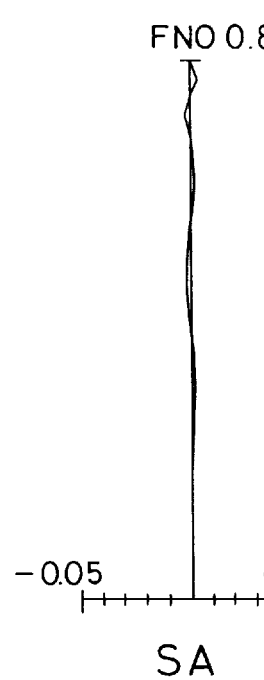
Figure 45E:
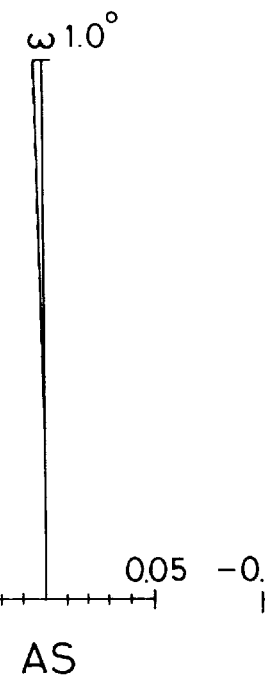
Figure 45F:
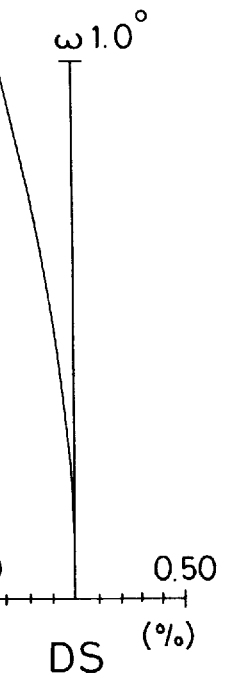
Figure 46A:
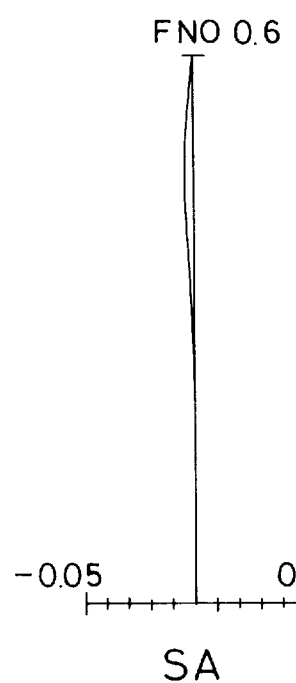
FIGS. 46(*a*) and 46(*b*) graphically show aberrations in Example 30.
Figure 46B:
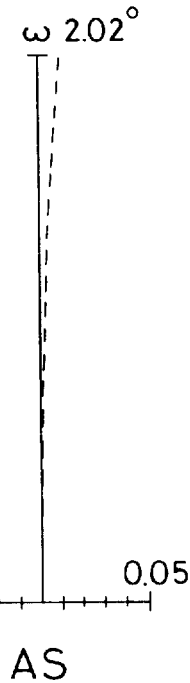
Figure 46C:
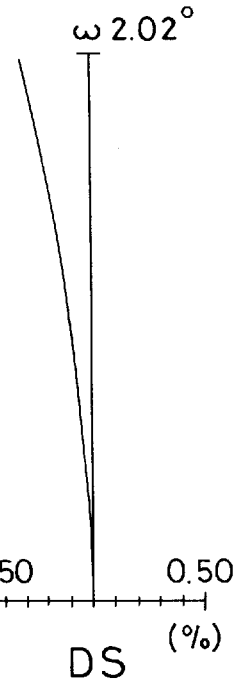
Figure 46D:
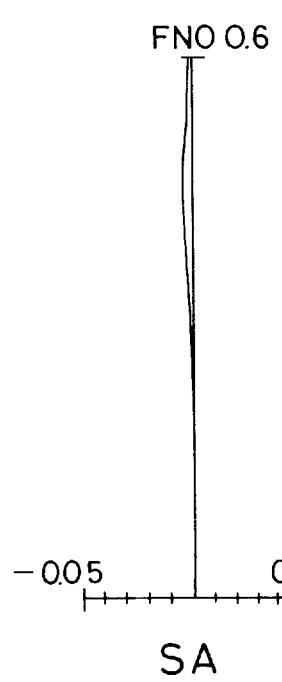
Figure 46E:
Figure 46F:
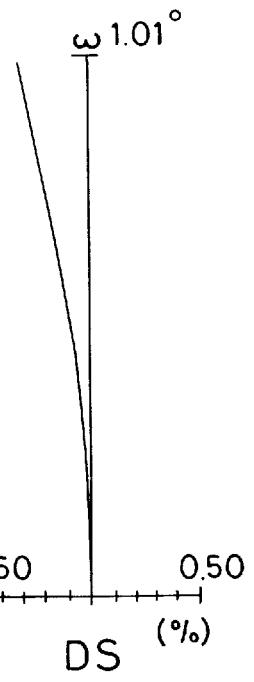

FIG. 43 shows sectional views of Example 33 at the wide-angle and telephoto ends. In this example, both the plate lenses have diffraction surfaces on both sides thereof. The power of the first lens unit G1 is concentrated on the surface $r_4$. The power of the second lens unit G2 is concentrated on the surface $r_5$. In this example, with respect to the zoom ratio Z, the image-formation magnification of the second lens unit G2 is set such that the magnification is $1/\sqrt{Z}$ at the wide-angle end and $\sqrt{Z}$ at the telephoto end. Accordingly, during zooming from the wide-angle end to the telephoto end, the first lens unit G1 first moves away from the subject and then reverses to move toward the subject side. The position of the first lens unit G1 at the wide-angle end and that at the telephoto end are coincident with each other.

Numerical data of the above-described Examples 1 to 33 will be shown below. In the data, f is the focal length; $F_{NO}$ is F-number; $\omega$ is the projected light angle; $r_1, r_2 \ldots$ are the radii of curvature of the lens surfaces; $d_1, d_2,$ are the spacings between the lens surfaces; and $n_{900,1}, n_{900,2} \ldots$ are the refractive indices of the lenses for the wavelength 900 nanometers. Aspherical surface configurations are expressed by the above Eq.(o) In Examples 14 to 23, the surface No. of the IRED is given the same number for the wide-angle position and the telephoto position. It should be noted that in Examples 14 to 23, the zoom ratio is 2; in Examples 24 to 33, the base material is an acrylic material, and the zoom ratio is 2.

In the table below, "diffraction surface" is denoted by DS, and "light-emitting portion" is denoted by LE.

Example 1

$f = 14$ mm, $F_{NO} = 1.2$, $\omega = 4°$
$r_1 = 2.1448 \times 10^4$ (DS)    $d_1 = 0$         $n_{900.1} = 1553$
$r_2 = \infty$                      $d_2 = 1$         $n_{900.2} = 1.48536$
$r_3 = \infty$                      $d_3 = 0$         $n_{900.3} = 1553$
$r_4 = \infty$ (DS)                 $d_4 = 12.717$
$r_5 = \infty$                      $d_5 = 1$         $n_{900.4} = 1.54$
$r_6 = $ (LE)
Aspherical Coefficients 1st surface $A_4 = -5.8215 \times 10^{-7}$
$A_6 = -1.3958 \times 10^{-9}$
$A_8 = 6.8921 \times 10^{-12}$
$A_{10} = 0$
4th surface $A_4 = -6.7525 \times 10^{-7}$
$A_6 = 2.0832 \times 10^{-9}$
$A_8 = -7.9662 \times 10^{-13}$
$A_{10} = 0$
Example 2

$f = 14$ mm, $F_{NO} = 1.2$, $\omega = 4°$
$r_1 = \infty$ (DS)                 $d_1 = 0$         $n_{900.1} = 1553$
$r_2 = \infty$                      $d_2 = 1$         $n_{900.2} = 1.48536$
$r_3 = \infty$                      $d_3 = 0$         $n_{900.3} = 1553$
$r_4 = -2.1448 \times 10^4$ (DS)    $d_4 = 13.390$
$r_5 = \infty$                      $d_5 = 1$         $n_{900.4} = 1.54$
$r_6 = $ (LE)
Aspherical Coefficients 1st surface $A_4 = -6.1013 \times 10^{-7}$
$A_6 = -4.8847 \times 10^{-10}$
$A_8 = 2.4813 \times 10^{-11}$
$A_{10} = 0$ -continued 4th surface $A_4 = -5.8116 \times 10^{-7}$
$A_6 = 2.5805 \times 10^{-9}$
$A_8 = 1.8095 \times 10^{-12}$
$A_{10} = 0$
Example 3

$f = 5.7$ mm, $F_{NO} = 0.5$, $\omega = 4°$
$r_1 = 1.2256 \times 10^4$ (DS)     $d_1 = 0$         $n_{900.1} = 1553$
$r_2 = \infty$                       $d_2 = 1$         $n_{900.2} = 1.48536$
$r_3 = \infty$                       $d_3 = 0$         $n_{900.3} = 1553$
$r_4 = 3.3673 \times 10^4$ (DS)     $d_4 = 6.910$
$r_5 = 2$                            $d_5 = 3$         $n_{900.4} = 1.54$
$r_6 = $ (LE)
Aspherical Coefficients 1st surface $A_4 = -9.2391 \times 10^{-7}$
$A_6 = -3.4826 \times 10^{-9}$
$A_8 = -1.0916 \times 10^{-10}$
$A_{10} = 1.6840 \times 10^{-12}$
4th surface $A_4 = -1.2463 \times 10^{-6}$
$A_6 = 4.8701 \times 10^{-9}$
$A_8 = -2.9498 \times 10^{-11}$
$A_{10} = 5.8222 \times 10^{-13}$
Example 4

$f = 5.7$ mm, $F_{NO} = 0.51$, $\omega = 4°$
$r_1 = 3.5150 \times 10^4$ (DS)     $d_1 = 0$         $n_{900.1} = 1553$
$r_2 = \infty$                       $d_2 = 3$         $n_{900.2} = 1.48536$
$r_3 = \infty$                       $d_3 = 0$         $n_{900.3} = 1553$
$r_4 = -3.5150 \times 10^4$ (DS)    $d_4 = 6.863$
$r_5 = 2$                            $d_5 = 3$         $n_{900.4} = 1.54$
$r_6 = $ (LE)
Aspherical Coefficients 1st surface $A_4 = -3.0750 \times 10^{-7}$
$A_6 = -1.7935 \times 10^{-9}$
$A_8 = -1.8762 \times 10^{-11}$
$A_{10} = 0$
4th surface $A_4 = -3.8426 \times 10^{-7}$
$A_6 = 9.7227 \times 10^{-10}$
$A_8 = 2.2937 \times 10^{-12}$
$A_{10} = 0$
Example 5

$f = 5.7$ mm, $F_{NO} = 0.51$, $\omega = 4°$
$r_1 = -3.3673 \times 10^4$ (DS)    $d_1 = 0$         $n_{900.1} = 1553$
$r_2 = \infty$                       $d_2 = 1$         $n_{900.2} = 1.48536$
$r_3 = \infty$                       $d_3 = 0$         $n_{900.3} = 1553$
$r_4 = -1.2256 \times 10^4$ (DS)    $d_4 = 8.287$
$r_5 = 2$                            $d_5 = 3$         $n_{900.4} = 1.54$
$r_6 = $ (LE)
Aspherical Coefficients 1st surface $A_4 = -1.0312 \times 10^{-6}$
$A_6 = -2.3641 \times 10^{-9}$
$A_8 = 1.3448 \times 10^{-10}$
$A_{10} = 4.0484 \times 10^{-13}$
4th surface $A_4 = -8.7222 \times 10^{-7}$
$A_6 = 5.1336 \times 10^{-9}$
$A_8 = 6.0068 \times 10^{-11}$
$A_{10} = -6.0473 \times 10^{-13}$
Example 6

$f = 5.7$ mm, $F_{NO} = 0.6$, $\omega = 2°$
$r_1 = 1.8384 \times 10^4$ (DS)     $d_1 = 0$         $n_{900.1} = 1553$
$r_2 = \infty$                       $d_2 = 1.500$     $n_{900.2} = 1.48536$ -continued $r_3 = \infty$ (Aspheric)   $d_3 = 6.909$
$r_4 = 2$   $d_4 = 3$   $n_{900.4} = 1.54$
$r_5 = $ (LE)
Aspherical Coefficients 1st surface $A_4 = -2.8866 \times 10^{-7}$
$A_6 = 2.0838 \times 10^{-8}$
$A_8 = -4.2432 \times 10^{-10}$
$A_{10} = 0$
4th surface $A_4 = -1.0916 \times 10^{-3}$
$A_6 = 1.0979 \times 10^{-4}$
$A_8 = -2.6908 \times 10^{-6}$
$A_{10} = 0$
Example 7

$f = 5.7$ mm, $F_{NO} = 0.5$, $\omega = 8°$
$r_1 = \infty$ (Aspheric)   $d_1 = 2.500$   $n_{900.1} = 1553$
$r_2 = \infty$   $d_2 = 0$   $n_{900.2} = 1.48536$
$r_3 = -1.8384 \times 10^4$ (DS)   $d_3 = 7.919$
$r_4 = 2$   $d_4 = 3$   $n_{900.4} = 1.54$
$r_5 = $ (LE)
Aspherical Coefficients 1st surface $A_4 = -1.3334 \times 10^{-3}$
$A_6 = 3.2738 \times 10^{-6}$
$A_8 = -1.1015 \times 10^{-8}$
$A_{10} = 0$
4th surface $A_4 = -3.7607 \times 10^{-7}$
$A_6 = 4.0414 \times 10^{-9}$
$A_8 = -1.6501 \times 10^{-11}$
$A_{10} = 0$
$d = 2.5$, $D = 13.5$, $d/D = 0.185$
Example 8

$f = 5.7$ mm, $F_{NO} = 0.5$, $\omega = 1°$
$r_1 = 1.8384 \times 10^4$ (DS)   $d_1 = 0$   $n_{900.1} = 1553$
$r_2 = \infty$   $d_2 = 1$   $n_{900.2} = 1.48536$
$r_3 = \infty$   $d_3 = 7.246$
$r_4 = 2$   $d_4 = 3$   $n_{900.4} = 1.54$
$r_5 = $ (LE)
Aspherical Coefficients 1st surface $A_4 = -4.3469 \times 10^{-8}$
$A_6 = 1.4065 \times 10^{-10}$
$A_8 = -9.2547 \times 10^{-13}$
$A_{10} = 8.8378 \times 10^{-15}$
Example 9

$f = 5.7$ mm, $F_{NO} = 0.5$, $\omega = 1°$
$r_1 = \infty$   $d_1 = 1$   $n_{900.1} = 1553$
$r_2 = \infty$   $d_2 = 0$   $n_{900.2} = 1.48536$
$r_3 = -1.8384 \times 10^4$ (DS)   $d_3 = 7.919$
$r_4 = 2$   $d_4 = 3$   $n_{900.4} = 1.54$
$r_5 = $ (LE)
Aspherical Coefficients 3rd surface $A_4 = 4.4932 \times 10^{-8}$
$A_6 = -1.4928 \times 10^{-10}$
$A_8 = 8.9191 \times 10^{-13}$
$A_{10} = -7.9424 \times 10^{-15}$
Example 10

$f = 6.7$ mm, $F_{NO} = 0.7$, $\omega = 4°$
$r_1 = 1.6498 \times 10^4$ (DS)   $d_1 = 0$   $n_{900.1} = 1553$
$r_2 = \infty$   $d_2 = 11.000$   $n_{900.2} = 1.48536$
$r_3 = \infty$   $d_3 = 0$   $n_{900.3} = 1553$
$r_4 = 2.2330 \times 10^4$ (DS)   $d_4 = 0.302$ -continued $r_5 = 2$   $d_5 = 3$   $n_{900.4} = 1.54$
$r_6 = $ (LE)
Aspherical Coefficients 1st surface $A_4 = -4.9722 \times 10^{-8}$
$A_6 = -4.1296 \times 10^{-11}$
$A_8 = 5.3685 \times 10^{-13}$
$A_{10} = 0$
4th surface $A_4 = -2.2297 \times 10^{-6}$
$A_6 = 7.0577 \times 10^{-8}$
$A_8 = 1.0391 \times 10^{-9}$
$A_{10} = 0$
$\phi_F = 0.0929$, $\phi = 0.0714$, $\phi_F/\phi = 1.301$
Example 11

$f = 14$ mm, $F_{NO} = 1.2$, $\omega = 1.5°$
$r_1 = 1.4299 \times 10^4$ (DS)   $d_1 = 0$   $n_{900.1} = 1553$
$r_2 = \infty$   $d_2 = 11.000$   $n_{900.2} = 1.48536$
$r_3 = \infty$   $d_3 = 0$   $n_{900.3} = 1553$
$r_4 = 0.8860 \times 10^4$ (DS)   $d_4 = 2.282$
$r_5 = \infty$   $d_5 = 1$
$r_6 = $ (LE)
Aspherical Coefficients 1st surface $A_4 = -5.5277 \times 10^{-8}$
$A_6 = 1.1894 \times 10^{-10}$
$A_8 = -3.6395 \times 10^{-13}$
$A_{10} = 0$
4th surface $A_4 = -7.5492 \times 10^{-6}$
$A_6 = 7.5230 \times 10^{-7}$
$A_8 = -4.3785 \times 10^{-8}$
$A_{10} = 0$
$\phi_F = 0.1071$, $\phi = 0.0714$, $\phi_F/\phi = 1.500$
Example 12

$f = 6.7$ mm, $F_{NO} = 0.7$, $\omega = 4°$
$r_1 = 2.1448 \times 10^4$ (DS)   $d_1 = 0$   $n_{900.1} = 1553$
$r_2 = \infty$   $d_2 = 11.000$   $n_{900.2} = 1.48536$
$r_3 = \infty$   $d_3 = 0$   $n_{900.3} = 1553$
$r_4 = \infty$ (DS)   $d_4 = 2.524$
$r_5 = 2$   $d_5 = 3$   $n_{900.4} = 1.54$
$r_6 = $ (LE)
Aspherical Coefficients 1st surface $A_4 = -4.4019 \times 10^{-8}$
$A_6 = -9.0995 \times 10^{-11}$
$A_8 = -8.5912 \times 10^{-13}$
$A_{10} = 0$
4th surface $A_4 = -4.8320 \times 10^{-7}$
$A_6 = 5.0122 \times 10^{-9}$
$A_8 = 2.5673 \times 10^{-11}$
$A_{10} = 0$
Example 13

$f = 6.7$ mm, $F_{NO} = 0.75$, $\omega = 6°$
$r_1 = \infty$ (DS)   $d_1 = 0$   $n_{900.1} = 1553$
$r_2 = \infty$   $d_2 = 11.000$   $n_{900.2} = 1.48536$
$r_3 = \infty$   $d_3 = 0$   $n_{900.3} = 1553$
$r_4 = -2.1448 \times 10^4$ (DS)   $d_4 = 9.930$
$r_5 = 2$   $d_5 = 3$   $n_{900.4} = 1.54$
$r_6 = $ (LE)
Aspherical Coefficients 1st surface $A_4 = -6.8621 \times 10^{-8}$
$A_6 = -2.9838 \times 10^{-10}$
$A_8 = -1.6615 \times 10^{-12}$ -continued $A_{10} = 0$
4th surface $A_4 = -3.9838 \times 10^{-8}$
$A_6 = 6.3101 \times 10^{-11}$
$A_8 = 1.8613 \times 10^{-13}$
$A_{10} = 0$
Example 14

(Wide-angle position)
$f = 5.7$ mm, $F_{NO} = 0.6$, $\omega = 6.2°$
$r_1 = 7.3017 \times 10^4$ (DS)    $d_1 = 0$         $n_{900.1} = 1553$
$r_2 = \infty$                      $d_2 = 1$         $n_{900.2} = 1.48536$
$r_3 = \infty$                      $d_3 = 0$         $n_{900.3} = 1553$
$r_4 = -7.3017 \times 10^4$ (DS)   $d_4 = 1.322$
$r_5 = 6.6888 \times 10^4$ (DS)    $d_5 = 0$         $n_{900.4} = 1553$
$r_6 = \infty$                      $d_6 = 1$         $n_{900.5} = 1.48536$
$r_7 = \infty$                      $d_7 = 0$         $n_{900.6} = 1553$
$r_8 = -6.6888 \times 10^4$ (DS)   $d_8 = 6.599$
$r_9 = 2$                           $d_9 = 3$         $n_{900.7} = 1.54$
$r_{10} = $ (LE)
Aspherical Coefficients 1st surface $A_4 = -2.5495 \times 10^{-7}$
$A_6 = -2.9951 \times 10^{-11}$
$A_8 = 2.3157 \times 10^{-12}$
$A_{10} = 0$
4th surface $A_4 = -2.6356 \times 10^{-7}$
$A_6 = 5.5556 \times 10^{-10}$
$A_8 = 2.3933 \times 10^{-13}$
$A_{10} = 0$
5th surface $A_4 = -8.1446 \times 10^{-7}$
$A_6 = -7.9769 \times 10^{-9}$
$A_8 = -4.9518 \times 10^{-11}$
$A_{10} = 0$
8th surface $A_4 = -9.2578 \times 10^{-7}$
$A_6 = -2.9245 \times 10^{-9}$
$A_8 = 7.4584 \times 10^{-11}$
$A_{10} = 0$
(Telephoto position)
$f = 11.5$ mm, $F_{NO} = 0.6$, $\omega = 3.1°$
$r_1 = 7.3017 \times 10^4$ (DS)    $d_1 = 0$         $n_{900.1} = 1553$
$r_2 = \infty$                      $d_2 = 1$         $n_{900.2} = 1.48536$
$r_3 = \infty$                      $d_3 = 3$         $n_{900.3} = 1553$
$r_4 = -7.3017 \times 10^4$ (DS)   $d_4 = 18.346$
$r_9 = 2$                           $d_9 = 3$         $n_{900.7} = 1.54$
$r_{10} = $ (LE)
Aspherical Coefficients 1st surface $A_4 = -2.5495 \times 10^{-7}$
$A_6 = -2.9951 \times 10^{-11}$
$A_8 = 2.3157 \times 10^{-12}$
$A_{10} = 0$
4th surface $A_4 = -2.6356 \times 10^{-7}$
$A_6 = 5.5556 \times 10^{-10}$
$A_8 = 2.3933 \times 10^{-13}$
$A_{10} = 0$
Example 15

(Wide-angle position)
$f = 5.7$ mm, $F_{NO} = 1.4$, $\omega = 3.0°$
$r_1 = 3.6245 \times 10^4$ (DS)    $d_1 = 0$         $n_{900.1} = 1553$
$r_2 = \infty$                      $d_2 = 1$         $n_{900.2} = 1.48536$
$r_3 = \infty$                      $d_3 = 0$         $n_{900.3} = 1553$
$r_4 = -3.6245 \times 10^4$ (DS)   $d_4 = 7.597$
$r_5 = 2$                           $d_9 = 3$         $n_{900.7} = 1.54$
$r_{10} = $ (LE)

-continued

Aspherical Coefficients

1st surface $A_4 = -4.3965 \times 10^{-7}$
$A_6 = -2.4207 \times 10^{-8}$
$A_8 = -5.6870 \times 10^{-10}$
$A_{10} = 0$
4th surface $A_4 = -4.1272 \times 10^{-7}$
$A_6 = -3.6842 \times 10^{-8}$
$A_8 = 6.5879 \times 10^{-10}$
$A_{10} = 0$
(Telephoto position)
$f = 11.5$ mm, $F_{NO} = 1.4$, $\omega = 1.5°$
$r_1 = -6.1791 \times 10^4$ (DS)   $d_1 = 0$         $n_{900.1} = 1553$
$r_2 = \infty$                      $d_2 = 1$         $n_{900.2} = 1.48536$
$r_3 = \infty$                      $d_3 = 0$         $n_{900.3} = 1553$
$r_4 = 6.1791 \times 10^4$ (DS)    $d_4 = 1.325$
$r_5 = 3.6245 \times 10^4$ (DS)    $d_5 = 0$         $n_{900.4} = 1553$
$r_6 = \infty$                      $d_6 = 1$         $n_{900.5} = 1.48536$
$r_7 = \infty$                      $d_7 = 0$         $n_{900.6} = 1553$
$r_8 = -3.6245 \times 10^4$ (DS)   $d_8 = 22.065$
$r_9 = 2$                           $d_9 = 3$         $n_{900.7} = 1.54$
$r_{10} = $ (LE)
Aspherical Coefficients 1st surface $A_4 = 1.0537 \times 10^{-7}$
$A_6 = 1.0620 \times 10^{-8}$
$A_8 = -8.4357 \times 10^{-10}$
$A_{10} = 0$
4th surface $A_4 = 7.4672 \times 10^{-8}$
$A_6 = 3.1011 \times 10^{-8}$
$A_8 = -1.8305 \times 10^{-9}$
$A_{10} = 0$
5th surface $A_4 = -4.3965 \times 10^{-7}$
$A_6 = -2.4207 \times 10^{-8}$
$A_8 = -5.6870 \times 10^{-10}$
$A_{10} = 0$
8th surface $A_4 = -4.1272 \times 10^{-7}$
$A_6 = -3.6842 \times 10^{-8}$
$A_8 = 6.5879 \times 10^{-10}$
$A_{10} = 0$
Example 16

(Wide-angle position)
$f = 5.7$ mm, $F_{NO} = 1.0$, $\omega = 3.0°$
$r_1 = 3.6245 \times 10^4$ (DS)    $d_1 = 0$         $n_{900.1} = 1553$
$r_2 = \infty$                      $d_2 = 1$         $n_{900.2} = 1.48536$
$r_3 = \infty$                      $d_3 = 0$         $n_{900.3} = 1553$
$r_4 -3.6245 \times 10^4$ (DS)     $d_4 = 7.597$
$r_9 = 2$                           $d_5 = 3$         $n_{900.7} = 1.54$
$r_{10} = $ (LE)
Aspherical Coefficients 1st surface $A_4 = -2.5393 \times 10^{-7}$
$A_6 = 3.6092 \times 10^{-9}$
$A_8 = 2.1357 \times 10^{-11}$
$A_{10} = 0$
4th surface $A_4 = -2.2970 \times 10^{-7}$
$A_6 = 4.2433 \times 10^{-9}$
$A_8 = -1.2641 \times 10^{-11}$
$A_{10} = 0$
(Telephoto position)
$f = 11.5$ mm, $F_{NO} = 1.0$, $\omega = 1.5°$
$r_1 = 3.6245 \times 10^4$ (DS)    $d_1 = 0$         $n_{900.1} = 1553$
$r_2 = \infty$                      $d_2 = 1$         $n_{900.2} = 1.48536$ -continued $r_3 = \infty$     $d_3 = 0$         $n_{900.3} = 1553$
$r_4 = -3.6245 \times 10^4$ (DS)   $d_4 = 1.325$
$r_5 = -6.1791 \times 10^4$ (DS)   $d_5 = 0$         $n_{900.4} = 1553$
$r_6 = \infty$     $d_6 = 1$         $n_{900.5} = 1.48536$
$r_7 = \infty$     $d_7 = 0$         $n_{900.6} = 1553$
$r_8 = 6.1791 \times 10^4$ (DS)    $d_8 = 15.673$
$r_9 = 2$          $d_9 = 3$         $n_{900.7} = 1.54$
$r_{10} =$ (LE)

Aspherical Coefficients

1st surface $A_4 = -2.5393 \times 10^{-7}$
$A_6 = 3.6092 \times 10^{-9}$
$A_8 = 2.1357 \times 10^{-11}$
$A_{10} = 0$ 4th surface $A_4 = -2.2970 \times 10^{-7}$
$A_6 = 4.2433 \times 10^{-9}$
$A_8 = -1.2641 \times 10^{-11}$
$A_{10} = 0$ 5th surface $A_4 = -6.9036 \times 10^{-7}$
$A_6 = -1.8895 \times 10^{-8}$
$A_8 = -1.8715 \times 10^{-10}$
$A_{10} = 0$ 8th surface $A_4 = -9.2800 \times 10^{-7}$
$A_6 = -1.7153 \times 10^{-8}$
$A_8 = 3.1231 \times 10^{-10}$
$A_{10} = 0$ Example 17

(Wide-angle position)
f = 5.7 mm, $F_{NO} = 0.6$, $\omega = 5.1°$
$r_1 = 6.6888 \times 10^4$ (DS)    $d_1 = 0$         $n_{900.1} = 1553$
$r_2 = \infty$     $d_2 = 1$         $n_{900.2} = 1.48536$
$r_3 = \infty$     $d_3 = 0$         $n_{900.3} = 1553$
$r_4 = -6.6888 \times 10^4$ (DS)   $d_4 = 0.725$
$r_5 = 14.5689$ (Aspheric)         $d_5 = 6$         $n_{900.4} = 1.48536$
$r_6 = -50.2914$ (Aspheric)        $d_6 = 3.618$
$r_7 = 2$          $d_7 = 3$         $n_{900.5} = 1.54$
$r_8 =$ (LE)

Aspherical Coefficients

1st surface $A_4 = -7.6389 \times 10^{-7}$
$A_6 = -4.7197 \times 10^{-9}$
$A_8 = 1.3219 \times 10^{-11}$
$A_{10} = 0$ 4th surface $A_4 = -7.9301 \times 10^{-7}$
$A_6 = 5.8581 \times 10^{-10}$
$A_8 = 3.3711 \times 10^{-11}$
$A_{10} = 0$ 5th surface $A_4 = -3.6481 \times 10^{-5}$
$A_6 = 4.2726 \times 10^{-7}$
$A_8 = 1.1405 \times 10^{-9}$
$A_{10} = 0$ 6th surface $A_4 = 4.2710 \times 10^{-6}$
$A_6 = 1.1812 \times 10^{-6}$
$A_8 = -4.5220 \times 10^{-9}$
$A_{10} = 0$ (Telephoto position)
f = 11.5 mm, $F_{NO} = 0.6$, $\omega = 2.6°$
$r_1 = 14.5689$ (Aspheric)   $d_1 = 6$    $n_{900.1} = 1.48536$
$r_2 = -50.2914$ (Aspheric)  $d_2 = 16.770$
$r_7 = 2$          $d_7 = 3$         $n_{900.5} = 1.54$
$r_8 =$ (LE)

-continued

Aspherical Coefficients

1st surface $A_4 = -3.6481 \times 10^{-5}$
$A_6 = 4.2726 \times 10^{-7}$
$A_8 = 1.1405 \times 10^{-9}$
$A_{10} = 0$ 2nd surface $A_4 = 4.2710 \times 10^{-6}$
$A_6 = 1.1812 \times 10^{-6}$
$A_8 = -4.5220 \times 10^{-9}$
$A_{10} = 0$ Example 18

(Wide-angle position)
f = 5.7 mm, $F_{NO} = 0.6$, $\omega = 4.1°$
$r_1 = 3.6245 \times 10^4$ (DS)    $d_1 = 0$         $n_{900.1} = 1553$
$r_2 = \infty$     $d_2 = 1$         $n_{900.2} = 1.48536$
$r_3 = \infty$     $d_3 = 0$         $n_{900.3} = 1553$
$r_4 = -3.6245 \times 10^4$ (DS)   $d_4 = 7.549$
$r_{13} = 2$       $d_{13} = 3$      $n_{900.10} = 1.54$
$r_{14} =$ (LE)

Aspherical Coefficients

1st surface $A_4 = -9.7573 \times 10^{-7}$
$A_6 = -1.1677 \times 10^{-8}$
$A_8 = 2.1567 \times 10^{-11}$
$A_{10} = 0$ 4th surface $A_4 = -1.0527 \times 10^{-6}$
$A_6 = -2.6588 \times 10^{-9}$
$A_8 = 1.2132 \times 10^{-10}$
$A_{10} = 0$ (Telephoto position)
f = 11.4 mm, $F_{NO} = 0.6$, $\omega = 2.0°$
$r_1 = 6.0760 \times 10^4$ (DS)    $d_1 = 0$         $n_{900.1} = 1553$
$r_2 = \infty$     $d_2 = 1$         $n_{900.2} = 1.48536$
$r_3 = \infty$     $d_3 = 0$         $n_{900.3} = 1553$
$r_4 = -6.0760 \times 10^4$ (DS)   $d_4 = 9.326$
$r_5 = -3.1147 \times 10^4$ (DS)   $d_5 = 0$         $n_{900.4} = 1553$
$r_6 = \infty$     $d_6 = 1$         $n_{900.5} = 1.48536$
$r_7 = \infty$     $d_7 = 0$         $n_{900.6} = 1553$
$r_8 = 3.1147 \times 10^4$ (DS)    $d_8 = 1$
$r_9 = 3.6245 \times 10^4$ (DS)    $d_9 = 0$         $n_{900.7} = 1553$
$r_{10} = \infty$  $d_{10} = 1$      $n_{900.8} = 1.48536$
$r_{11} = \infty$  $d_{11} = 0$      $n_{900.9} = 1553$
$r_{12} = -3.6245 \times 10^4$ (DS) $d_{12} = 7.549$
$r_{13} = 2$       $d_{13} = 3$      $n_{900.10} = 1.54$
$r_{14} =$ (LE)

Aspherical Coefficients

1st surface $A_4 = -6.5637 \times 10^{-9}$
$A_6 = -5.6753 \times 10^{-10}$
$A_8 = 1.6949 \times 10^{-12}$
$A_{10} = 0$ 4th surface $A_4 = 2.3389 \times 10^{-9}$
$A_6 = -6.2095 \times 10^{-10}$
$A_8 = 2.0618 \times 10^{-12}$
$A_{10} = 0$ 5th surface $A_4 = 3.0221 \times 10^{-8}$
$A_6 = 4.5804 \times 10^{-9}$
$A_8 = 6.3435 \times 10^{-11}$
$A_{10} = 0$ 8th surface $A_4 = -2.2163 \times 10^{-8}$
$A_6 = 3.1265 \times 10^{-9}$
$A_8 = 2.1486 \times 10^{-10}$
$A_{10} = 0$ 9th surface $A_4 = -9.7573 \times 10^{-7}$
$A_6 = -1.1677 \times 10^{-8}$
$A_8 = 2.1567 \times 10^{-11}$
$A_{10} = 0$ 12th surface $A_4 = -1.0527 \times 10^{-6}$
$A_6 = -2.6588 \times 10^{-9}$
$A_8 = 1.2132 \times 10^{-10}$
$A_{10} = 0$ Example 19

(Wide-angle position)
$f = 5.7$ mm, $F_{NO} = 0.7$, $\omega = 4.1°$

| | | |
|---|---|---|
| $r_1 = -3.1147 \times 10^4$ (DS) | $d_1 = 0$ | $n_{900.1} = 1553$ |
| $r_2 = \infty$ | $d_2 = 1$ | $n_{900.2} = 1.48536$ |
| $r_3 = \infty$ | $d_3 = 0$ | $n_{900.3} = 1553$ |
| $r_4 = 3.1147 \times 10^4$ (DS) | $d_4 = 9.329$ | |
| $r_5 = 6.0760 \times 10^4$ (DS) | $d_5 = 0$ | $n_{900.4} = 1553$ |
| $r_6 = \infty$ | $d_6 = 1$ | $n_{900.5} = 1.48536$ |
| $r_7 = \infty$ | $d_7 = 0$ | $n_{900.67} = 1553$ |
| $r_8 = -6.0760 \times 10^4$ (DS) | $d_8 = 1$ | |
| $r_9 = 14.5900$ (Aspheric) | $d_9 = 6$ | $n_{900.7} = 1.48536$ |
| $r_{10} = -50.0100$ (Aspheric) | $d_{10} = 16.660$ | |
| $r_{11} = 2$ | $d_{11} = 3$ | $n_{900.8} = 1.54$ |
| $r_{12} = $ (LE) | | |

Aspherical Coefficients

1st surface $A_4 = -4.1544 \times 10^{-9}$
$A_6 = -5.7862 \times 10^{-9}$
$A_8 = -3.1672 \times 10^{-10}$
$A_{10} = 0$ 4th surface $A_4 = -3.6013 \times 10^{-8}$
$A_6 = 3.0139 \times 10^{-9}$
$A_8 = -4.1593 \times 10^{-10}$
$A_{10} = 0$ 5th surface $A_4 = 1.0226 \times 10^{-8}$
$A_6 = 1.9626 \times 10^{-9}$
$A_8 = -7.2099 \times 10^{-12}$
$A_{10} = 0$ 8th surface $A_4 = 1.6754 \times 10^{-8}$
$A_6 = 1.5690 \times 10^{-9}$
$A_8 = -1.6641 \times 10^{-12}$
$A_{10} = 0$ 9th surface $A_4 = -3.6629 \times 10^{-5}$
$A_6 = 4.2480 \times 10^{-7}$
$A_8 = 1.0442 \times 10^{-9}$
$A_{10} = 0$ 12th surface $A_4 = 4.3544 \times 10^{-6}$
$A_6 = 1.1639 \times 10^{-6}$
$A_8 = -4.5540 \times 10^{-9}$
$A_{10} = 0$ (Telephoto position)
$f = 11.4$ mm, $F_{NO} = 0.7$, $\omega = 2.0°$

| | | |
|---|---|---|
| $r_1 = 14.5900$ (Aspheric) | $d_1 = 6$ | $n_{900.1} = 1.48536$ |
| $r_2 = 50.0100$ (Aspheric) | $d_2 = 16.660$ | |
| $r_3 = 2$ | $d_3 = 3$ | $n_{900.8} = 1.54$ |
| $r_4 = $ (LE) | | |

Aspherical Coefficients

1st surface $A_4 = -3.6629 \times 10^{-5}$
$A_6 = 4.2480 \times 10^{-7}$
$A_8 = 1.0442 \times 10^{-9}$
$A_{10} = 0$ 2nd surface $A_4 = 4.3544 \times 10^{-6}$
$A_6 = 1.1639 \times 10^{-6}$
$A_8 = -4.5540 \times 10^{-9}$
$A_{10} = 0$ Example 20

(Wide-angle position)
$f = 5.7$ mm, $F_{NO} = 0.6$, $\omega = 4.1°$

| | | |
|---|---|---|
| $r_1 = 3.6245 \times 10^4$ (DS) | $d_1 = 0$ | $n_{900.1} = 1553$ |
| $r_2 = \infty$ | $d_2 = 1$ | $n_{900.2} = 1.48536$ |
| $r_3 = \infty$ | $d_3 = 0$ | $n_{900.3} = 1553$ |
| $r_4 = -3.6245 \times 10^4$ (DS) | $d_4 = 7.597$ | |
| $r_5 = 2$ | $d_5 = 3$ | $n_{900.5} = 1.54$ |
| $r_6 = $ (LE) | | |

Aspherical Coefficients

1st surface $A_4 = -9.7821 \times 10^{-7}$
$A_6 = -1.1943 \times 10^{-8}$
$A_8 = 1.0113 \times 10^{-12}$
$A_{10} = 0$ 4th surface $A_4 = -1.0524 \times 10^{-6}$
$A_6 = -3.3691 \times 10^{-9}$
$A_8 = 1.3110 \times 10^{-10}$
$A_{10} = 0$ (Telephoto position)
$f = 11.5$ mm, $F_{NO} = 0.6$, $\omega = 2.0°$

| | | |
|---|---|---|
| $r_1 = 7.3017 \times 10^4$ (DS) | $d_1 = 0$ | $n_{900.1} = 1553$ |
| $r_2 = \infty$ | $d_2 = 1$ | $n_{900.2} = 1.48536$ |
| $r_3 = \infty$ | $d_3 = 0$ | $n_{900.3} = 1553$ |
| $r_4 = -7.3017 \times 10^4$ (DS) | $d_4 = 19.667$ | |
| $r_5 = 2$ | $d_5 = 3$ | $n_{900.5} = 1.54$ |
| $r_6 = $ (LE) | | |

Aspherical Coefficients

1st surface $A_4 = -2.5243 \times 10^{-7}$
$A_6 = -6.7180 \times 10^{-11}$
$A_8 = 2.3145 \times 10^{-12}$
$A_{10} = 0$ 4th surface $A_4 = -2.6103 \times 10^{-7}$
$A_6 = 5.1194 \times 10^{-10}$
$A_8 = 3.7424 \times 10^{-13}$
$A_{10} = 0$ Example 21

(Wide-angle position)
$f = 5.7$ mm, $F_{NO} = 0.6$, $\omega = 5.2°$

| | | |
|---|---|---|
| $r_1 = \infty$ (DS) | $d_1 = 0$ | $n_{900.1} = 1553$ |
| $r_2 = \infty$ | $d_2 = 1$ | $n_{900.2} = 1.48536$ |
| $r_3 = \infty$ | $d_3 = 0$ | $n_{900.3} = 1553$ |
| $r_4 = -3.6768 \times 10^4$ (DS) | $d_4 = 2$ | |
| $r_5 = -4.3250 \times 10^4$ (DS) | $d_5 = 0$ | $n_{900.4} = 1553$ |
| $r_6 = \infty$ | $d_6 = 11.883$ | $n_{900.5} = 1.48536$ |
| $r_7 = \infty$ | $d_7 = 0$ | $n_{900.6} = 1553$ |
| $r_8 = -1.7422 \times 10^4$ (DS) | $d_8 = 6.008$ | |
| $r_9 = 2$ | $d_9 = 3$ | $n_{900.7} = 1.54$ |
| $r_{10} = $ (LE) | | |

Aspherical Coefficients

1st surface $A_4 = -2.1045 \times 10^{-7}$
$A_6 = -6.5172 \times 10^{-11}$
$A_8 = 1.6484 \times 10^{-12}$
$A_{10} = 0$ 4th surface $A_4 = -2.0462 \times 10^{-7}$
$A_6 = 3.0078 \times 10^{-10}$
$A_8 = 6.4334 \times 10^{-13}$
$A_{10} = 0$ 5th surface $A_4 = -6.5032 \times 10^{-8}$
$A_6 = -4.7563 \times 10^{-10}$
$A_8 = -5.6678 \times 10^{-12}$
$A_{10} = 0$ 8th surface $A_4 = -2.6461 \times 10^{-8}$
$A_6 = -2.2351 \times 10^{-10}$
$A_8 = 3.2722 \times 10^{-12}$
$A_{10} = 0$ (Telephoto position)
f = 11.4 mm, $F_{NO}$ = 0.6, ω = 2.6°

| | | |
|---|---|---|
| $r_1 = \infty$ (DS) | $d_1 = 0$ | |
| $r_2 = \infty$ | $d_2 = 1$ | $n_{900.1} = 1553$ |
| $r_3 = \infty$ | $d_3 = 0$ | $n_{900.2} = 1.48536$ |
| $r_4 = -3.6768 \times 10^4$ (DS) | $d_4 = 19.890$ | $n_{900.3} = 1553$ |
| $r_5 = 2$ | $d_5 = 3$ | $n_{900.7} = 1.54$ |
| $r_6 = $ (LE) | | |

Aspherical Coefficients

1st surface $A_4 = -2.1045 \times 10^{-7}$
$A_6 = -6.5172 \times 10^{-11}$
$A_8 = 1.6484 \times 10^{-12}$
$A_{10} = 0$ 4th surface $A_4 = -2.0462 \times 10^{-7}$
$A_6 = 3.0078 \times 10^{-10}$
$A_8 = 6.4334 \times 10^{-13}$
$A_{10} = 0$ Example 22

(Wide-angle position)
f = 5.7 mm, $F_{NO}$ = 0.6, ω = 4.1°

| | | |
|---|---|---|
| $r_1 = 14.9250$ (Aspheric) | $d_1 = 6$ | $n_{900.1} = 1.48536$ |
| $r_2 = -46.0910$ (Aspheric) | $d_2 = 2.847$ | |
| $r_3 = -2.6792 \times 10^4$ (DS) | $d_3 = 0$ | $n_{900.2} = 1553$ |
| $r_4 = \infty$ | $d_4 = 8.912$ | $n_{900.3} = 1.48536$ |
| $r_5 = \infty$ | $d_5 = 0$ | $n_{900.4} = 1553$ |
| $r_6 = -1.3722 \times 10^4$ (DS) | $d_6 = 4.978$ | |
| $r_7 = 2$ | $d_7 = 3$ | $n_{900.5} = 1.54$ |
| $r_8 = $ (LE) | | |

Aspherical Coefficients

1st surface $A_4 = -3.1271 \times 10^{-5}$
$A_6 = 2.8387 \times 10^{-7}$
$A_8 = 1.1218 \times 10^{-9}$
$A_{10} = 0$ 2nd surface $A_4 = 1.3446 \times 10^{-5}$
$A_6 = 7.9855 \times 10^{-7}$
$A_8 = -2.7104 \times 10^{-9}$
$A_{10} = 0$ 3rd surface $A_4 = -1.5457 \times 10^{-7}$
$A_6 = -1.8898 \times 10^{-9}$
$A_8 = -5.3696 \times 10^{-11}$
$A_{10} = 0$ 6th surface $A_4 = -5.8535 \times 10^{-8}$
$A_6 = -5.9937 \times 10^{-10}$
$A_8 = 9.7681 \times 10^{-12}$
$A_{10} = 0$ (Telephoto position)
f = 11.4 mm, $F_{NO}$ = 0.6, ω = 2.0°

| | | |
|---|---|---|
| $r_1 = 14.9250$ (Aspheric) | $d_1 = 6$ | $n_{900.1} = 1.48536$ |
| $r_2 = -46.0910$ (Aspheric) | $d_2 = 16.738$ | |
| $r_7 = 2$ | $d_3 = 3$ | $n_{900.5} = 1.54$ |
| $r_8 = $ (LE) | | |

Aspherical Coefficients

1st surface $A_4 = -3.1271 \times 10^{-5}$
$A_6 = 2.8387 \times 10^{-7}$
$A_8 = 1.1218 \times 10^{-9}$
$A_{10} = 0$ 2nd surface $A_4 = 1.3446 \times 10^{-5}$
$A_6 = 7.9855 \times 10^{-7}$
$A_8 = -2.7104 \times 10^{-9}$
$A_{10} = 0$ Example 23

(Wide-angle position)
f = 5.7 mm, $F_{NO}$ = 0.6, ω = 5.2°

| | | |
|---|---|---|
| $r_1 = 7.1955 \times 10^4$ (DS) | $d_1 = 0$ | $n_{900.1} = 1553$ |
| $r_2 = \infty$ | $d_2 = 3$ | $n_{900.2} = 1.48536$ |
| $r_3 = \infty$ | $d_3 = 0$ | $n_{900.3} = 1553$ |
| $r_4 = -7.1955 \times 10^4$ (DS) | $d_4 = 8.968$ | |
| $r_5 = -1.4025 \times 10^4$ (DS) | $d_5 = 0$ | $n_{900.4} = 1553$ |
| $r_6 = \infty$ | $d_6 = 5.941$ | $n_{900.5} = 1.48536$ |
| $r_7 = \infty$ | $d_7 = 0$ | $n_{900.6} = 1553$ |
| $r_8 = -0.9762 \times 10^4$ (DS) | $d_8 = 3.949$ | |
| $r_9 = 2$ | $d_9 = 3$ | $n_{900.7} = 1.54$ |
| $r_{10} = $ (LE) | | |

Aspherical Coefficients

1st surface $A_4 = -8.2205 \times 10^{-8}$
$A_6 = -1.1698 \times 10^{-10}$
$A_8 = -6.7833 \times 10^{-14}$
$A_{10} = 0$ 4th surface $A_4 = -9.1455 \times 10^{-8}$
$A_6 = 7.4115 \times 10^{-11}$
$A_8 = 4.6373 \times 10^{-14}$
$A_{10} = 0$ 5th surface $A_4 = -3.9390 \times 10^{-7}$
$A_6 = -1.3028 \times 10^{-8}$
$A_8 = -3.0841 \times 10^{-10}$
$A_{10} = 0$ 8th surface $A_4 = -9.4070 \times 10^{-8}$
$A_6 = -3.2980 \times 10^{-9}$
$A_8 = 8.4846 \times 10^{-11}$
$A_{10} = 0$ (Telephoto position)
f = 11.4 mm, $F_{NO}$ = 0.6, ω = 2.6°

| | | |
|---|---|---|
| $r_1 = 7.1955 \times 10^4$ (DS) | $d_1 = 0$ | $n_{900.1} = 1553$ |
| $r_2 = \infty$ | $d_2 = 3$ | $n_{900.2} = 1.48536$ |
| $r_3 = \infty$ | $d_3 = 0$ | $n_{900.3} = 1553$ |
| $r_4 = -7.1955 \times 10^4$ (DS) | $d_4 = 18.858$ | |
| $r_9 = 2$ | $d_9 = 3$ | $n_{900.7} = 1.54$ |
| $r_{10} = $ (LE) | | |

Aspherical Coefficients

1st surface $A_4 = -8.2205 \times 10^{-8}$
$A_6 = -1.1698 \times 10^{-10}$
$A_8 = -6.7833 \times 10^{-14}$
$A_{10} = 0$ 4th surface $A_4 = -9.1455 \times 10^{-8}$
$A_6 = 7.4115 \times 10^{-11}$
$A_8 = 4.6373 \times 10^{-14}$
$A_{10} = 0$ Example 24 f = 12 mm~24 mm, $F_{NO}$ = 1.2, ω = 3.85°~1.92°

| | | |
|---|---|---|
| $r_1 = 9.0877 \times 10^4$ (DS) | $d_1 = 0$ | $n_{900.1} = 1553$ |

-continued

| | | |
|---|---|---|
| $r_2 = \infty$ | $d_2 = 2$ | $n_{900.2} = 1.48536$ |
| $r_3 = \infty$ | $d_3 = 0$ | $n_{900.3} = 1553$ |
| $r_4 = -9.0877 \times 10^4$ (DS) | $d_4 = 10.626 \sim 25.626$ | $n_{900.4} = 1553$ |
| $r_5 = 3.5706 \times 10^4$ (DS) | $d_5 = 0$ | $n_{900.5} = 1.48536$ |
| $r_6 = \infty$ | $d_6 = 2$ | $n_{900.6} = 1553$ |
| $r_7 = \infty$ | $d_7 = 0$ | |
| $r_8 = -3.5706 \times 10^4$ (DS) | $d_8 = 5.905 \sim 1.172$ | |
| $r_9 = \infty$ | $d_9 = 1$ | $n_{900.7} = 1.54$ |
| $r_{10} = $ (LE) | | |

Aspherical Coefficients

1st surface $A_4 = -7.6660 \times 10^{-8}$
$A_6 = -4.1377 \times 10^{-11}$
$A_8 = 9.3184 \times 10^{-14}$
$A_{10} = 0$ 4th surface $A_4 = -8.0864 \times 10^{-8}$
$A_6 = 6.6974 \times 10^{-11}$
$A_8 = 7.8631 \times 10^{-15}$
$A_{10} = 0$ 5th surface $A_4 = -7.5320 \times 10^{-7}$
$A_6 = -6.0937 \times 10^{-9}$
$A_8 = -1.5411 \times 10^{-10}$
$A_{10} = 0$ 8th surface $A_4 = -1.0418 \times 10^{-6}$
$A_6 = 5.3090 \times 10^{-9}$
$A_8 = 1.8780 \times 10^{-10}$
$A_{10} = 0$ Example 25 f = 12 mm~24 mm, $F_{NO}$ = 1.2, ω = 0.95°~0.48°

| | | |
|---|---|---|
| $r_1 = \infty$ | $d_1 = 2$ | $n_{900.1} = 1.48536$ |
| $r_2 = \infty$ | $d_2 = 0$ | $n_{900.2} = 1553$ |
| $r_3 = -4.3332 \times 10^4$ (DS) | $d_3 = 3.908 \sim 23.908$ | |
| $r_4 = \infty$ | $d_4 = 2$ | $n_{900.3} = 1.48536$ |
| $r_5 = \infty$ | $d_5 = 0$ | $n_{900.4} = 1553$ |
| $r_6 = -2.5999 \times 10^4$ (DS) | $d_6 = 9.169 \sim 2.036$ | |
| $r_7 = \infty$ | $d_7 = 1$ | $n_{900.5} = 1.54$ |
| $r_8 = \infty$ (LE) | | |

Aspherical Coefficients

3rd surface $A_4 = 3.6279 \times 10^{-9}$
$A_6 = -2.2629 \times 10^{-12}$
$A_8 = 2.3446 \times 10^{-15}$
$A_{10} = 0$ 6th surface $A_4 = 7.5154 \times 10^{-8}$
$A_6 = -2.8259 \times 10^{-10}$
$A_8 = -1.5965 \times 10^{-12}$
$A_{10} = 0$ Example 26 f = 5.7 mm~11.5 mm, $F_{NO}$ = 0.6, ω = 5.15°~2.57°

| | | |
|---|---|---|
| $r_1 = 5.9334 \times 10^4$ (DS) | $d_1 = 0$ | $n_{900.1} = 1553$ |
| $r_2 = \infty$ | $d_2 = 2$ | $n_{900.2} = 1.48536$ |
| $r_3 = \infty$ | $d_3 = 0$ | $n_{900.3} = 1553$ |
| $r_4 = \infty$ (DS) | $d_4 = 2.187 \sim 27.187$ | |
| $r_5 = 4.6412 \times 10^4$ (DS) | $d_5 = 0$ | $n_{900.4} = 1553$ |
| $r_6 = \infty$ | $d_6 = 2$ | $n_{900.5} = 1.48536$ |
| $r_7 = \infty$ | $d_7 = 0$ | $n_{900.6} = 1553$ |
| $r_8 = -4.6412 \times 10^4$ (DS) | $d_8 = 5.942 \sim 1.208$ | |
| $r_9 = 2$ | $d_9 = 3$ | $n_{900.7} = 1.54$ |
| $r_{10} = \infty$ (LE) | | |

Aspherical Coefficients

1st surface $A_4 = -9.4572 \times 10^{-8}$
$A_6 = -1.4591 \times 10^{-11}$
$A_8 = 2.9292 \times 10^{-13}$
$A_{10} = 0$ 4th surface $A_4 = -1.0744 \times 10^{-7}$
$A_6 = 1.7296 \times 10^{-10}$
$A_8 = -1.2144 \times 10^{-13}$
$A_{10} = 0$ 5th surface $A_4 = -4.5408 \times 10^{-7}$
$A_6 = -2.6536 \times 10^{-9}$
$A_8 = -4.0568 \times 10^{-11}$
$A_{10} = 0$ 8th surface $A_4 = -5.6307 \times 10^{-7}$
$A_6 = 9.0815 \times 10^{-10}$
$A_8 = 5.4527 \times 10^{-12}$
$A_{10} = 0$ Example 27 f = 5.7 mm~11.6 mm, $F_{NO}$ = 0.8, ω = 2.01°~1.00°

| | | |
|---|---|---|
| $r_1 = \infty$ (DS) | $d_1 = 0$ | $n_{900.1} = 1.48536$ |
| $r_2 = \infty$ | $d_2 = 2$ | $n_{900.2} = 1.48536$ |
| $r_3 = \infty$ | $d_3 = 0$ | $n_{900.3} = 1553$ |
| $r_4 = -1.0614 \times 10^4$ (DS) | $d_4 = 2.654 \sim 0.654$ | |
| $r_5 = \infty$ (DS) | $d_5 = 0$ | $n_{900.5} = 1553$ |
| $r_6 = \infty$ | $d_6 = 2$ | $n_{900.6} = 1.48536$ |
| $r_7 = \infty$ | $d_7 = 0$ | $n_{900.7} = 1553$ |
| $r_8 = 1.0614 \times 10^4$ (DS) | $d_8 = 1.011 \sim 13.078$ | |
| $r_9 = 2$ | $d_9 = 3$ | $n_{900.8} = 1.54$ |
| $r_{10} = \infty$ (LE) | | |

Aspherical Coefficients

1st surface $A_4 = -1.5691 \times 10^{-7}$
$A_6 = -4.0091 \times 10^{-10}$
$A_8 = 2.6034 \times 10^{-11}$
$A_{10} = 0$ 4th surface $A_4 = -2.7300 \times 10^{-8}$
$A_6 = 1.5474 \times 10^{-10}$
$A_8 = 1.4771 \times 10^{-11}$
$A_{10} = 0$ 5th surface $A_4 = -8.8013 \times 10^{-8}$
$A_6 = -4.9066 \times 10^{-10}$
$A_8 = -2.2820 \times 10^{-11}$
$A_{10} = 0$ 8th surface $A_4 = -5.4328 \times 10^{-7}$
$A_6 = -4.1730 \times 10^{-9}$
$A_8 = 7.0004 \times 10^{-11}$
$A_{10} = 0$ Example 28 f = 12 mm~24 mm, $F_{NO}$ = 1.7, ω = 0.95°~0.48°

| | | |
|---|---|---|
| $r_1 = 2.6332 \times 10^4$ (DS) | $d_1 = 0$ | $n_{900.1} = 1553$ |
| $r_2 = \infty$ | $d_2 = 2$ | $n_{900.2} = 1.48536$ |
| $r_3 = \infty$ | $d_3 = 0$ | $n_{900.3} = 1553$ |
| $r_4 = -2.6332 \times 10^4$ (DS) | $d_4 = 4.857 \sim 0.857$ | |
| $r_5 = -3.3887 \times 10^4$ (DS) | $d_5 = 0$ | $n_{900.4} = 1553$ |
| $r_6 = \infty$ | $d_6 = 2$ | $n_{900.5} = 1.48536$ |
| $r_7 = \infty$ | $d_7 = 0$ | $n_{900.6} = 1553$ |
| $r_8 = 3.3887 \times 10^4$ (DS) | $d_8 = 2.412 \sim 16.880$ | |
| $r_9 = \infty$ | $d_9 = 1$ | $n_{900.7} = 1.54$ |
| $r_{10} = \infty$ (LE) | | |

Aspherical Coefficients

1st surface $A_4 = -1.1844 \times 10^{-7}$
$A_6 = 1.5856 \times 10^{-9}$
$A_8 = 3.1649 \times 10^{-12}$
$A_{10} = 0$ 4th surface $A_4 = -5.2904 \times 10^{-8}$
$A_6 = 1.5721 \times 10^{-9}$
$A_8 = 2.7770 \times 10^{-11}$
$A_{10} = 0$ 5th surface $A_4 = -1.6379 \times 10^{-7}$
$A_6 = -4.7574 \times 10^{-9}$
$A_8 = 6.9471 \times 10^{-11}$
$A_{10} = 0$ 8th surface $A_4 = -5.0312 \times 10^{-7}$
$A_6 = -1.6889 \times 10^{-9}$
$A_8 = 5.6721 \times 10^{-11}$
$A_{10} = 0$ Example 29

$f = 12\ mm \sim 24\ mm$, $F_{NO} = 2.0$, $\omega = 1.42° \sim 0.71°$

| | | |
|---|---|---|
| $r_1 = \infty$ (DS) | $d_1 = 0$ | $n_{900.1} = 1553$ |
| $r_2 = \infty$ | $d_2 = 2$ | $n_{900.2} = 1.48536$ |
| $r_3 = \infty$ | $d_3 = 0$ | $n_{900.3} = 1553$ |
| $r_4 -1.4184 \times 10^4$ (DS) | $d_4 = 6.297 \sim 1.297$ | |
| $r_5 = -1.9857 \times 10^4$ (DS) | $d_5 = 0$ | $n_{900.4} = 1553$ |
| $r_6 = \infty$ | $d_6 = 2$ | $n_{900.5} = 1.48536$ |
| $r_7 = \infty$ | $d_7 = 0$ | $n_{900.6} = 1553$ |
| $r_8 = \infty$ (DS) | $d_8 = 1.890 \sim 18.755$ | |
| $r_9 = \infty$ | $d_9 = 1$ | $n_{900.7} = 1.54$ |
| $r_{10} = \infty$ (LE) | | |

Aspherical Coefficients

1st surface $A_4 = -3.6917 \times 10^{-8}$
$A_6 = -1.0177 \times 10^{-9}$
$A_8 = 7.4972 \times 10^{-12}$
$A_{10} = 0$ 4th surface $A_4 = 3.4446 \times 10^{-8}$
$A_6 = -3.5186 \times 10^{-10}$
$A_8 = -1.6469 \times 10^{-12}$
$A_{10} = 0$ 5th surface $A_4 = 5.3943 \times 10^{-8}$
$A_6 = 9.4666 \times 10^{-10}$
$A_8 = -4.7220 \times 10^{-11}$
$A_{10} = 0$ 8th surface $A_4 = -5.3732 \times 10^{-8}$
$A_6 = -1.2682 \times 10^{-9}$
$A_8 = -8.4601 \times 10^{-12}$
$A_{10} = 0$ Example 30

$f = 5.7\ mm \sim 11.5\ mm$, $F_{NO} = 0.6$, $\omega = 2.02° \sim 1.01°$

| | | |
|---|---|---|
| $r_1\ -6.8424 \times 10^4$ (DS) | $d_1 = 0$ | $n_{900.1} = 1553$ |
| $r_2 = \infty$ | $d_2 = 2$ | $n_{900.2} = 1.48536$ |
| $r_3 = \infty$ | $d_3 = 0$ | $n_{900.3} = 1553$ |
| $r_4 = 6.8424 \times 10^4$ (DS) | $d_4 = 12.123 \sim 0.644$ | |
| $r_5 = 3.7306 \times 10^4$ (DS) | $d_5 = 0$ | $n_{900.4} = 1553$ |
| $r_6 = \infty$ | $d_6 = 2$ | $n_{900.5} = 1.48536$ |
| $r_7 = \infty$ | $d_7 = 0$ | $n_{900.6} = 1553$ |
| $r_8 = -3.7306 \times 10^4$ (DS) | $d_8 = 14.550 \sim 21.381$ | |
| $r_9 = 2$ | $d_9 = 3$ | $n_{900.7} = 1.54$ |
| $r_{10} = \infty$ (LE) | | |

Aspherical Coefficients

1st surface $A_4 = 5.5561 \times 10^{-9}$
$A_6 = -7.4380 \times 10^{-11}$
$A_8 = -1.0242 \times 10^{-13}$
$A_{10} = 0$ 4th surface $A_4 = -5.8423 \times 10^{-9}$
$A_6 = -1.8322 \times 10^{-11}$
$A_8 = -3.3140 \times 10^{-13}$
$A_{10} = 0$ 5th surface $A_4 = -8.0179 \times 10^{-9}$
$A_6 = -5.8300 \times 10^{-11}$
$A_8 = -1.3981 \times 10^{-13}$
$A_{10} = 0$ 8th surface $A_4 = 6.7676 \times 10^{-9}$
$A_6 = -1.0518 \times 10^{-10}$
$A_8 = 1.4165 \times 10^{-13}$
$A_{10} = 0$ Example 31

$f = 5.7\ mm \sim 11.4\ mm$, $F_{NO} = 0.6$, $\omega = 1.01° \sim 0.50°$

| | | |
|---|---|---|
| $r_1 = -3.6768 \times 10^4$ (DS) | $d_1 = 0$ | $n_{900.1} = 1553$ |
| $r_2 = \infty$ | $d_2 = 2$ | $n_{900.2} = 1.48536$ |
| $r_3 = \infty$ | $d_3 = 13.654 \sim 0.652$ | $n_{900.3} = 1553$ |
| $r_4 = 1.9916 \times 10^4$ (DS) | $d_4 = 0$ | $n_{900.4} = 1553$ |
| $r_5 = \infty$ | $d_5 = 2$ | $n_{900.4} = 1.48536$ |
| $r_6 = \infty$ | $d_6 = 14.044 \sim 20.546$ | |
| $r_7 = 2$ | $d_7 = 3$ | $n_{900.5} = 1.54$ |
| $r_8 = \infty$ (LE) | | |

Aspherical Coefficients

1st surface $A_4 = 1.0162 \times 10^{-8}$
$A_6 = 6.6018 \times 10^{-12}$
$A_8 = -6.4616 \times 10^{-13}$
$A_{10} = 6.4997 \times 10^{-15}$ 4th surface $A_4 = -1.1977 \times 10^{-8}$
$A_6 = -8.2751 \times 10^{-12}$
$A_8 = 4.8296 \times 10^{-13}$
$A_{10} = 3.8066 \times 10^{-15}$ Example 32

$f = 5.7\ mm \sim 11.4\ mm$, $F_{NO} = 0.6$, $\omega = 2.02° \sim 1.01°$

| | | |
|---|---|---|
| $r_1 = -3.7772 \times 10^4$ (DS) | $d_1 = 0$ | $n_{900.1} = 1553$ |
| $r_2 = \infty$ | $d_2 = 2$ | $n_{900.2} = 1.48536$ |
| $r_3 = \infty$ | $d_3 = 0$ | $n_{900.3} = 1553$ |
| $r_4 = \infty 3.7772 \times 10^4$ (DS) | $d_4 = 5.312 \sim 0.645$ | |
| $r_5 = \infty 2.7526 \times 10^4$ (DS) | $d_5 = 0$ | $n_{900.4} = 1553$ |
| $r_6 = \infty$ | $d_6 = 2$ | $n_{900.5} = 1.48536$ |
| $r_7 = \infty$ | $d_7 = 0$ | $n_{900.6} = 1553$ |
| $r_8\ -2.7526 \times 10^4$ (DS) | $d_8 = 13.858 \sim 23.192$ | |
| $r_9 = 2$ | $d_9 = 3$ | $n_{900.7} = 1.54$ |
| $r_{10} = \infty$ (LE) | | |

Aspherical Coefficients

1st surface $A_4 = 1.0266 \times 10^{-8}$
$A_6 = -9.6214 \times 10^{-11}$
$A_8 = -5.5557 \times 10^{-13}$
$A_{10} = 0$ 4th surface $A_4 = -1.0499 \times 10^{-8}$
$A_6 = -6.7180 \times 10^{-11}$
$A_8 = -2.1410 \times 10^{-13}$
$A_{10} = 0$ 5th surface $A_4 = -1.2084 \times 10^{-8}$
$A_6 = -1.4632 \times 10^{-10}$
$A_8 = 3.6365 \times 10^{-13}$
$A_{10} = 0$ 8th surface $A_4 = 9.1541 \times 10^{-9}$
$A_6 = -1.4724 \times 10^{-10}$ -continued $A_8 = 3.4196 \times 10^{-13}$
$A_{10} = 0$ Example 33

$f = 5.7$ mm~11.4 mm, $F_{NO} = 0.6$, $\omega = 2.02°~1.01°$

| | | |
|---|---|---|
| $r_1 = \infty$ (DS) | $d_1 = 0$ | $n_{900.1} = 1553$ |
| $r_2 = \infty$ | $d_2 = 2$ | $n_{900.2} = 1.48536$ |
| $r_3 = \infty$ | $d_3 = 0$ | $n_{900.3} = 1553$ |
| $r_4 = 2.5999 \times 10^4$ (DS) | $d_4 = 9.858~2.000$ | |
| $r_5 = 1.7025 \times 10^4$ (DS) | $d_5 = 0$ | $n_{900.4} = 1553$ |
| $r_6 = \infty$ | $d_6 = 2$ | $n_{900.5} = 1.48536$ |
| $r_7 = \infty$ | $d_7 = 0$ | $n_{900.6} = 1553$ |
| $r_8 = \infty$ (DS) | $d_8 = 13.515~21.373$ | |
| $r_9 = 2$ | $d_9 = 3$ | $n_{900.7} = 1.54$ |
| $r_{10} = \infty$ (LE) | | |

Aspherical Coefficients

1st surface $A_4 = 7.5556 \times 10^{-9}$
$A_6 = -1.8952 \times 10^{-10}$
$A_8 = -7.1109 \times 10^{-14}$
$A_{10} = 0$ 4th surface $A_4 = -8.3751 \times 10^{-9}$
$A_6 = -1.1790 \times 10^{-10}$
$A_8 = -3.2958 \times 10^{-13}$
$A_{10} = 0$ 5th surface $A_4 = -9.8855 \times 10^{-9}$
$A_6 = -1.4149 \times 10^{-10}$
$A_8 = 1.1045 \times 10^{-13}$
$A_{10} = 0$ 8th surface $A_4 = 7.1937 \times 10^{-9}$
$A_6 = -2.6537 \times 10^{-10}$
$A_8 = 6.0477 \times 10^{-13}$
$A_{10} = 0$ Aberrations in Examples 1, 6, 8 and 10 are graphically shown in FIGS. 14, 15, 16 and 17, respectively. In each aberrational diagram, reference character SA denotes spherical aberration; AS denotes astigmatism; and DS denotes distortion. Aberrations in Examples 14, 20 and 21 are graphically shown in FIGS. 30(*a*) and 30(*b*); 31(*a*) and 31(*b*); and 32(*a*) and 32(*b*); respectively. Aberrations in Examples 24, 27 and 30 are graphically shown in FIGS. 44(*a*) and 44(*b*); 45(*a*) and 45(*b*); and 46(*a*) and 46(*b*); respectively. FIGS. 30(*a*), 31(*a*), 32(*a*), 44(*a*), 45(*a*) and 46(*a*) show aberrations in the wide-angle position. FIGS. 30(*b*), 31(*b*), 32(*b*), 44(*b*), 45(*b*) and 46(*b*) show aberrations in the telephoto position. In each aberrational diagram, reference character SA denotes spherical aberration; AS denotes astigmatism; and DS denotes distortion. In each diagram, $\omega$ represents the projected light angle. In the case of FIGS. 30(*a*), 30(*b*), 31(*a*) and 31(*b*), the subject distance is set to 3 meters at the wide-angle end and 5 meters at the telephoto end. In the case of FIGS. 32(*a*) and 32(*b*), the subject distance is set to infinity at both the wide-angle and telephoto ends.

Values of $\phi_1$, $\phi_2$ and $\alpha$ concerning the conditions ④ to ⑥ in the above Examples 24 to 33 are shown in the table below.

| Example | $\phi_1$ | $\phi_2$ | $\alpha$ |
|---|---|---|---|
| 24 | 0.03333 | 0.08333 | 0.40 |
| 25 | 0.03535 | 0.05893 | 0.60 |
| 26 | 0.02582 | 0.06455 | 0.40 |
| 27 | 0.14434 | −0.14434 | −1.00 |
| 28 | 0.11180 | −0.09317 | −1.20 |
| 29 | 0.10801 | −0.07715 | −1.40 |
| 30 | −0.04545 | 0.07986 | −0.57 |
| 31 | −0.04167 | 0.07692 | −0.54 |
| 32 | −0.08333 | 0.10714 | −0.78 |
| 33 | −0.05893 | 0.08999 | −0.65 |

In all the above examples, the present invention is applied to the light-projecting lens system. However, the application of the results of these examples to the light-receiving lens system can be readily made, which is expected by the present invention. Although in all the examples the base material of the DOEs is an acrylic material, the present invention is not necessarily limited thereto. If a diffraction surface is formed on the surface of a glass, a DOE which is stable to temperature and humidity changes is obtained.

Examples 24 to 33 are designed as zoom lens systems. Therefore, it is possible to continuously change a magnification while maintaining a favorable performance from the wide-angle end to the telephoto end. In this case, not only a zooming function but also an image surface correcting function is needed. Therefore, at least one of the lens units must perform a non-linear movement. To realize it, however, a cam groove mechanism or an electrical position control mechanism is needed, and thus the arrangement becomes complicated.

However, in active autofocus multipoint distance measurement, the change of the projected light angle need not be continuous, but it is sufficient if necessary angles alone are stepwisely changed over from one to another. Therefore, it is possible to employ, for example, a control method in which while at least one lens unit moves along a continuous cam groove, the stop position is controlled by using an electrical detecting device. However, with this method, the complexity of the moving mechanism cannot be improved.

It is also possible to construct the range from the wide-angle end to the telephoto end by a step-formed cam. By doing so, the moving mechanism can be simplified. In this case, care should be taken to see that an error in the rotational direction does not cause displacement of the in-focus position to become large.

Alternatively, the moving mechanism may be simplified by allowing the two lens units to perform a rectilinear movement in a range where displacement of the in-focus position will not become large. In Example 33 in particular, the position of the first lens unit G1 at the wide-angle end and that at the telephoto end are coincident with each other. Therefore, if Example 33 is constructed as a two-focal length switching lens, a magnification change can be effected by moving only the second lens unit G2. Therefore, the moving mechanism can be simplified.

According to the above light-projecting lens system or light-receiving lens system for use in the distance measuring apparatus of the present invention, it is possible to reduce the thickness of the lens system in comparison to the conventional refracting lens system. Therefore, the lens system according to the present invention contributes to the reduction in the size of a camera equipped with the distance measuring apparatus. Moreover, the proper use of a diffraction surface as in the present invention makes it possible to obtain a multipoint distance measuring apparatus of favorable performance.

Further, in a variable-magnification lens system capable of switching between a wide-angle position and a telephoto position, a thin lens system capable of achieving space savings can be obtained. It is also possible to obtain a lens system with a simple mechanical arrangement and without movement of a lens in the optical axis direction when a magnification change is effected as in a wide-angle converter in which the master lens is fixed.

In a zoom lens system capable of continuously changing a magnification from the wide-angle end to the telephoto end, a thin lens system capable of achieving space savings can be obtained. By discontinuously using the zooming range, a lens system having a simple moving mechanism can be obtained.

What we claim is:

1. A distance measuring apparatus comprising:
   light-emitting means;
   a light-projecting lens system for projecting light emitted from said light-emitting means onto a subject;
   a light-receiving lens system for receiving and converging reflected light from said subject; and
   detecting means for detecting said light,
   wherein one of said light-projecting lens system and light-receiving lens system includes a diffractive optical element having plane surfaces on both sides thereof, at least one of said plane surfaces being a diffraction surface,
   wherein said diffractive optical element has a diffraction surface on a subject side thereof and an aspherical surface on an opposite side thereof.

2. A distance measuring apparatus comprising:
   light-emitting means;
   a light-projecting lens system for projecting light emitted from said light-emitting means onto a subject;
   a light-receiving lens system for receiving and converging reflected light from said subject; and
   detecting means for detecting said light,
   wherein one of said light-projecting lens system and light-receiving lens system includes a diffractive optical element in which at least a subject-side surface is an aspherical surface, and a surface on an opposite side is a diffraction surface.

3. A distance measuring apparatus according to claim 2, wherein said aspherical surface on a subject side is concave toward said subject.

4. A distance measuring apparatus according to claim 2, wherein said diffractive optical element satisfies the following condition:

$$0.15 < d/D < 0.30 \qquad (1)$$

where d is a center thickness of said diffractive optical element, and D is a diameter of said diffractive optical element.

5. A distance measuring apparatus according to claim 1, wherein said diffractive optical element has a diffraction surface on a subject side thereof.

6. A distance measuring apparatus according to claim 1, wherein said diffractive optical element has a diffraction surface on a side thereof remote from said subject.

7. A distance measuring apparatus according to claim 1, wherein said diffractive optical element is formed from a thin flat plate.

8. A distance measuring apparatus according to claim 1, wherein said diffractive optical element is formed from a prism.

9. A distance measuring apparatus according to claim 8, wherein each surface of said diffractive optical element has a converging action at a lens peripheral portion thereof.

10. A distance measuring apparatus according to claim 8, wherein a subject-side surface of said diffractive optical element has a diverging action at a lens peripheral portion thereof, and a surface on an opposite side of said diffractive optical element has a converging action at a lens peripheral portion thereof.

11. A distance measuring apparatus according to claim 8, wherein a subject-side surface of said diffractive optical element has a positive power, and a surface on an opposite side of said diffractive optical element has a negative power.

12. A distance measuring apparatus according to claim 11, wherein said diffractive optical element satisfies the following condition:

$$0.8 < \phi_F/\phi < 1.6 \qquad (2)$$

where $\phi_F$ is the power of said subject-side surface, and $\phi$ is a power of the entire system, exclusive of said light-emitting means or said detecting means.

13. A distance measuring apparatus according to claim 1, wherein said diffractive optical element produces a positive spherical aberration by a surface on a subject side thereof and produces a negative spherical aberration by a surface on an opposite side thereof.

14. A distance measuring apparatus according to claim 1, wherein said diffractive optical element produces extremely small comatic aberration by a surface on a side thereof remote from said subject.

15. A distance measuring apparatus according to claim 1, wherein at least one of said diffraction surfaces of said diffractive optical element has a negative power at a lens peripheral portion thereof.

16. A distance measuring apparatus according to claim 15, wherein said diffraction surface having a negative power at a lens peripheral portion thereof is a subject-side surface of said diffractive optical element.

17. A distance measuring apparatus according to claim 1, wherein at least one of said diffraction surfaces of said diffractive optical element has a positive power at a lens peripheral portion thereof.

18. A distance measuring apparatus according to claim 1, wherein said diffractive optical element has an area that satisfies the following condition:

$$2 \leq |m| \leq 30 \qquad (7)$$

where m is an order of diffraction, which is positive in a case of a converging action.

19. A distance measuring apparatus comprising:
   light-emitting means;
   a light-projecting lens system for projecting light emitted from said light-emitting means onto a subject;
   a light-receiving lens system for receiving and converging reflected light from said subject; and
   detecting means for detecting said light,
   wherein one of said light-projecting lens system and light-receiving lens system is arranged to change a focal length by adding a converter lens to a master lens, and
   wherein one of said master lens and converter lens includes a diffractive optical element having plane surfaces on both sides thereof, at least one of said plane surfaces being a diffraction surface.

20. A distance measuring apparatus according to claim 19, wherein said diffractive optical element is provided on at least one side of said master lens.

21. A distance measuring apparatus according to claim 19, wherein a lens of positive power is added to one of a subject side of said master lens and an opposite side thereof to shorten a focal length of the entire system.

22. A distance measuring apparatus according to claim 19, wherein a lens of negative power is added to one of a subject side of said master lens and an opposite side thereof to lengthen a focal length of the entire system.

23. A distance measuring apparatus according to claim 19, wherein an afocal lens is added to a subject side of said master lens.

24. A distance measuring apparatus according to claim 23, wherein said afocal lens has, in order from the subject side, a positive power and a negative power to lengthen a focal length of the entire system.

25. A distance measuring apparatus according to claim 23, wherein said afocal lens has, in order from the subject side, a negative power and a positive power to shorten a focal length of the entire system.

26. A distance measuring apparatus according to claim 19, wherein said master lens and converter lens each have a diffractive optical element.

27. A distance measuring apparatus according to claim 19, wherein only said converter lens has a diffractive optical element.

28. A distance measuring apparatus according to claim 19, wherein said diffractive optical element has diffraction surfaces on both sides thereof.

29. A distance measuring apparatus comprising:

light-emitting means;

a light-projecting lens system for projecting light emitted from said light-emitting means onto a subject;

a light-receiving lens system for receiving and converging reflected light from said subject; and detecting means for detecting said light, wherein one of said light-projecting lens system and light-receiving lens system is arranged to change a focal length by changing a plurality of master lenses from one to another, and wherein said master lenses each include a diffractive optical element having plane surfaces on both sides thereof, at least one of said plane surfaces being a diffraction surface.

30. A distance measuring apparatus comprising:

light-emitting means;

a light-projecting lens system for projecting light emitted from said light-emitting means onto a subject;

a light-receiving lens system for receiving and converging reflected light from said subject; and detecting means for detecting said light, wherein one of said light-projecting lens system and light-receiving lens system is arranged to change a focal length by one of adding a converter lens to a master lens and changing a plurality of master lenses from one to another, and wherein said master lenses each include a diffractive optical element having plane surfaces on both sides thereof, at least one of said plane surfaces being a diffraction surface, and wherein a subject-side surface of said diffractive optical element has a diverging action at a lens peripheral portion thereof, and a surface of said diffractive optical element on a side thereof remote from said subject has a converging action at a lens peripheral portion thereof.

31. A distance measuring apparatus comprising:

light-emitting means;

a light-projecting lens system for projecting light emitted from said light-emitting means onto a subject;

a light-receiving lens system for receiving and converging reflected light from said subject; and detecting means for detecting said light, wherein one of said light-projecting lens system and light-receiving lens system is arranged to change a focal length by adding a converter lens to a master lens, said master lens being fixed when a focal length is changed, and wherein said converter lens includes a diffractive optical element having plane surfaces on both sides thereof, at least one of said plane surfaces being a diffraction surface.

32. A distance measuring apparatus according to claim 31, wherein said converter lens has diffraction surfaces on both sides thereof, and wherein a subject-side surface of said converter lens has a negative power, and a surface of said converter lens on a side thereof remote from said subject has a positive power.

33. A distance measuring apparatus according to claim 31, which satisfies the following condition;

$$0.2 < d/f_W < 1 \qquad (3)$$

where d is a center thickness of said converter lens, and $f_W$ is a focal length of the entire system in a wide-angle position.

34. A distance measuring apparatus comprising:

light-emitting means;

a light-projecting lens system for projecting light emitted from said light-emitting means onto a subject;

a light-receiving lens system for receiving and converging reflected light from said subject; and detecting means for detecting said light, wherein one of said light-projecting lens system and light-receiving lens system is arranged to change a focal length by adding a converter lens to a master lens, and wherein one of said master lens and converter lens includes a diffractive optical element having plane surfaces on both sides thereof, at least one of said plane surfaces being a diffraction surface, and said master lens has an aspherical surface.

35. A distance measuring apparatus comprising:

light-emitting means;

a light-projecting lens system for projecting light emitted from said light-emitting means onto a subject;

a light-receiving lens system for receiving and converging reflected light from said subject; and detecting means for detecting said light, wherein one of said light-projecting lens system and light-receiving lens system has at least two lens units to change a focal length by changing a spacing between said at least two lens units, and includes a diffractive optical element having plane surfaces on both sides thereof, at least one of said plane surfaces being a diffraction surface.

36. A distance measuring apparatus according to claim 35, wherein each of said lens units consists essentially of a single diffractive optical element.

37. A distance measuring apparatus according to claim 35, wherein one of said light-projecting lens system and light-receiving lens system consists essentially of two lens units.

38. A distance measuring apparatus according to any one of claims 35 to 37, wherein one of said light-projecting lens system and light-receiving lens system has, in order from a subject side, a positive lens unit and a positive lens unit.

39. A distance measuring apparatus according to any one of claims 35 to 37, wherein one of said light-projecting lens system and light-receiving lens system has, in order from a subject side, a positive lens unit and a negative lens unit.

40. A distance measuring apparatus according to any one of claims 35 to 37, wherein one of said light-projecting lens system and light-receiving lens system has, in order from a subject side, a negative lens unit and a positive lens unit.

41. A distance measuring apparatus according to claim 40, wherein said negative lens unit is fixed.

* * * * *